United States Patent [19]
Maruoka et al.

[11] Patent Number: 5,313,560
[45] Date of Patent: May 17, 1994

[54] METHOD FOR DETERMINING A SUPPLEMENTAL TRANSACTION CHANGING A DECIDED TRANSACTION TO SATISFY A TARGET

[75] Inventors: Tetsuya Maruoka, Sagamihara; Chizuko Yasunobu, Yokohama; Tadashi Hirose, Komae; Mayumi Kida, Kawasaki; Kouichiro Ino, Sagamihara; Yoshiya Miyagawa, Tokyo, all of Japan

[73] Assignee: Hitachi, Ltd., Tokyo, Japan

[21] Appl. No.: 697,932

[22] Filed: May 8, 1991

[30] Foreign Application Priority Data

May 11, 1990 [JP] Japan ................................. 2-119837
Jun. 11, 1990 [JP] Japan ................................. 2-149997

[51] Int. Cl.⁵ .......................................... G06F 9/44
[52] U.S. Cl. ............................ 395/54; 395/61; 395/900; 395/925; 364/402; 364/408
[58] Field of Search ............... 395/61, 900, 54, 906, 395/925; 364/401, 402, 408

[56] References Cited

U.S. PATENT DOCUMENTS

| | | | |
|---|---|---|---|
| 4,648,044 | 3/1987 | Hardy et al. | 395/61 |
| 4,819,192 | 4/1987 | Kuragano et al. | 395/121 |
| 4,930,071 | 5/1990 | Tou et al. | |
| 5,148,365 | 9/1992 | Dembo | 364/402 |

OTHER PUBLICATIONS

Townsend, "Mastering Expert Systems with Turbo Prolog," Howard Sams & Co, 1987, pp. 167–168.
Zadeh, "Fuzzy Logic", Computer, Apr. 1988, pp. 83–93.
Zadeh, "Fuzzy Sets", Information and Control, 8, 1965, pp. 338–353.
Lassez, et al, "Constraint Logic Programming and Option Trading", IEEE Expert, Fall, 1987, pp. 42–50.
OTT (Option Trader Training) System of Intelligence Technology Co., Ltd. (Provided in Japanese).
Option Trading (Analysis) System of Japan Unisys Co., Ltd. (Provided in Japanese).
Catherine Lassez, et al., "Constraint Logic Programming and Option Trading", IEEE Expert, Special Issue on Financial Software, Aug. 1987, pp. 42–50.

Primary Examiner—Allen R. MacDonald
Attorney, Agent, or Firm—Fay, Sharpe, Beall, Fagan, Minnich & McKee

[57] ABSTRACT

A method of supporting the decision-making on the basis of a table type data is disclosed, which comprises the processes of defining a knowhow relating to the interpretation of the table type data, storing the knowhow in a storage unit, effecting the reasoning by application of the knowhow thus defined, and evaluating the knowhow thus defined. (a) Information is applied by way of an input unit for starting any of the process of defining a knowhow, effecting the reasoning by application of the knowhow and ending the system process, (b) the information thus inputted is discriminated to execute a corresponding process of operation, and (c) if the corresponding process of operation is other than ending, the process is returned to step (a).

24 Claims, 75 Drawing Sheets

FIG. 3

| ARRANGE-MENT NO. | DATA | OPEN PRICE | HIGH QUOTATION | LOW QUOTATION | CLOSED PRICE |
|---|---|---|---|---|---|
| 1 | '89.01.04' | 102.03 | 102.24 | 101.88 | 102.09 |
| 2 | '89.01.05' | 102.10 | 102.19 | 102.06 | 102.06 |
| 3 | '89.01.06' | 102.06 | 102.06 | 102.03 | 102.03 |
| 4 | '89.01.07' | 102.03 | 102.08 | 101.85 | 101.98 |
| ⋮ | ⋮ | ⋮ | ⋮ | ⋮ | ⋮ |
| 100 | '89.08.03' | | | | |
| | 0 | | | | |

301　302　303　304　305　306

INITIAL AREA OF ORIGIN DAY FOR REASONING　360　'100'

AREA OF ORIGIN DAY FOR REASONING　350　'100'

FIG. 4

| ARRANGE-MENT NO. | STICK | UPPER WICK | LOWER WICK | .... |
|---|---|---|---|---|
| 1 | -0.06 | 0.21 | 0.21 | ... |
| 2 | -0.04 | 0.09 | 0.00 | ... |
| 3 | -0.03 | 0.00 | 0.00 | ... |
| 4 | -0.05 | 0.05 | 0.13 | ... |
| ⋮ | ⋮ | ⋮ | ⋮ | ... |
| 100 | | | | |
| | | | | |

| | |
|---|---|
| STICK = CLOSED VALUE (O) - OPEN PRICE (O) | ~501 |
| UPPER WICK = HIGH QUOTATION (O) - MAX(CLOSED PRICE (O), OPEN PRICE (O)) | |
| LOWER WICK = MIN (CLOSED PRICE (O), OPEN PRICE (O)) - LOW QUORATION (O) | |
| GAP = OPEN PRICE (O) - CLOSE PRICE (-1) | ~502 |
| SHORT MOVING AVERAGE = $\sum_{n=0}^{-PERIOD\ a}$ CLOSED PRICE (n) / PERIOD a | |

F I G. 6
600
| ARRANGE-MENT NO. | CANDLE STICK (ONE) | CANDLE STICK (COM-BINATION) | MOVING AVERAGE STICK | ... |
|---|---|---|---|---|
| 1 | '101' | '201' | '301' | . |
| 2 | '102' | '202' | '302' | . |
| 3 | '103' | '203' | '303' | . |
| : | : | : | : | |
601 (header)
602 (data)
650
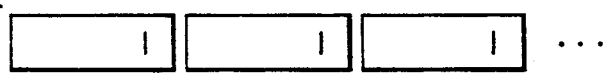

FIG. 7A
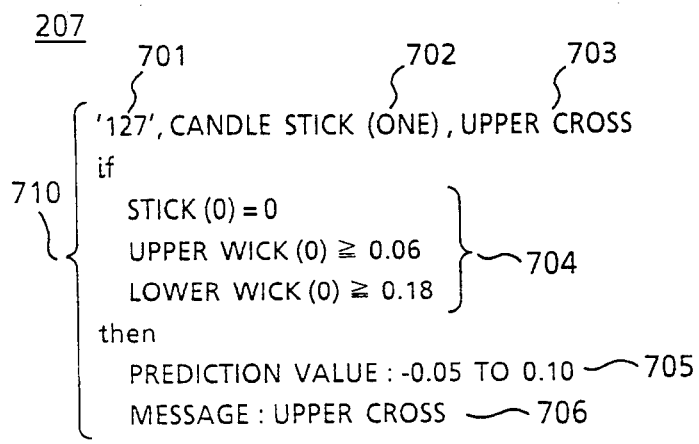
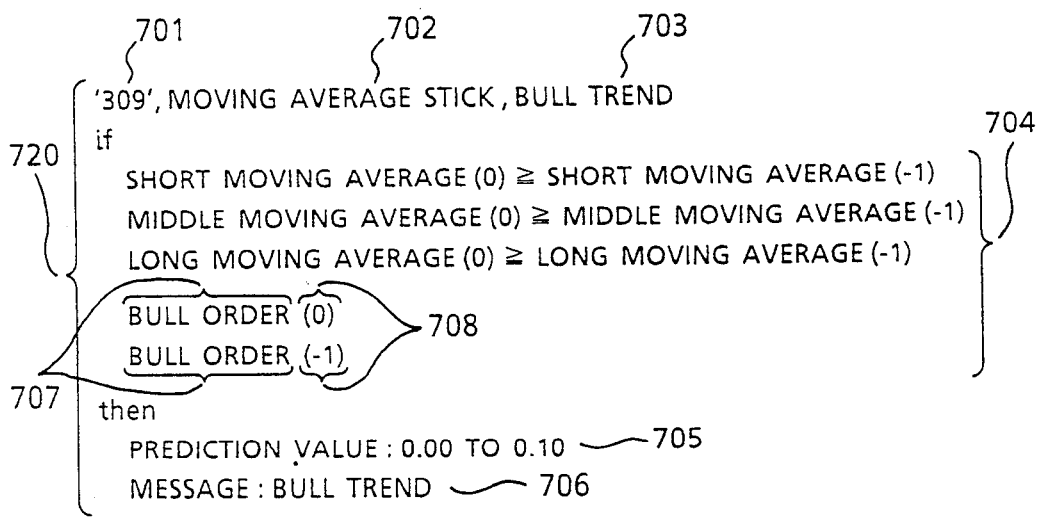
FIG. 7B
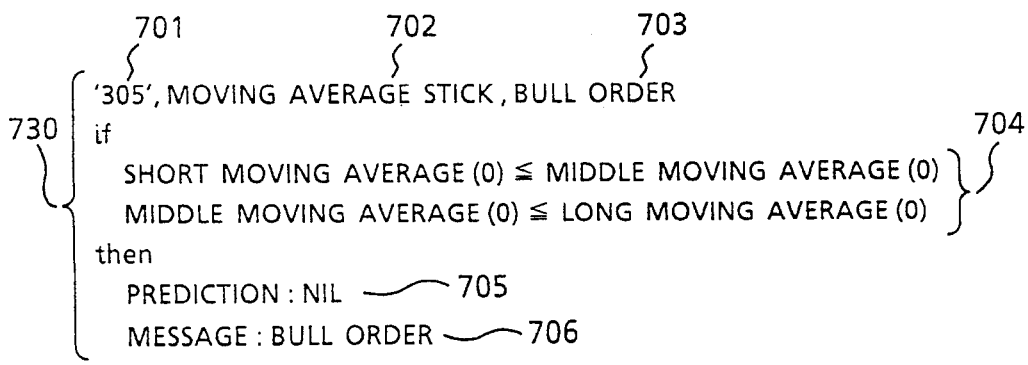

1100 GRADE STORAGE AREA

| 1.0 |
|---|

| PATTERN NAME | DATE | GRADE |
|---|---|---|
| BULL ORDER ⋮ | 0 | 0.8 |

1200 / 1201 / 1202 / 1203

1400

FUZZY LOGIC TABLE

| FEATURE DATA NAME | RANGE FOR GRADE 0.5 |
|---|---|
| OPEN PRICE | 0.02 |
| HIGH QUOTATION | 0.02 |
| LOW QUOTATION | 0.02 |
| CLOSED PRICE | 0.02 |
| STICK | 0.04 |
| UPPER WICK | 0.03 |
| LOWER WICK | 0.03 |
| ⋮ | ⋮ |

1401   1402   1403

F I G. 18
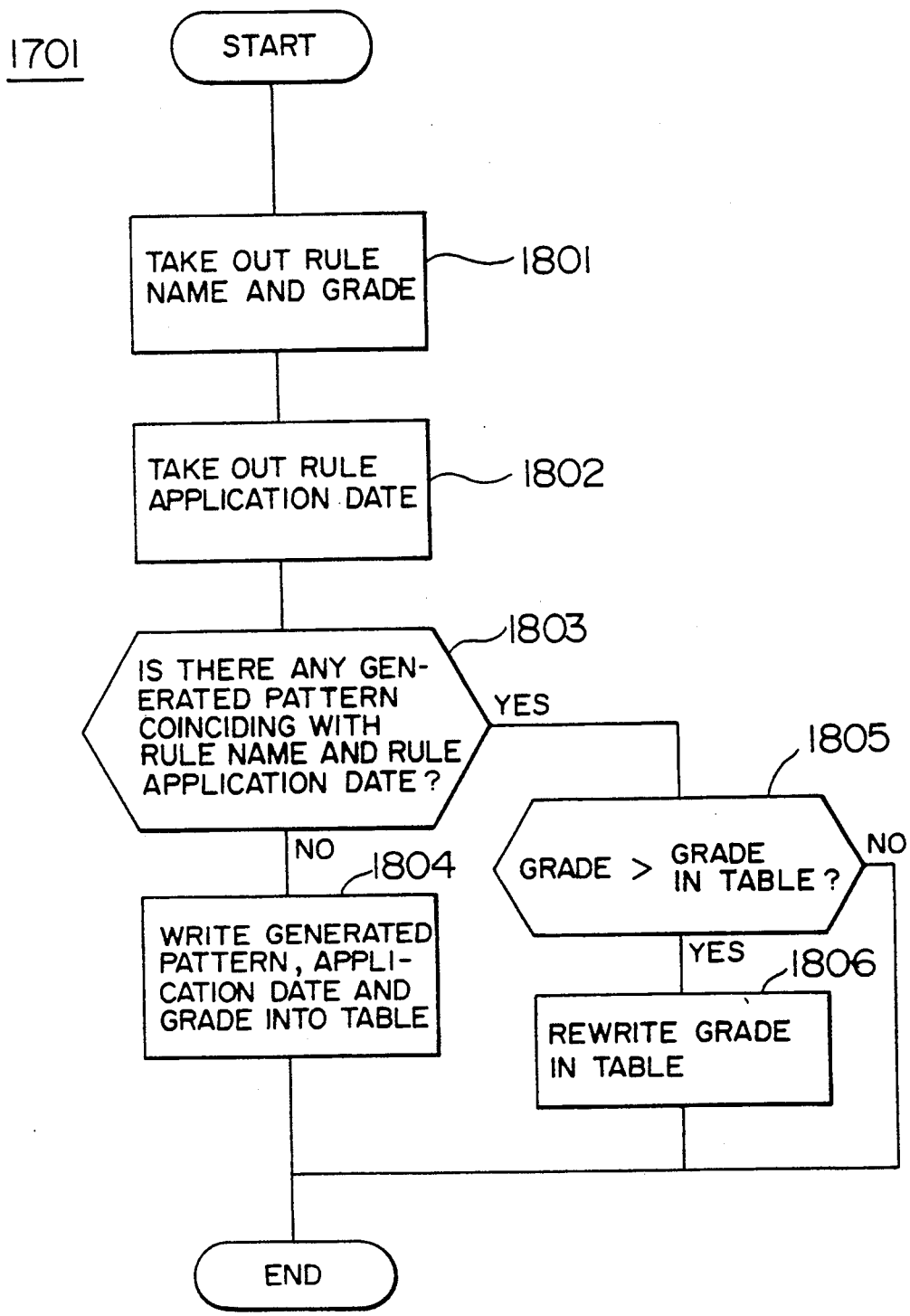

FIG. 19A

| EXECUTION RULE NO. | GRADE |
|---|---|
| 234 | 0.8 |
| 331 | 0.4 |
| ⋮ | ⋮ |

| EXECUTION RULE NO. | GRADE |
|---|---|
| 234 | 0.7 |
| 331 | 0.6 |
| ⋮ | ⋮ |

2000 — 2002 RULE NO. — 2003 GRADE — 2004 LOW PREDICTION VALUE LIMIT — 2005 HIGH PREDICTION VALUE LIMIT

2001 CANDLE STICK (ONE)

| RULE NO. | GRADE | LOW PREDICTION VALUE LIMIT | HIGH PREDICTION VALUE LIMIT |
|---|---|---|---|
| 127 | 0.5 | −0.05 | 0.10 |
| 156 | 0.5 | 0.00 | 0.10 |
| ⋮ | ⋮ | ⋮ | ⋮ |

| RULE GROUP NAME | GRADE | LOW PREDICTION VALUE LIMIT | HIGH PREDICTION VALUE LIMIT |
|---|---|---|---|
| CANDLE STICK | 0.5 | −0.02 | 0.10 |
| MOVING AVERAGE STICK | 0.8 | −0.07 | 0.09 |
| ⋮ | ⋮ | ⋮ | ⋮ |

| GRADE | LOW PREDICTION LIMIT VALUE | HIGH PREDICTION LIMIT VALUE |
|---|---|---|
| 0.7 | −0.05 | 0.19 |

| GENERAL PREDICTION | | |
|---|---|---|
| SUMMARIZATION | 106.74~106.88 | |
| CANDLE STICK (ONE) | 106.74~106.88 | UPPER WICK (1.0) POSITIVE STICK (1.0) |
| CANDLE STICK (COMBINATION) | | |
| MOVING AVERAGE STICK | 106.78~106.88 | BULL TREND (1.0) |
| DISTANCE | | |
| STOCASTIC | 106.68~106.83 | R.V AND K ARE DC (1.0) |
| RSI | 106.73~106.88 | TOP ENTERED (1.0) |
| | | PREDICTION |
| | | UNSTEADY PRICE PLATEAU 106.74 |
| | | K AND D ARE DC 106.74 TO 106.76 |

F I G. 27

| SCREEN NAME 2701 | LOWER LEFT COORDINATE 2702 | | UPPER RIGHT COORDINATE 2703 | | AREA NAME 2704 |
|---|---|---|---|---|---|
| | X | Y | X | Y | |
| GENERAL PREDICTION | 1000 | 650 | 1040 | 670 | END |
| GENERAL PREDICTION | 720 | 305 | 765 | 320 | SIMULATION |
| ⋮ | ⋮ | ⋮ | ⋮ | ⋮ | ⋮ |

2700

F I G. 28

| CHART (SCREEN) NAME 2801 | FEATURE NAME DISPLAY IN GRAPH 2802 |
|---|---|
| GENERAL PREDICTION | CLOSED PRICE |
| CANDLE STICK (ONE) | CANDLE STICK |
| CANDLE STICK (COMBINATION) | CANDLE STICK |
| MOVING AVERAGE STICK | SHORT MOVING AVERAGE, MIDDLE MOVING AVERAGE, LONG MOVING AVERAGE |
| ⋮ | ⋮ |

2800

| CHART NAME | PARAMETER NAME | PARAMETER VALUE | RECALCULATED FEATURE NAME |
|---|---|---|---|
| MOVING AVERAGE STICK | PERIOD a | 3 | SHORT MOVING AVERAGE |
| | PERIOD b | 6 | MIDDLE MOVING AVERAGE |
| | PERIOD c | 12 | LONG MOVING AVERAGE |
| | PERIOD d | 25 | ULTRALONG MOVING AVERAGE |
| ⋮ | ⋮ | ⋮ | ⋮ |

2900, 2901, 2902, 2903, 2904, 2905

3000
- RULE DEFINITION — 3001
- RULE EVALUATION — 3002
- RULE SEARCH — 3003

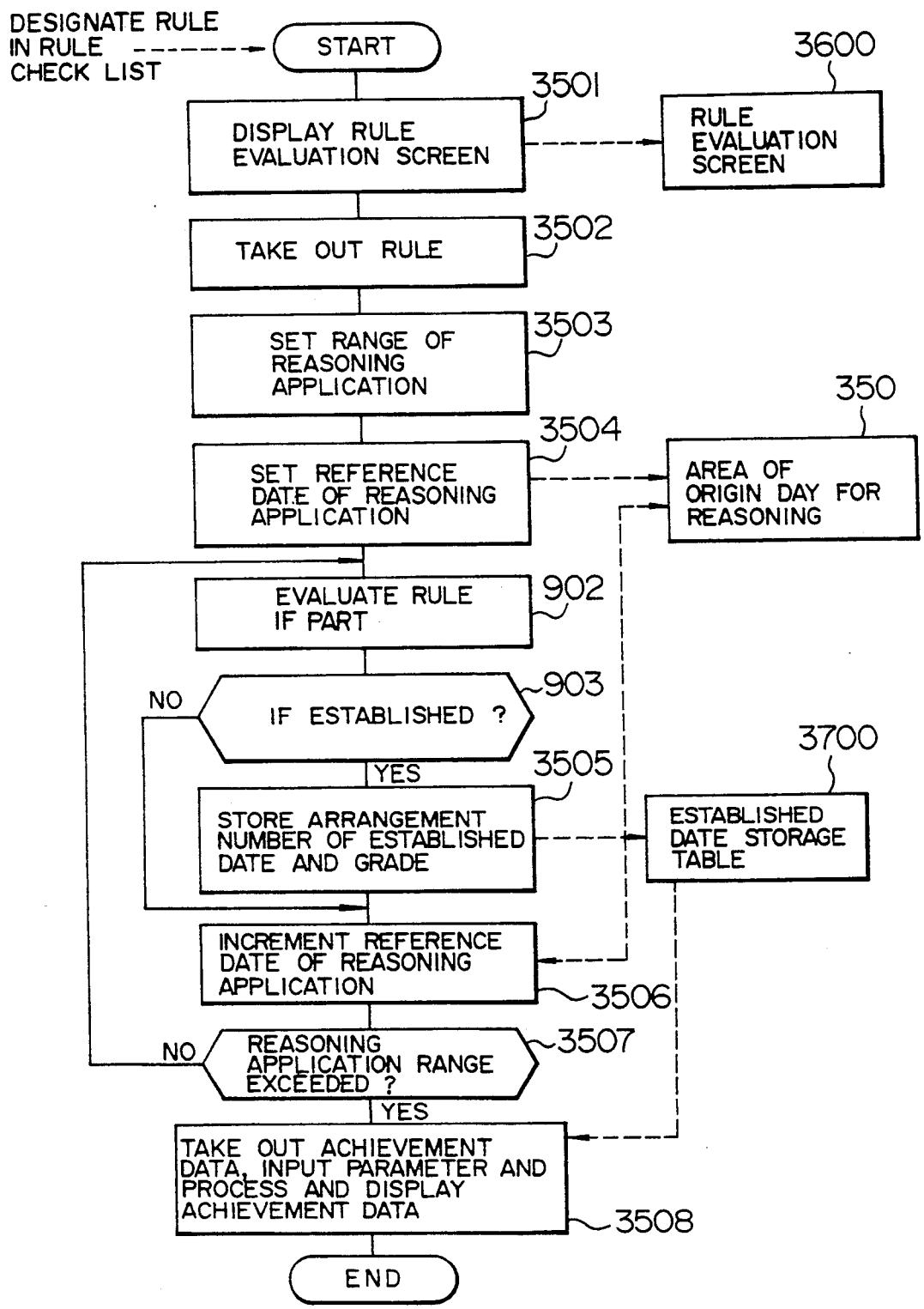
F I G. 35

F I G. 37

| ARRANGE-MENT NO. 3700 | ARRANGEMENT NO. OF ESTABLISHED DATE 3701 | ESTABLISHMENT GRADE 3702 |
|---|---|---|
| 1 | 3 | 0.4 |
| 2 | 6 | 0.6 |
| 3 | 7 | 0.7 |
| ⋮ | ⋮ | ⋮ |

FIG. 39

| | DISPLAY AREA NAME | PARAMETER VALUE |
|---|---|---|
| 3601 | LOW LIMIT OF EXTRACTION GRADE | 0.50 |
| 3602 | HIGH LIMIT OF EXTRACTION GRADE | 1.00 |
| 3603 | NUMBER OF COMPARISON RESULT DAYS | 1 |
| 3606 | PROBABILITY | 0.8 |

| NO. | ARRANGEMENT NO. OF ESTABLISHED DATE | LOW QUOTATION ACHIEVEMENT | HIGH QUOTATION ACHIEVEMENT | CLOSED PRICE ACHIEVEMENT |
|---|---|---|---|---|
| 1 | 7 | -0.10 | 0.09 | 0.03 |
| 2 | 10 | 0.09 | 0.40 | 0.25 |
| 3 | 19 | 0.07 | 0.50 | 0.32 |
| ⋮ | ⋮ | ⋮ | ⋮ | ⋮ |

FIG. 42

| RANGE | NUMBER OF LOW QUOTATIONS | NUMBER OF HIGH QUOTATIONS | NUMBER OF CLOSED PRICES |
|---|---|---|---|
| LESS THAN −1.05 | 0 | 0 | 0 |
| −1.05 ~ −0.95 | 0 | 0 | 0 |
| ⋮ | ⋮ | ⋮ | ⋮ |
| −0.25 ~ −0.15 | 2 | 8 | 1 |
| −0.15 ~ −0.05 | 6 | 1 | 3 |
| −0.05 ~ 0.05 | 5 | 4 | 4 |
| 0.05 ~ 0.15 | 2 | 6 | 8 |
| 0.15 ~ 0.25 | 4 | 7 | 5 |
| ⋮ | ⋮ | ⋮ | ⋮ |
| 0.95 ~ 1.05 | 1 | 0 | 0 |
| OVER 1.05 | 0 | 0 | 0 |

4400

| 4500 | | | |
|---|---|---|---|
| 4501 ARRANGE-MENT NO. FOR REASONING APPLICATION | 4502 GRADE | 4503 LOW PREDICTION VALUE LIMIT | 4504 HIGH PREDICTION VALUE LIMIT |
| 1 | 0.8 | -0.10 | 0.30 |
| 2 | 0.5 | -0.20 | 0.50 |
| 3 | 0.2 | -0.03 | 0.08 |
| ⋮ | ⋮ | ⋮ | ⋮ |

F I G. 50

| MESSAGE | RULE GROUP NAME | HYPOTHETICAL CLOSED PRICE |
|---|---|---|
| UNSTEADY HIGH QUOTATION PLATEAU | MOVING AVERAGE STICK | 106.74 |
| K AND D MAKES DC | STOCASTING | 106.74, 106.75 ⋯ |
| ⋮ | ⋮ | ⋮ |

FIG. 55

POSITION PAYOFF:

$$\pi = \sum_i n^{(C)}i \times C_i + \sum_j n^{(P)}j \times P_i + \sum_K n^{(b)}K \times B_K \qquad \cdots 6034$$

WHERE
   $C_i, n^{(C)}i$: PRICE PER LOT AND NUMBER OF LOTS OF SHORT AND LONG CALLS (SHORT POSITIVE / LONG NEGATIVE)
   $P_j, n^{(P)}j$: PRICE PER LOT AND NUMBER OF LOTS OF SHORT AND LONG PUTS (SHORT POSITIVE / LONG NEGATIVE)
   $B_K, n^{(b)}K$: PRICE PER LOT AND NUMBER OF LOTS OF SHORT AND LONG SPOTS (SHORT POSITIVE / LONG NEGATIVE)

$$C(S, K, t, c, r, v) = S \times \exp(-ct) \times N(d) - K \times \exp(-rt) \times N(d - \sqrt{t}) \qquad \cdots 6036$$

$$P(S, K, t, c, r, v) = -S \times \exp(-ct) \times N(-d) + K \times \exp(-rt) \times N(-d + \sqrt{t}) \qquad \cdots 6037$$

$$B(S, U) = S - U \qquad \cdots 6038$$

WHERE
   $d = [\ln(S/K) + (r - c + v^2/2)t] / (v\sqrt{t})$
   S: BOND PRICE
   K: STRIKE PRICE OF OPTION
   t: PERIOD BEFORE STRIKE DATE OF OPTION
   c: COUPON OF SPOT BOND
      (CONSTANT GIVEN FOR EACH BOND DESCRIPTION)
   r: RISK FREE RATE
   v: VOLATILITY
   N: STANDARD NORMAL DISTRIBUTION FUNCTION
   U: PURCHASE PRICE $$C_i = C(S, K^{(C)}i, T^{(C)}i - T, c, r, v) \qquad \cdots 6039$$
$$P_j = P(S, K^{(P)}j, T^{(P)}j - T, c, r, v) \qquad \cdots 6040$$
$$B_K = B(S, U_K) \qquad \cdots 6041$$

WHERE
   $K^{(C)}i, T^{(C)}i$: STRIKE PRICE AND STRIKE DATE OF SHORT AND LONG CALLS
   $K^{(P)}j, T^{(P)}j$: STRIKE PRICE AND STRIKE DATE OF SHORT AND LONG PUTS
   T: PRESENT TIME POINT

POSITION DELTA: $\Delta = d\pi / dS$     $\cdots 6043$
POSITION GAMMA: $\Gamma = d\Delta / dS$     $\cdots 6046$
POSITION THETA: $\Theta = d\pi / dT$     $\cdots 6049$
POSITION KAPPA: $K = d\pi / dV$     $\cdots 6052$

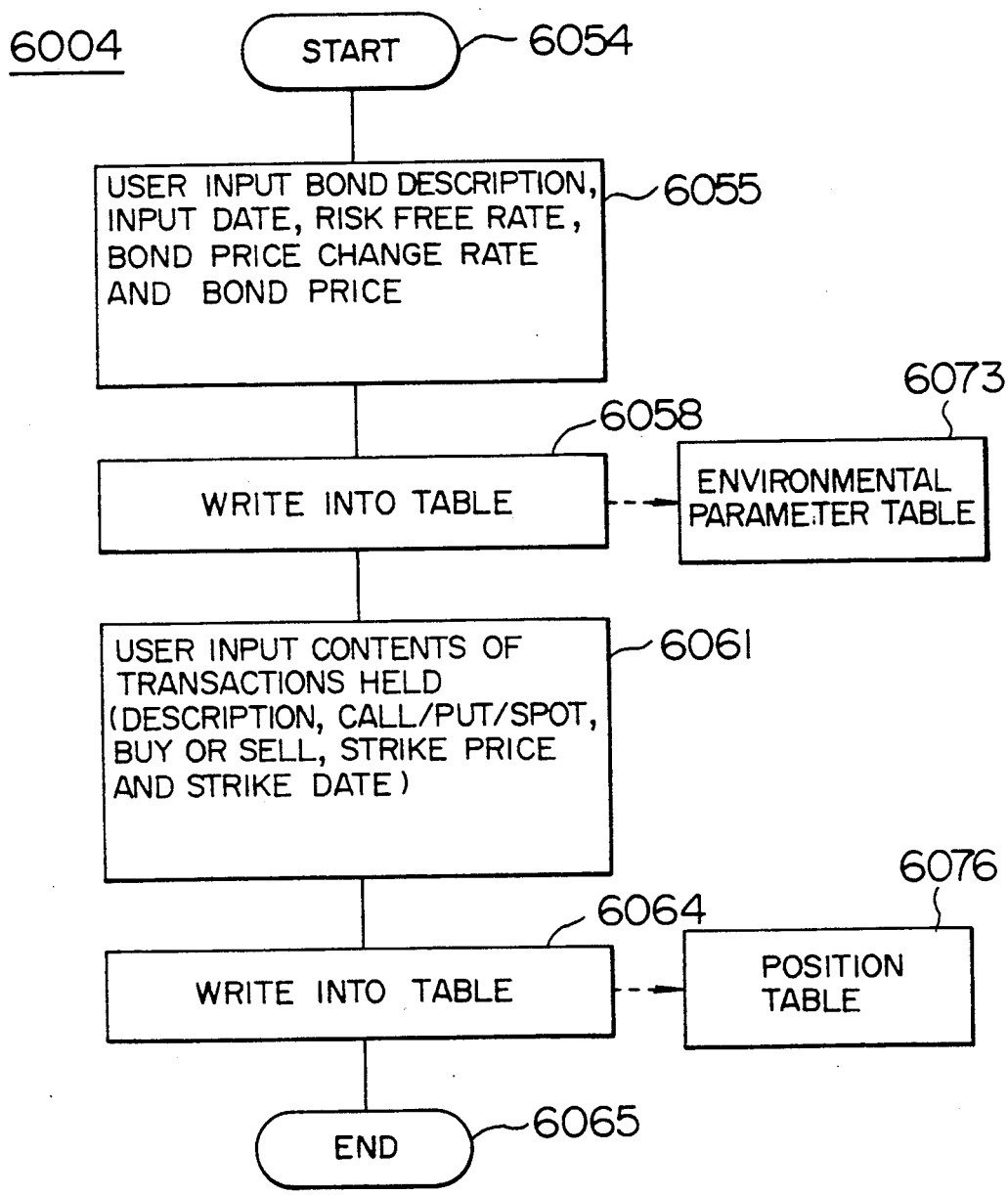
F I G. 56A

F I G. 57

| DESCRIPTION: III-TH NATIONAL BOND |||| 6073 |
|---|---|---|---|
| INPUT DATE (YR./MTH/DAY) | RISK FREE RATE (%) | VOLATILITY (%) | BOND PRICE (YEN) |
| 1989/12/12 | 4.5 | 3.2 | 99.50 |
| 1989/12/13 | 4.5 | 3.3 | 100.50 |
| 1989/12/14 | 4.5 | 3.0 | 100.00 |
|  |  |  |  |

F I G. 58

6076

| DESCRIPTION : III-TH NATIONAL BOND | | | | | |
|---|---|---|---|---|---|
| TRANSAC-TION NO. | CALL/PUT/SPOT | SELL/BUY | STRIK PRICE (YEN) | STRIK DATE (YR./MTH./DAY) | TRANSACTION AMOUNT (100 MILLION YEN) |
| 1 | CALL | BUY | 99.50 | 1990/1/10 | 10 |
| 2 | PUT | BUY | 101.50 | 1990/1/11 | 10 |
| | | | | | |
| | | | | | |
| | | | | | |

F I G. 59

| BOND PRICE (YEN) | POSITION PAY OFF (MILLION YEN) | POSITION DELTA | POSITION GAMMA | POSITION THETA (MILLION YEN /DATE) | POSITION KAPPA (MILLION YEN /%) |
|---|---|---|---|---|---|
| 99.0 | 6.81 | -6.40 | 5.66 | -0.069 | 0.42 |
| 99.1 | 6.20 | -5.81 | 6.20 | -0.076 | 0.49 |
| 99.2 | 5.65 | -5.17 | 6.72 | -0.082 | 0.57 |
| ⋮ | ⋮ | ⋮ | ⋮ | ⋮ | ⋮ |
| 99.9 | 3.91 | 0.39 | 8.50 | -0.104 | 1.07 |
| 100.0 | 3.99 | 1.24 | 8.40 | -0.103 | 1.11 |
| 100.0 | 4.16 | 2.07 | 8.21 | -0.100 | 1.13 |
| ⋮ | ⋮ | ⋮ | ⋮ | ⋮ | ⋮ |
| 101.0 | 8.88 | 7.77 | 4.01 | -0.047 | 0.75 |

6079

F I G. 61

| PATTERN NO. | PAYOFF | DELTA | GAMMA | THETA | KAPPA 6105 |
|---|---|---|---|---|---|
| 1 | | APPROCH TO 0 | INCREASE POSITIVE VALUE | APPROCH TO PRESENT VALUE | MASK POSITIVE VALUE |
| 2 | | APPROCH TO 0 | INCREASE POSITIVE VALUE | APPROCH TO PRESENT VALUE | APPROCH TO 0 |
| 3 | | APPROCH TO 0 | INCREASE POSITIVE VALUE | APPROCH TO PRESENT VALUE | MASK NEGATIVE VALUE |
| --- | --- | --- | --- | --- | --- |

FIG. 62

| REGULATION BOND PRICE POINT = 100 | REGULATION TIME POINT = 0 | VOLATILITY = 3.0 | RISK FREE RATE = 4.5 | |
|---|---|---|---|---|
| | INDEX | TARGET VALUE AFTER REGULATION | DIRECTION OF REGULATION | WEIGHT |
| REGULATION TARGET 1 | PAYOFF | * | * | 0 |
| | DELTA | 0. | — | a |
| | GAMMA | 10. | + | b |
| | THETA | -0.103 | * | c |
| | KAPPA | 1.11 | * | d |

| DISPLAY SECTION | SETTING SECTION | |
|---|---|---|
| | ENVIRONMENTAL PARAMETER | REGULATION POINT |
| REGULATION TARGET PATTERN 1 | BOND PRICE | 100.00 YEN  〉6141 |
| | DATE | 0 DAY LATER  〉6144 |
| | VOLATILITY | 3.0%  〉6147 |
| | LISK FREE RATE | 4.5%  〉6150 |

| INDEX | REGULATION POLICY | PRESENT VALUE | TARGET VALUE AFTER REGULATION | REGULATION VALUE | DIRECTION OF REGULATION | WEIGHT |
|---|---|---|---|---|---|---|
| POSITION PAYOFF | | 3.99 | * | * | * | 0 |
| POSITION DELTA | APPROACH TO ZERO | 1.24 | 0 | −1.24 | − | a |
| POSITION GAMMA | INCREASE AS POSITIVE VALUE | 8.40 | 10. | +1.60 | + | b |
| POSITION THETA | APPROACH TO PRESENT VALUE | −0.103 | −0.103 | 0 | * | c |
| POSITION KAPPA | MAKE POSITIVE VALUE | 1.11 | 1.11 | 0 | * | d |

| RULE No. | IF PART | | | | | THEN PART | | | | |
|---|---|---|---|---|---|---|---|---|---|---|
| | DIRECTION OF REGULATION | | | | | CALL / PUT | BUY / SELL | RANGE k OF STRIKE PRICE (YEN) | RANGE t OF PERIOD (NUMBER OF DAYS) BEFORE STRIKE DATE | RANGE L OF TRANSACTION AMOUNT (100 MILLION YEN) | PARAMETER RELATION |
| | PAY-OFF | DELTA | GUMMA | THETA | KAPPA | | | | | | |
| 1 | + | + | + | − | + | CALL | BUY | S−1, S, S+1 | 10, 20, 30 | 10, 30, 100 | |
| 2 | + | * | + | − | + | PUT | BUY | S−1, S, S+1 | 10, 20, 30 | 10, 30, 100 | L2 = L1 |
| | | | | | | | BUY | S−1, S, S+1 | 10, 20, 30 | 10, 30, 100 | |

(NOTE) S REPRESENTS BOND PRICE

FIG. 67

| TRANS-ACTION No. | CALL/PUT | BUY/SELL | RANGE k OF STRIKE PRICE (YEN) | RANGE OF PERIOD (NUMBER OF DAYS) t BEFORE STRIKE DATE | RANGE L OF TRANSACTION AMOUNT (100 MILLION YEN) | PARAMETER RELATION |
|---|---|---|---|---|---|---|
| 1 | CALL | BUY (SHORT) | 99, 100, 101 | 10, 20, 30 | 10, 30, 100 | |
| 2 | PUT | BUY (SHORT) | 99, 100, 101 | 10, 20, 30 | 10, 30, 100 | L2 = L1 |
| | | | | | | |
| | | | | | | |

6201

| 6204 | | | |
|---|---|---|---|
| TRANSACTION 1: SHORT CALL (TRADING) | | | |
| STRIKE PRICE K1 (YEN) | 99.00 | 100.00 | 101.00 |
| PERIOD t1 (NUMBER OF DAYS) BEFORE STRIKE DATE | *10 | 20 | 30 |
| TRANSACTION AMOUNT L1 (100 MILLION YEN) | 10 | 30 | 100 |
| TRANSACTION 2: SHORT PUT (TRADING) | | | |
| STRIKE PRICE K2 (YEN) | 99.00 | 100.00 | 101.00 |
| PERIOD t2 (NUMBER OF DAYS) BEFORE STRIKE DATE (EXPIRATION) | 10 | 20 | *30 |
| TRANSACTION AMOUNT L2 (100 MILLION YEN) | 10 | 30 | 100 |

CONSTRAINT : L2=L1

F I G. 69
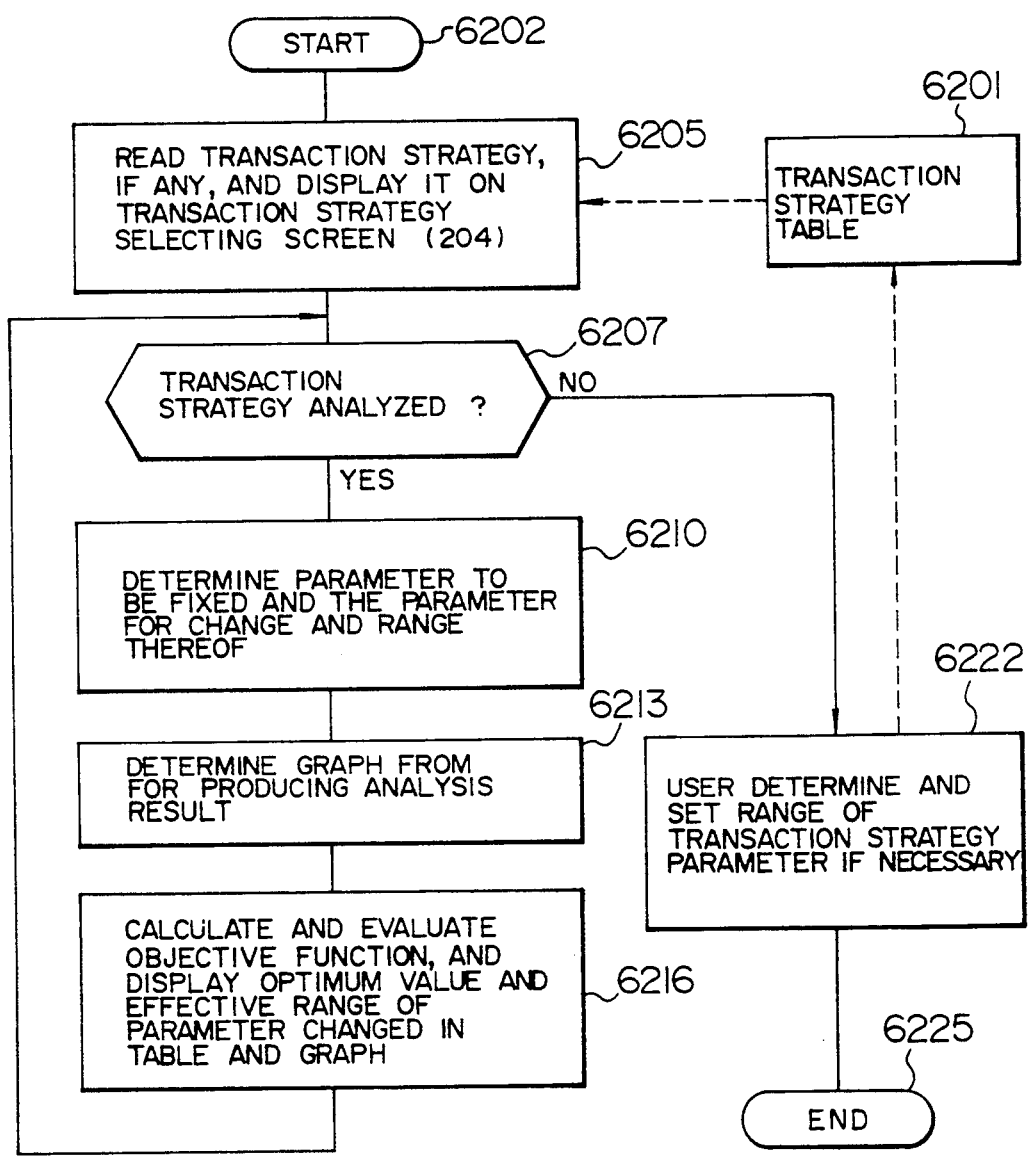

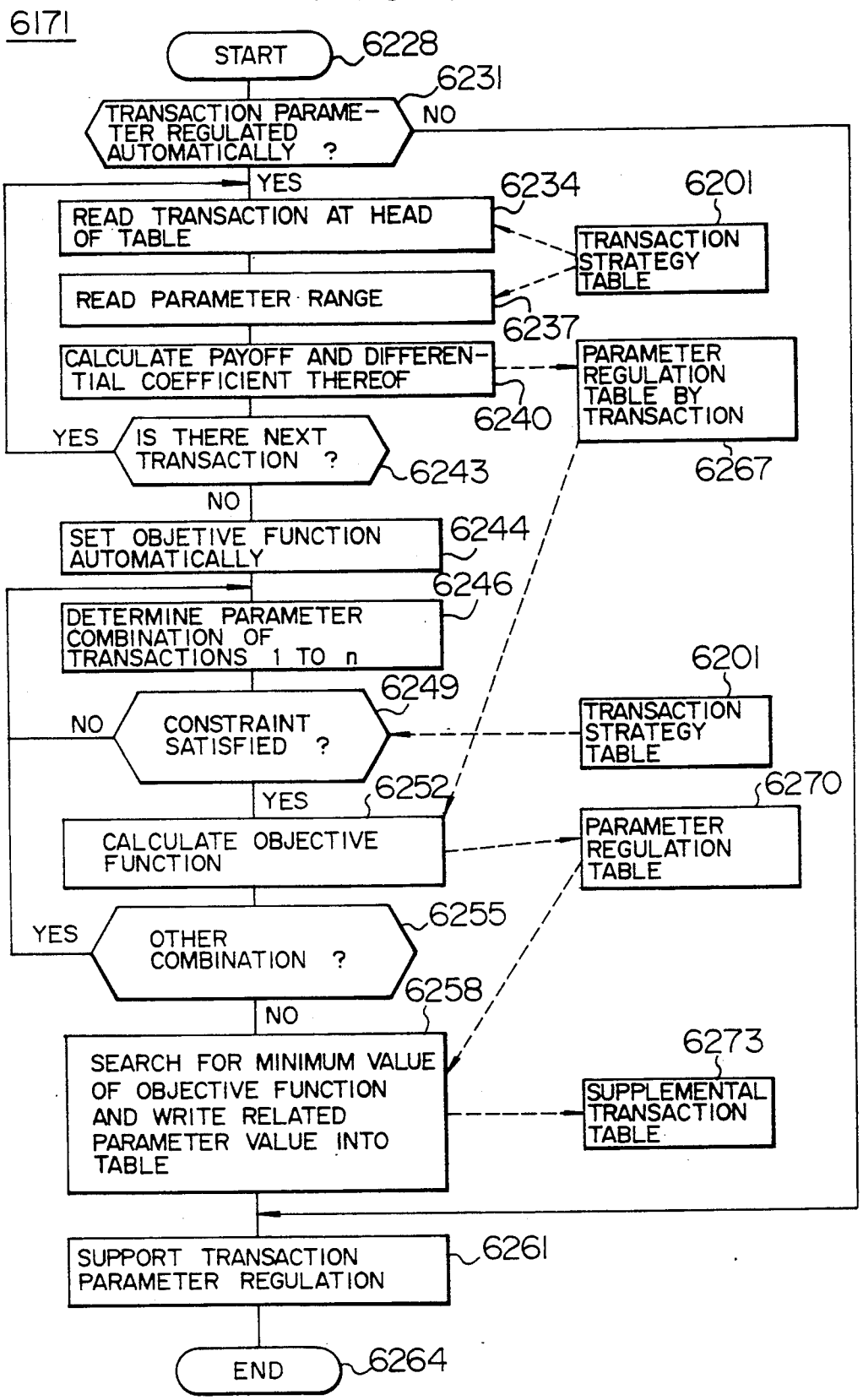

FIG. 71

$Q = Q\pi + Q\delta + Q\theta + Q\kappa$ ⋯6521

WHERE
    $Q\pi$ OBJECTIVE FUNCTION FOR POSITION PAYOFF,
    $Q\delta$ OBJECTIVE FUNCTION FOR POSITION DELTA,
    $Q\gamma$ OBJECTIVE FUNCTION FOR POSITION GAMMA,
    $Q\theta$ OBJECTIVE FUNCTION FOR POSITION THETA, AND
    $Q\kappa$ OBJECTIVE FUNCTION FOR POSITION KAPPA $Q\delta = a \cdot \Delta^2$ ⋯6522

$Q\gamma = \dfrac{b}{\Gamma + p} - q$ ⋯6523
    WHERE $p > 0, q > 0, 10.00 = \dfrac{b}{q} - p$ $Q\theta = c(\Theta + 0.103)^2$ ⋯6524

$Q\kappa = d(K - 1.11)^2$ ⋯6525

WHERE
    $\Delta$ IS POSITION DELTA AFTER REGULATION,
    $\Gamma$ POSITION GAMMA AFTER REGULATION,
    $\Theta$ POSITION THETA AFTER REGULATION,
    $K$ POSITION KAPPA AFTER REGULATION, AND
    a,b,c AND d WEIGHTS OF OBJECTIVE FUNCTIONS REGULATION. BOND PRICE = 100, REGULATION TIME POINT = 0, VOLATILITY $\sigma_1$ = 3.0, RESK FREE RATE = 4.5

6267

TRANSACTION NO.1

| STRIKE PRICE K1 (YEN) | PERIOD t1 (NUMBER OF DAYS BEFORE STRIKE DATE (EXPIRATION)) | TRANSACTION AMOUNT L1 (100 MILLION YEN) | PAYOFF $\pi_1$ | DELTA $\Delta_1$ | GAMMA $\gamma_1$ | THETA $\theta_1$ | KAPPA $\kappa_1$ |
|---|---|---|---|---|---|---|---|
| 99.00 | 10 | 10 | --- | --- | --- | --- | --- |
| 99.00 | 10 | 30 | --- | --- | --- | --- | --- |
| ... | ... | ... | ... | ... | ... | ... | ... |
| 101.00 | 30 | 100 | --- | --- | --- | --- | --- |

TRANSACTION NO.2

| K2 | t2 | L2 | $\pi_2$ | $\Delta_2$ | $\gamma_2$ | $\theta_2$ | $\kappa_2$ |
|---|---|---|---|---|---|---|---|
| 99.00 | 10 | 10 | --- | --- | --- | --- | --- |
| 99.00 | 10 | 30 | --- | --- | --- | --- | --- |
| ... | ... | ... | ... | ... | ... | ... | ... |
| 101.00 | 30 | 100 | --- | --- | --- | --- | --- |

| REGULATION POINT BOND PRICE = 100 | | | REGULATION TIME POINT = 0, VOLATILITY = 3.0 | | | RESK FREE RATE = 4.5 |
|---|---|---|---|---|---|---|
| TRANSACTION NO.1 | | | TRANSACTION NO.2 | | | VALUE OF OBJECTIVE FUNCTION Q |
| STRIKE PRICE K1 | PERIOD t1 BEFORE EXPIRY DATE (EXPIRATION) | TRANSACTION AMOUNT L1 | STRIKE PRICE K2 | PERIOD t2 BEFORE EXPIRY DATE (EXPIRATION) | TRANSACTION AMOUNT L2 | |
| 99.00 | 10 | 10 | 99.00 | 10 | 10 | ---- |
| 99.00 | 10 | 10 | 99.00 | 20 | 10 | ---- |
| 99.00 | 10 | 10 | 99.00 | 30 | 10 | ---- |
| . | . | . | . | . | . | . |
| . | . | . | . | . | . | . |
| aa | bb | cc | dd | ee | ff | qq |
| . | . | . | . | . | . | . |
| . | . | . | . | . | . | . |
| 101.00 | 30 | 100 | 101.00 | 30 | 100 | ---- |

| TRANS-ACTION No. | CALL/PUT | BUY/SELL | STRIKE PRICE (YEN) | PERIOD (NUMBER OF DAYS) BEFORE STRIKE DATE (EXPIRATION) | TRANSACTION AMOUNT (100 MILLION YEN) |
|---|---|---|---|---|---|
| 1 | CALL | BUY | aa | bb | cc |
| 2 | PUT | BUY | dd | ee | ff |
| | | | | | |

| No. | TRANSAC-TION TYPE | BUY/SELL | STRIKE PRICE (YEN) | PERIOD (NUMBER OF DAYS) BEFORE STRIKE DATE (EXPIRATION) | TRANSACTION AMOUNT (100 MILLION YEN) |
|---|---|---|---|---|---|
| 1 | CALL | BUY (SHORT) | a a | b b | c c |
| 2 | PUT | BUY (SHORT) | d d | e e | f f |

6276

F I G. 82
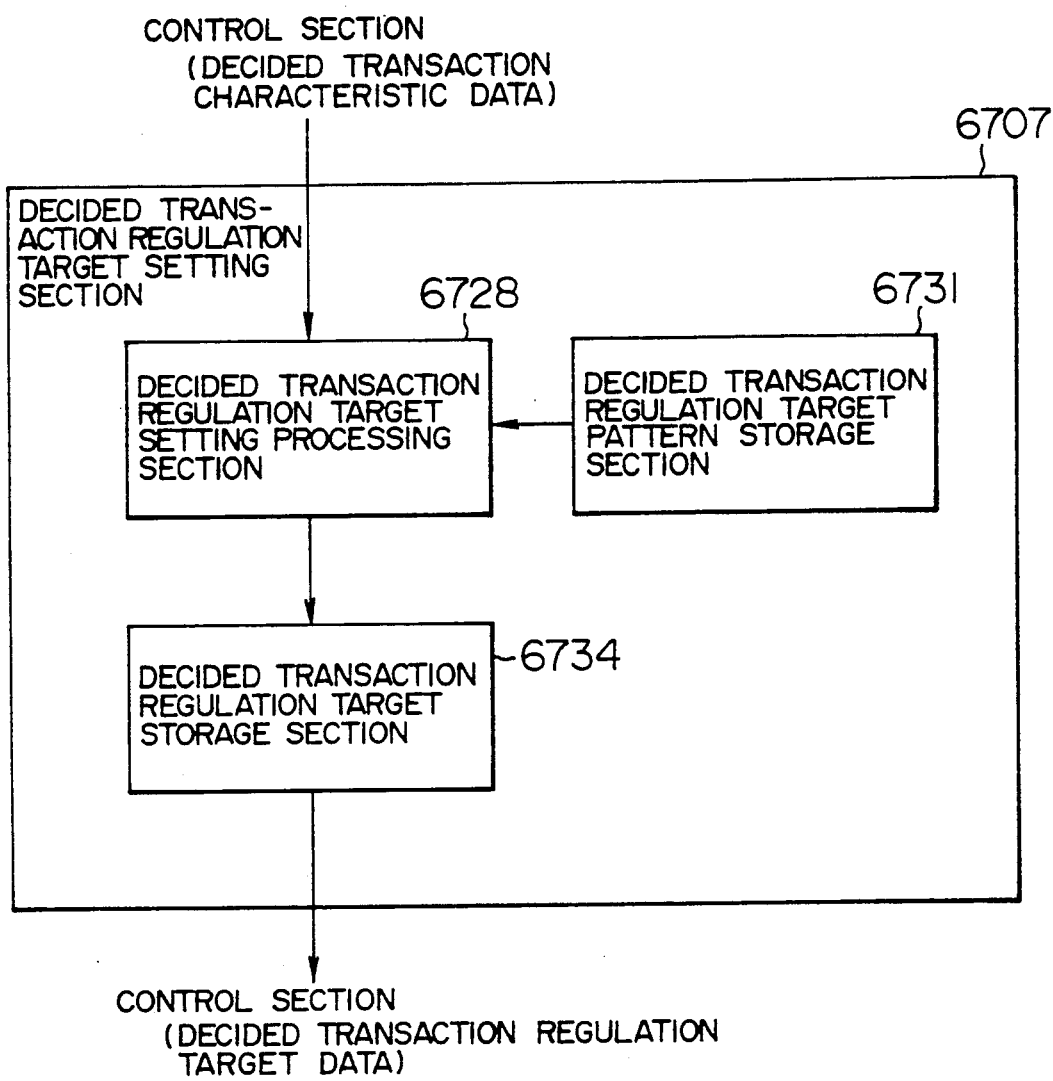

METHOD FOR DETERMINING A SUPPLEMENTAL TRANSACTION CHANGING A DECIDED TRANSACTION TO SATISFY A TARGET

BACKGROUND OF THE INVENTION

1. Field of the Invention

The present invention relates to a method and a system for supporting decision-making.

2. Description of the Prior Art

A decision-making support system now available on the market is "EXCEED". This system is capable of processing various table type data into a new column or row data, presenting a table type data in chart form, and searching for and displaying specific data on the screen. The user is in a position to designate these procedures sequentially. Also, the order of processing may be registered in the system as a command file in advance. This makes it possible to display and present to the user information considered effective in advance. It is also of course possible to have a dialogue with the system to search for or process data as required.

The present invention is also required to be studied from the viewpoint of a method of knowledge processing, and therefore explanation will be made below about a conventional method of the knowledge processing.

In a system for describing the knowhow of an expert in the form of knowledge presentation of a rule or the like, storing it in a knowledge base and utilizing it for various decisions or analyses, the knowledge stored in the knowledge base is required to be reasonable. The evaluation for this purpose requires a task called knowledge regulation. An expert system structuring tool marketed now is such that this task is performed in such a manner that a hypothetical test case is inputted manually and the resultant output is examined manually, and if the result is undesirable, the case is traced to correct corresponding knowledge. An "ES/KERNEL" is Hitachi's conventional expert system structuring tool. According to the ES/KERNEL, data accessed by a rule is stored in a data storage area called a frame. Further, there is an area called a slot in the frame for storing individual data items. An arrangement may be used as a type of this slot.

Furthermore, a support system for the dealing task in the financial industry includes a "Market Mind". This system, while monitoring the fluctuations of stock prices of various descriptions of stock, gives an alarm as information whether a given description of stock rises or falls in price on the basis of the knowhow presented by the rule.

The conventional methods, however, have the problem described below.

The existing decision-making support systems are incapable of incorporating any knowhow of the decision-making person on the interpretation of data such as how a table type data should be interpreted or what should be presented to the user as a conclusion of interpretation.

Also, the conventional knowledge processing systems do not have any function to efficiently evaluate whether the knowhow stored in a knowledge base is reasonable. Nor are they capable of describing a rule for effectively referring to a table type data. Specifically, in the case where a column (or a row) is stored as a frame, the information on the sequential relationship of the column (or the row) is lost, so that a rule cannot be referred to when a table is stored as an arrangement of frame slots.

Also, the conventional dealing task support systems, which are adapted to output the result of execution of a reasoning as information on whether a given stock price rises or falls, are incapable of evaluating the stored knowledge to check the reasonability thereof.

As explained above, the problem of the conventional methods lie in that no consideration is given to a mechanism for structuring a decision-making support system incorporating a knowhow, or more specifically, a system for applying the knowhow to a table type data.

On the other hand, there is a decision-making support system described below for position control of the dealer to conduct financial trading with a self-position. (a financial trading held by himself).

Generally, a method of supporting the determination of the optimum processing, behavior or operation includes a technique called the linear optimization method, the nonlinear optimization method and the combinational optimization method. According to the conventional nonlinear optimization method, as discussed in "Optimization", Information Science 19, Iwanami Shoten Lecture Series, pp. 61 to 77, for example, values $x_1, x_2, \ldots, x_n$ minimizing an objective function $f(x_1, x_2, \ldots, x_n)$ under a constraint $g_i(x_1, x_2, \ldots, x_n) \leq 0$ are determined.

Now explanation will be made about a method of supporting the determination of an outline of option trading, which is one of the financial tradings, and an optimum trading.

The market participants in option trading conducted over the counter include a market maker in a position to supply an option as a commodity and an investor for creating the demand for an option to achieve his investment target (objective).

The task of a dealer which is a market maker is divided into the operational task for over-the-counter trading and the revenue management task for self-position (trading held by the dealer). The former includes the setting of the price of bond-option which trades over the counter and the acceptance of an order from customers (mainly investors). The latter is to decide an operational policy of the self-position and, by trading with a correspondent as required, to constantly recompile the contents of the self-position subjected to fluctuations due to the acceptance of customer orders, change in bond price or time decay (change in profit or loss with time) in conformity with the operational policy.

Specifically, the decision on the operational policy is to determine the style of the payoff function of the self-position in such a manner as to earn a profit in accordance with the move of the market price. Such a style is defined by the payoff function and the values of delta, gamma, theta or the like making up a differential function thereof for a certain value assumed by the environmental parameter (the bond price, volatility or the risk-free rate determined by the market trend) providing a part of the parameters of the payoff function. To recompile the contents of the self-position in conformity with the operational policy is to determine the contents of trading (type of option, strike price and the expiration required for satisfying a target of position tuning as a characteristic value including the payoff value, delta value, gamma value or the theta value as well as the value of the environmental parameter determined as an operational policy,) and to conduct the particular trading.

On the other hand, the investor employs an investment strategy with various styles of payoff function by changing each of the long and short calls, long and short puts and the combination ratio therebetween (type of options of call and put), strike price and the time of maturity.

Conventional option trading support systems, by contrast, as seen in the OTT (Option Trader Training) system of Intelligence Technology Co., Ltd. or the option trading (analysis) system of Japan Unysis Co., Ltd., have such simulation and analytical functions as supporting the calculation of the theoretical price of option, volatility analysis (fluctuation rate of bond price), time decay analysis and the selection of investment strategies from among the existing ones.

Also, a conventional method of option trading support in which the constraint logic programming is applied to the option trading is disclosed in IEEE Expert, Special Issue on Financial Software, August 1987, pp. 42-50. According to this method, if parts of parameters on option trading including the type of trading, the short or long call, bond price, strike price, the expiration, the coupon, the volatility, the risk-free rate, the payoff value, the delta value, the gamma value or the theta value is restricted by the user, the system is capable of responding with a value that can be taken by the remaining independent parameters. This system adopts a method in which reference is made in advance to a table registered with the value of a parameter satisfying the related equation (such as a payoff function) of parameter on the option trading, and a restrained parameter is propagated to a key and the constraint to the remaining independent parameters.

Nevertheless, a problem is posed by the conventional method as will be described. Specifically, in view of the fact that a market maker manages the revenue of the self-position, the function is lacking of supporting the trading decision for restructuring the contents of the self-position in conformity with the operational policy. The problem has been that the calculation of the option price or the volatility is for supporting the operation of the over-the-counter trading of a dealer, and the time decay analysis in a given transaction or the function for supporting the selection of one of the existing strategies, though oriented for the investors lacking the self-position, is not aimed at the dealers.

Also, a method using a constraint logic programming applied to the support of the position management task of a dealer may be utilized for determining the contents of the trading satisfying the target of position tuning coincidental with the contents of the operational policy given for an environmental parameter and a characteristic value. Specifically, an environmental parameter (the bond price, volatility or risk-free rate determined by the market trend) and the characteristic value (such values as payoff, delta, gamma, and theta) may be restrained to tuned position target thereby to determine a parameter (type of option, strike price, the expiration or the like determined by the user) representing the contents of the trading satisfying the restraint of the characteristic value and the environmental parameter. In this case, the problem has been posed that a table data is required to be registered as described above for all the combinations available for the parameters relating to these option tradings.

Another problem has been that in supporting the decision on an optimum trading parameter by a common optimization method, it is necessary to convert the difference between the style of a payoff function of the position suited to the operational policy and that of the payoff function for the position for which the trading has already been executed, into an objective function.

Still another problem has been that even if the above-mentioned objective function has been set, an increased number of trading parameters would require a longer time for optimization.

SUMMARY OF THE INVENTION

Accordingly, an object of the present invention is to provide a method and an apparatus for supporting decision-making capable of supplying more sophisticated information than the one obtained as a result of applying knowhow as well as the processing data by calculation in the decision-making support based on a table type data.

Another object of the present invention is to provide a method and an apparatus for supporting the decision-making easily capable of applying knowhow on a trial and error basis in order to establish and regulate the knowhow.

Still another object of the present invention is to provide a method and an apparatus for supporting the decision-making in which knowhow is evaluated and information on such evaluation is supplied.

A further object of the present invention is to provide a method and an apparatus for supporting the decision-making in which in order to determine an optimum processing to be conducted on the next occasion in response to a particular past processing, behavior or operation (hereinafter collectively called "the processing"), the processing that has been performed is evaluated, a target is formed on the basis of the particular evaluation, and a processing to achieve the target is determined in a series of procedures. In an application to the support for determining a financial transaction (trading) to support the profit management of the self-position of dealer, for example, the determination of a transaction (trading) is supported for restructuring the contents of the self-position in conformity with the operational policy.

A still further object of the present invention is to provide a method and an apparatus for decision-making support for supporting the determination of an optimum supplemental transaction to satisfy the regulation target set for a characteristic value of the position and the environmental parameter efficiency without registering the above-mentioned table data against all the combinations available by trading parameters in advance.

A further object of the present invention is to provide a method and an apparatus for supporting the decision-making capable of converting the difference between the style of the payoff function of the position conforming to the operational policy and that of the payoff function of the position for which the transaction (trading) is already conducted, easily into an objective function in the case where the determination of the optimum trading parameter is supported by a common optimization method.

Still another object of the present invention is to provide a method and an apparatus for supporting the decision-making capable of shortening the time of calculation required for optimization.

In order to achieve the above-mentioned objects, according to one aspect of the present invention, there is provided a method of supporting the decision-making comprising the steps of defining and storing in a memory unit the knowhow on the interpretation of a table type data, applying the defined knowhow and reasoning and evaluating the defined knowhow, wherein (a) information is inputted for energizing a selected one of the steps of defining the knowhow from an input unit, reasoning by application of the knowhow and terminating the system, (b) the information inputted as above is identified and a corresponding processing is executed, and (c) when the processing is other than the termination of the system, the process is returned to step (a).

According to another aspect of the present invention, there is provided a method and an apparatus for supporting the decision-making, comprising the steps of applying the self-position relating to the position and storing the same in information memory, analyzing the characteristics of the evaluation function of the position making up the total sum of the payoff function of individual transactions constituting the particular self-position, storing in advance a regulation target standardized as a qualitative style of the payoff function of the position for each operational policy, setting the particular regulation target for the self-position, selecting the scope and the relationship of trading parameters representing supplemental transactions and the contents thereof as a trading strategy satisfying the set regulation target qualitatively, and calculating an objective function automatically set to assume a minimum value when the regulation target is most satisfied within the scope and relationship of the trading parameters thereby to determine an optimum combination of the trading parameters.

BRIEF DESCRIPTION OF THE DRAWINGS

FIG. 3 is a diagram for explaining a current trading data table.

FIG. 4 is a diagram for explaining a feature data table.

FIG. 5 is a diagram for explaining a feature data definition table.

FIG. 6 is a diagram for explaining a knowhow list table.

FIGS. 7A and 7B are diagrams for explaining the type of rule presentation.

FIG. 18 is a flowchart showing the steps of writing a pattern into a generation pattern table.

FIGS. 19A and 19B are diagrams for explaining an execution rule table.

FIG. 20 is a diagram for explaining a prediction result table.

FIG. 21 is a diagram for explaining a rule group execution result table.

FIG. 22 is a diagram for explaining a general result table.

FIG. 27 is a diagram for explaining a table for managing the point of output in a screen display area.

FIG. 28 is a diagram for explaining a table representing an output graph for each screen.

FIG. 35 is a flowchart showing the steps of processing the rule evaluation.

FIG. 37 is a diagram for explaining an established data storage table.

FIG. 39 is a diagram for explaining an evaluation parameter table.

FIG. 40 is a diagram for explaining an evaluation result table.

FIG. 42 is a diagram for explaining a histogram table.

FIG. 50 is a diagram for explaining a prediction table.

FIG. 55 is a diagram for explaining the position characteristic for the bond option trading using an embodiment of the present invention.

FIGS. 56A and 56B are flowcharts showing the decided transaction management step 4 shown in FIG. 53.

FIG. 57 is a diagram for explaining an environmental parameter table used for the processing in FIGS. 56A and 56B.

FIG. 58 is a diagram for explaining a position table used for the processing shown in FIGS. 56A and 56B.

FIG. 59 is a diagram for explaining a position characteristics table used for the processing shown in FIG. 56B.

FIG. 61 is a diagram for explaining a regulation target pattern table used for the processing shown in FIG. 60.

FIG. 62 is a diagram for explaining the regulation target table used for the processing shown in FIG. 60.

FIG. 63 is a diagram for explaining a regulation target-setting screen used for the processing shown in FIG. 60.

FIG. 66 is a diagram for explaining a transaction strategy selection rule table used for the processing shown in FIG. 65.

FIG. 67 is a diagram for explaining a transaction strategy table used for the processing shown in FIG. 65.

FIG. 69 is a flowchart showing the transaction strategy selection support step shown in FIG. 65.

FIG. 70 is a flowchart showing the transaction parameter regulation step shown in FIG. 64.

FIG. 71 is a diagram for explaining an objective function used for the processing shown in FIG. 60.

FIG. 72 is a diagram for explaining a parameter regulation table by transaction used for the processing shown in FIG. 60.

FIG. 73 is a diagram for explaining a parameter regulation table used for the processing shown in FIG. 70.

FIG. 74 is a diagram for explaining a supplemental transaction table used for the processing shown in FIG. 70.

FIG. 75 is a diagram for explaining a supplemental transaction screen used for the processing shown in FIG. 70.

FIG. 82 is a block diagram showing a decided process regulation target-setting unit shown in FIG. 80.

DESCRIPTION OF THE PREFERRED EMBODIMENTS

Figure 1A:
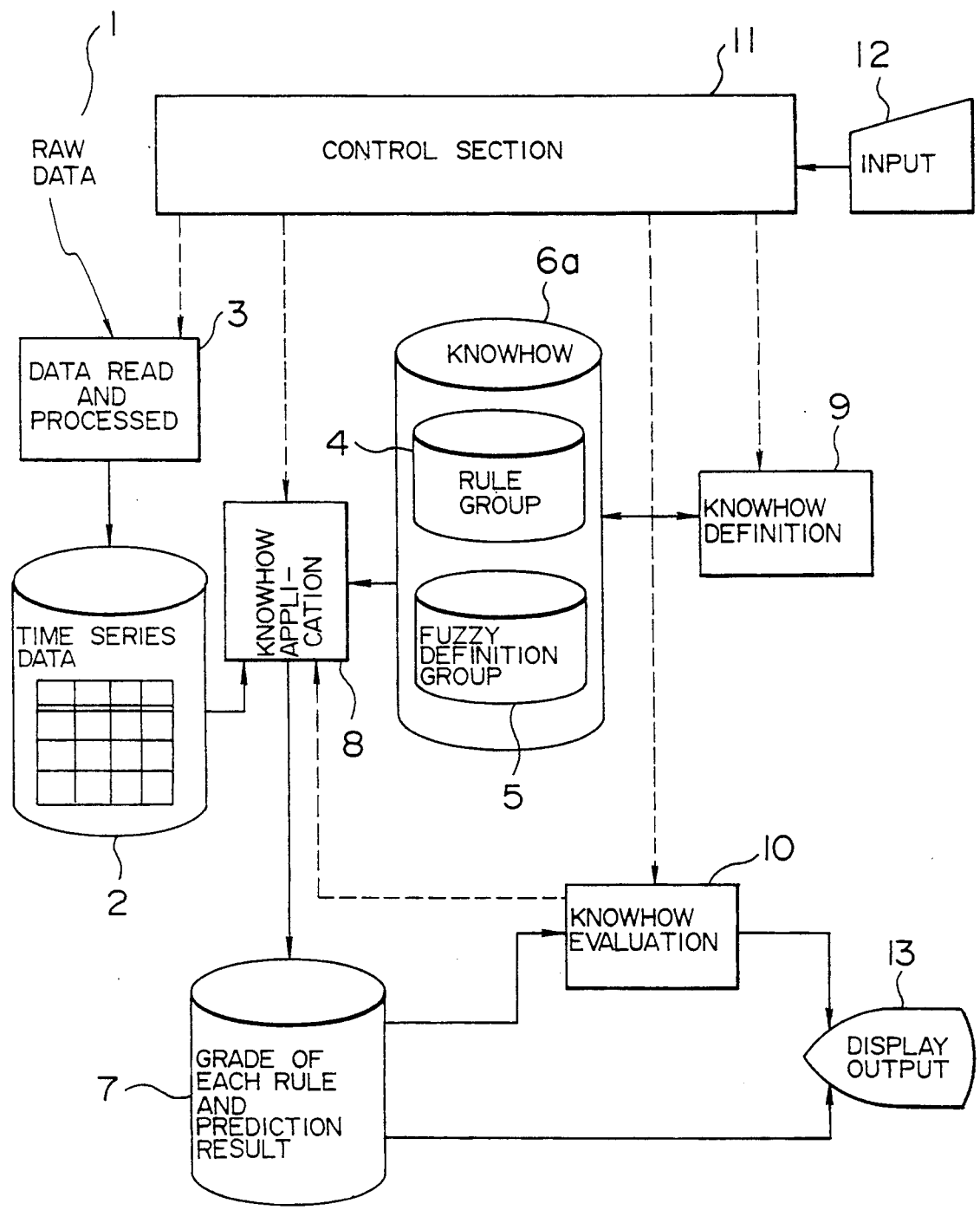
FIG. 1A is a diagram showing a functional configuration of a system for realizing a method of supporting the decision-making according an embodiment of the present invention.

First, a method and system for decision-making support according to an embodiment of the present invention will be briefly described with reference to the functional diagram of FIG. 1A. This embodiment comprises a data-reading and processing section 3 for reading and processing raw data supplied thereto from an external source and preparing a table type of time series data 2, a rule group 4 for presenting various knowhow relating to the interpretation of the table type data 2 in rule form, a fuzzy definition group 5 for presenting this rule interpretation in ambiguous form, a memory unit 6 for storing the fuzzy definition as a knowhow, a knowhow application section 8 for generating the grade of each rule and a prediction result 7 by applying the rule group 4 to a generated time series data 2 and applying the result thereof to an output unit 13, a knowhow definition section 9 for adding, deleting or changing the knowhow 6a stored in the memory unit 6, a knowhow evaluation section 10 for repeatedly energizing the knowhow application section 8 at a past time point of the time series data to process the same data on the basis of the grade of each rule generated and the prediction result 7 and apply the result thereof to the output unit 13, and a control section 11 for discriminating the information applied from the input unit 12 to call a corresponding processing function in accordance with the information thus discriminated and repeat the executions of the same process.

According to the configuration of this invention, the data-reading and processing section 3 for reading the raw data 1 supplied thereto from an external source and preparing a time series data 2 of table type makes it possible to hold various data requiring analysis on a storage medium.

Also, the memory unit 6 for storing as a knowhow the rule group 4 presenting various knowhows relating to the interpretation of the table type data 2 and the fuzzy definition group 5 for ambiguously processing the rule interpretation, is capable of storing a superior knowhow of an expert engaged in conventional data analysis in a storage medium. This rule group 4 is applied to the time series data 2 generated as above to prepare the grade of each rule and the prediction result 7 with the result thereof applied to the output unit 13 by the knowhow application section 8, whereby it is possible to present to the user a superior result of analysis relating to the present conditions of the time series data.

Further, the knowhow definition section 9 for adding, deleting or charging the knowhow 6a stored in the memory unit 6 is capable of updating the knowhow held by the operation of the user. The knowhow evaluation section 10, on the other hand, for energizing the knowhow application section 8 repeatedly at a past time point of the time series data and processing and applying the result of processing the grade of each rule generated and the prediction result 7 to the output unit 13, is capable of presenting to the user the information on the extent to which the contents of the knowhow 6a on the memory unit is reasonable against the past data. The control section 11 for discriminating the information supplied from the input unit 12, calling a corresponding processing function in accordance with the information thus discriminated and repeating this process of execution, is capable of realizing a method of supplying the decision-making for easily performing the application of knowhow on trial and error basis by preparing, evaluating and changing the knowhow.

Further, the knowhow evaluation section realizes a method of decision-making support for supplying the information relating to the knowhow evaluation.

An embodiment of the present invention will be explained below in detail.

This embodiment is for supporting the decision-making on bond sell and buy constituting one of the dealing tasks of the financial institutions including the bank. An outline of this embodiment is such that the daily transaction data on the bond price (which is a table type data) is subjected to various processings, and a future price is predicted from the fluctuations and characteristics of the data. A rule of IF-THEN type is used for interpretation of this data.

Figure 2:
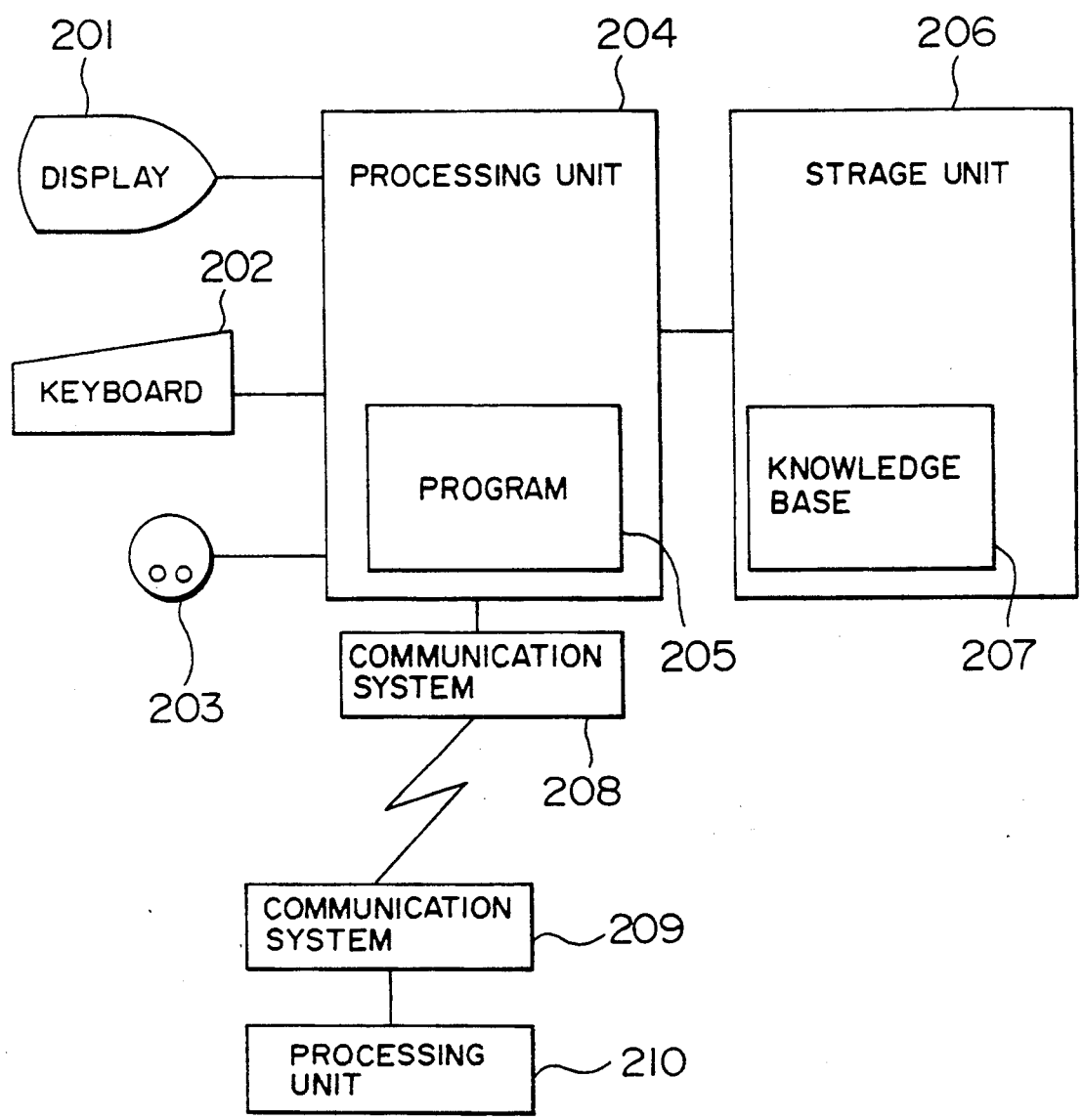
FIG. 2 is a diagram showing a hardware configuration for realizing an embodiment of the present invention.

Steps of processing according to an embodiment of the present invention are shown in the flowchart of FIG. 1A, and a hardware configuration for realizing an embodiment of the invention in FIG. 2. In FIG. 2, a display unit 201 is an output unit for displaying a graph or the like indicating a message or execution result from the system or a change in transaction data. A keyboard 202 is an input unit for entering answers to questions from the system or various parameters A mouse 3 is for receiving as an input the information for energizing various processings by designation on the screen of the display 201. A memory unit 206 is an information storage medium for holding various information including bond transaction data, various time series data processing therefrom, an intermediate result in the process of reasoning by the system and other tables such as for the final result. The memory unit 206 also has a knowledge base 207 for storing a rule of IF-THEN type. A communication unit 208 is for receiving transaction data sent thereto real time through a communication channel from another communication unit 209 connected thereto. The communication unit 209, which is connected to a processing unit 210 making up another computer unit, is supplied with transaction data from the processing unit 210. A processing unit 204, which is in charge of controlling these units, is adapted to write various data into or read various data from these units or inspect them by a program 205 stored therein.

Returning to FIG. 1B, the steps of processing will be described in detail. First, upon energization of the system, an instruction is given to the communication unit 208 for reading data The communication unit 208 then reads transaction data from another processing unit 210 through another communication unit 209 and stores the transaction data on the memory unit 206. The transaction data thus stored are then stored as a table type data described in a raw transaction data table 300 shown in FIG. 3 (step 101). As shown in FIG. 3, the raw transaction data table 300 includes the columns of a table arrangement number 301, a "date" 302 indicating the date of transaction, an "open price" 303 indicating the starting transaction price of the day, a "high quotation" 304 indicating the highest transaction price of the day, a "low quotation" 305 indicating the lowest transaction price of the day, and a "closed price" 306 indicating the final transaction price of the day. These data are indicated in unit of yen for all of the open price 303, the high quotation 304, the low quotation 305 and the closed price 306. Also, when the raw transaction data 300 is generated, the arrangement number 301 for the last day of storing the data is stored in an area of the origin day for reasoning 350 and an initial area of the origin day for reasoning 360.

Upon completion of storing the raw transaction data table 300, the raw transaction data table 300 is referred to, and by processing this value, a feature data table 400 shown in FIG. 4 is prepared (step 102). This step of generation is effected by the use of a feature data definition table 500 shown in FIG. 5. In the definition of 501 in FIG. 5, for example, the feature data called "stick" is determined by the "closed price" less the "open price". The indication '(0)' represents the difference between the arrangement number of the table type data of the stick to be determined and that of the reference data. As a result, in the definition of 501, the feature data "stick" is interpreted as the "open price" of the day less the "closed price" of the day. In the definition of 502, on the other hand, the feature data "gap" is the "open price" of the day less the "closed price" of the preceding day. The items in the feature data definition table 500 are taken out and interpreted sequentially from the top column to generate the feature data table 400. In the process, the feature name 310 is accessible from the name 310 and the arrangement number to permit the same handling as the raw data name 310. By doing so, it is possible to define still another feature by referring to the value in the feature data table.

The process described above generates and stores a required table type data (hereinafter called "the time series data" since the table type data is interpreted as a time series data according to the present embodiment).

As the next step, the knowhow stored in the knowledge base 207 is analyzed to prepare a knowhow list table 600 shown in FIG. 6 (step 103). This table, representing the ID of individual knowhows by chart (type of interpretation of the time series data), includes a chart name 601 and a knowhow (hereinafter called "the rule") number storage area 602 associated therewith. The chart called "candle stick (one)", for example, indicates that there are rules '101', 102', '103' and so on. Now, explanation will be made about a rule stored in the knowledge base 207. The "rule" here indicates the knowledge as to how an exert interprets the data existing in the raw transaction data table 300 and the feature data table 400. The method of this interpretation is classified into types different in the viewpoint of interpretation called in various charts according to the difference in the time series data referred to at the time of interpretation. The rule takes the type of presentation shown in FIGS. 7A and 7B stored in IF-THEN type as shown in the same diagrams. As an example of description, three rules 710, 720 and 730 are described. Each of these rules includes a rule number 701, an associated chart name 702, a rule name 703, a condition part of a rule 704 and a execution part of a rule (a predicted price change value 705 and a message 706). Two type of items including a pattern indicating the establishment of another rule and the comparison of feature data are described in the rule condition part. The interpretation of the rule 710 belongs to a chart "'127' in rule number with 'candle stick (one)', and has a rule name 'upper cross'. If the value at the time point '0' of the time series data called the 'stick' is equal to '0' with the value 'upper wick' being '6' or more at the time point '0' of the time series data and the value 'lower wick' being '18' or more at the time point '0' of the time series data, then the predicted value of the bond price fluctuates in the range from between −0.05 and 0.10 yen. Further, when this condition is established, the message is "Indicate 'upper cross'". The meaning of the time point '0' on the time series data is that a time point on the time series data to which the application of the reasoning is intended is referred to as '0', so that if it is desired to access data immediately preceding to this reference, description is made by a numeral '−1' as relative to the reference. In view of the fact that according to this embodiment the transaction data on the bond price is stored daily as a time series data, the interpretation of the condition of the same rule could be actually understood more easily by the indication "if the day's 'stick' is '0' or more with the day's 'upper wick' 0.06 or more and the day's 'lower wick' 0.18 or more, then . . . ". An interpretation in similar fashion of the rule 702 results in an instruction "The rule of what is called the bull trend associated with a chart called the moving average stick is such that the bond price of the next day will fluctuate by between 0.00 and 0.10 yen as compared with the day's level on the assumption that the day's shorter moving average is more than that of the preceding day, the day's middle moving average is more than that of the preceding day, the day's longer average is more than that of the preceding day, and that the condition of bull order is established on both the particular day and the preceding day. If such a condition is established, indicate bull as a message." Also, the condition 'bull order' 707 stored in the rule condition section 704 of the rule 720 is defined in the rule 730. The interpretation of the rule 703 is for "the rule of what is called the bull order associated with a chart called the moving average stick and is such as to indicate the bull order as a message if the day's shorter moving average is more than the day's middle moving average and if the day's middle moving average is more than the day's longer moving average." According to this rule, the predicted price change value 705 is not specifically indicated. This means that the price is incapable of being predicted even if such a condition as this is established. As will be seen from these examples of description, each rule is classified in the framework called a chart (which may be considered a rule group). For this reason, a rule check table 600 with each rule group corresponding to an associated rule number is created. The object of this table is to display the rule check information for each rule group subsequently and to place the rule used for reasoning at the head of the list. A table is prepared in accordance with the order of rule storage in the knowledge base 207 as an initial value of the rule list. This table is created by fetching the rules one by one from the knowledge base 207, discriminating the chart name 702 described in the rules, and storing it sequentially in the rule number check area 602 corresponding to the chart name column 601 of the rule check table 600.

Upon analysis of the rule and creation of a rule check table, the reasoning is executed as the next step (step 104).

The reasoning at this step is executed by setting a reference of reasoning at the latest date (the final date for which a data is available) on the time series data. As shown in the raw transaction data table 300, for instance, assume that the data has the latest date of August 3. The value '100' providing the value of the arrangement number 301 where the data for the particular date is stored is stored in the area of the origin day for reasoning 350. The steps of processing the reasoning will be described in detail below.

Figure 8:
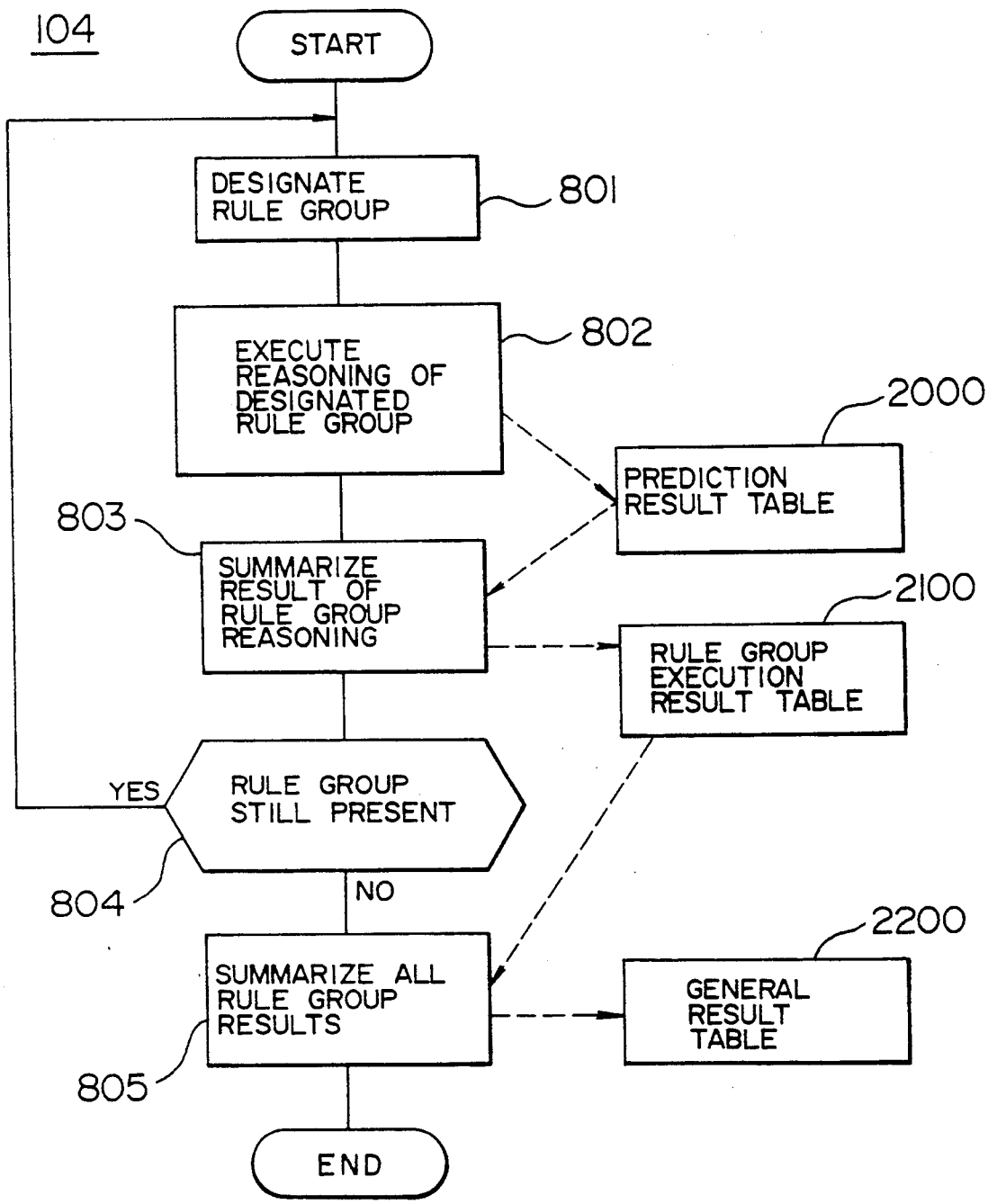
FIG. 8 is a flowchart showing the steps of reasoning procedure.

A flowchart indicating the steps of processing the reasoning is shown in FIG. 8. First, a chart name (rule group) capable of being handled by the system is taken out (step 801). This step is realized by taking out the items described in the chart name 601 of the rule check table shown in FIG. 6 one by one from the left side. The chart name 'candle stick (one)', for example, is taken out in the first place.

Figure 9:
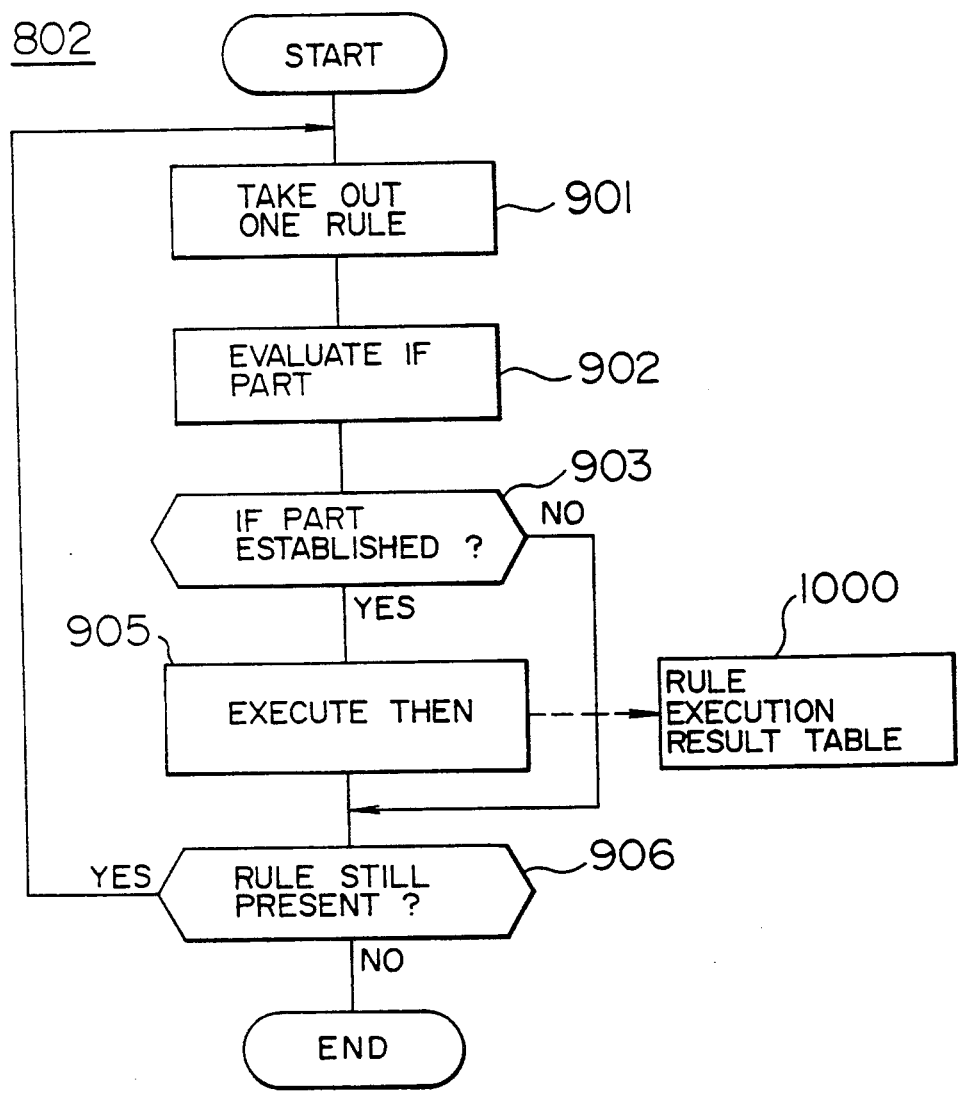
FIG. 9 is a flowchart showing the steps of reasoning procedure for the rules.

Then, the reasoning is executed by the use of a rule associated with the chart taken out at the step 801 (step 802). This provides the execution of reasoning of the rule group. This process will be described in more detail with reference to the flowchart of FIG. 9. First, the rule associated with the chart designated at step 801 is taken out from the knowledge base 207 (step 901). This is effected by taking out the rules of the associated chart name 702 coincident with the designation at step 801 sequentially from the knowledge base in the rule presentation shown in FIG. 7.

After taking out a rule, the rule IF part 704 is evaluated (step 902). This step of evaluating the rule IF part, as explained below, is to check to see whether each condition described in the general rule IF part 704 is established or not. After that, the establishment or not of the rule IF part 704 is decided (step 903), and if it is established, the rule THEN part associated therewith is executed (step 905) while checking to see whether there is still any rule not evaluated (step 906). If there remains any such rule, the process is returned to step 901 to repeat the steps by taking out the next rule from the knowledge base 207. In the case where the rule IF part is not established at the decision step 903, on the other hand, the process is passed to step 906 without processing the execution step 905 of the rule THEN part. If the decision step 906 decides that there does not remain any rule associated with the chart (rule group), the reasoning execution step 802 of the rule group is ended.

Figure 10:
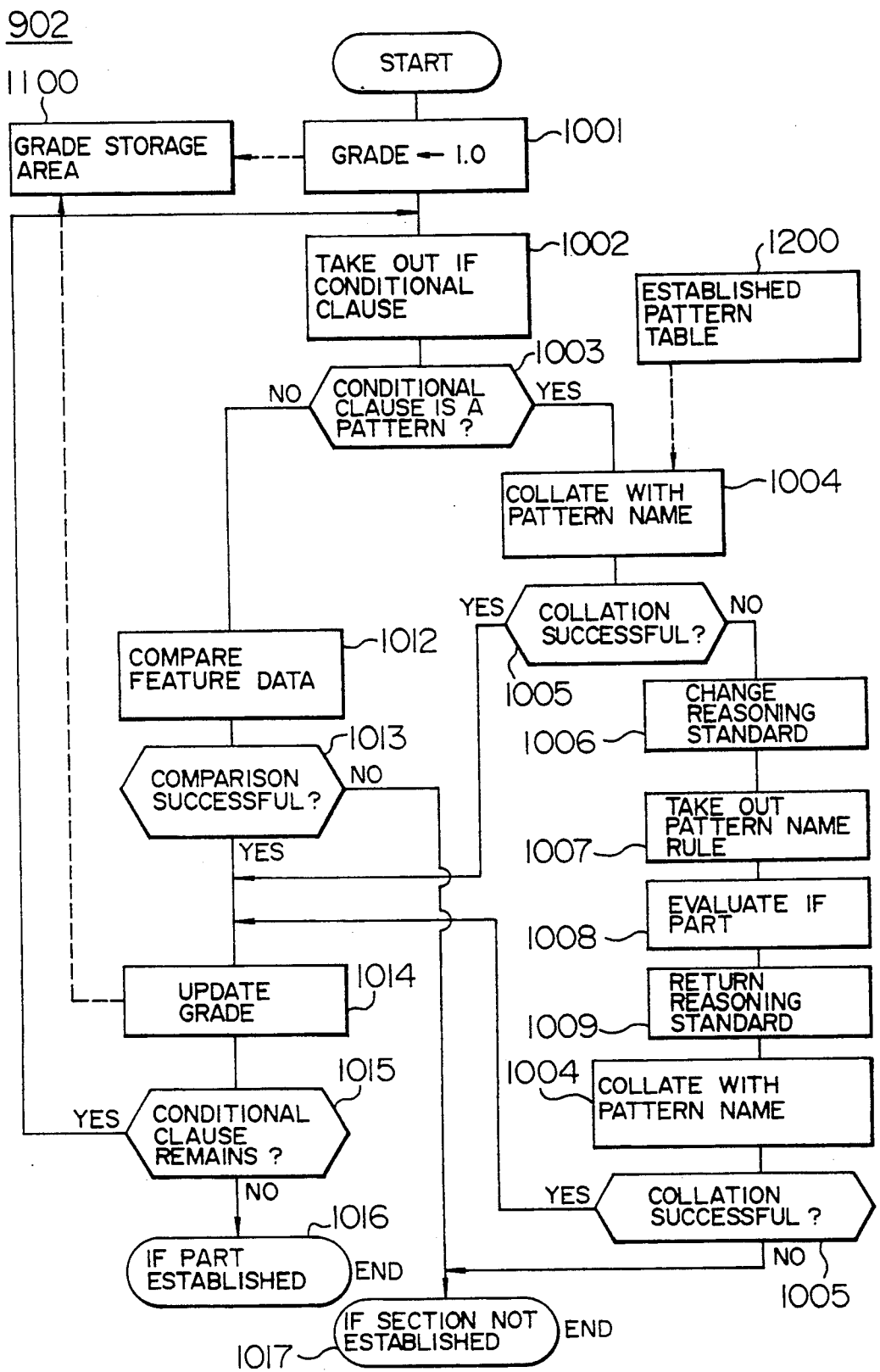
FIG. 10 is a flowchart showing the steps of evaluation of an IF part of a rule.
Figures 11, 12:
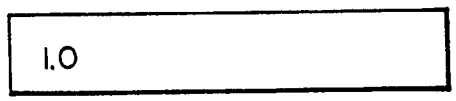
FIG. 11 is a diagram for explaining a grade storage area.
FIG. 12 is a diagram for explaining an established pattern table.

The procedure for the evaluation of the rule IF part 704 of step 902 will be described with reference to the flowchart of FIG. 10. First, a grade storage area 1100 is created and '1.0' is set (step 1001). This grade storage area is a single one for storing a real number as shown in FIG. 11 and is created on the memory unit 206. Then, the conditional clauses of the rule conditions described in the rule IF part 704 are taken out one by one (step 1002). In the rule description case 710, for example, the 'stick (0)=0' is first taken out as a conditional clause. Then, it is decided whether the conditional clause thus taken out is a pattern or not (step 1003). The "pattern" here is indicative of a type of a description form of the conditional clause and corresponds to the 'bull order (0)' and 'bull order (−1)' on the fourth and fifth ranks from above in the rule IF part 704 of the rule description example 720. In this way, it indicates a conditional clause to the effect that "if a pattern called a bull order (representing the establishment or not of another rule) is established". Also, the definition of the pattern called the bull order is described by the rule 730. The conditional clause of the remainder is of such a type as used for comparison of feature data. Two types of items including pattern and comparison of feature data are thus describable in the rule condition part.

In the case where a conditional clause is a pattern, it is checked whether the table contains a corresponding pattern with reference to the established pattern table 1200 (step 1004). The object of the established pattern table 1200 is to prevent repeated execution for decision of a rule once it is established. Even when the same pattern is described in the rule condition section for a plurality of rules, the definition rule for the particular pattern, once executed, is written into this table, so that the establishment of the pattern is decided by reference to this table for a second reference rule. In this way, the established pattern table 1200 is for storing the result of pattern decisions which have been found already established by the execution of a rule. This configuration, as shown in FIG. 12, is comprised of a pattern name 1201 which has been found established, a date 1202 indicating the displacement of the date on which the pattern is established from the arrangement number in the present area of origin day for reasoning 350, and a grade of establishment 1203 of the particular pattern. In the example shown, as a result of execution of another rule, it is already indicated that the pattern called the bull order is established with the grade of 0.8 on the same date as the present origin day for reasoning. This pattern collation is effected by comparing the pattern name 707 described in the conditional clause taken out at step 1002 and the value in the area of origin day for reasoning 350 less the value in the initial area of origin day for reasoning 360 plus the value of the date 708 surrounded by '(',')', respectively with the pattern name 1201 and the data 1202, and those coincidental with each other are searched for from the table 1200. If such coincidental items are found, the collation is regarded successful, and vice versa (step 1005). If the collation is successful, the value of the grade 1203 on the corresponding line on the generated pattern table 1200 is taken out, and the process is passed to step 1014 for updating the grade. If the pattern collation ends in failure, on the other hand, the value in the area of origin day for reasoning 350 is rewritten in accordance with the date 708 of the pattern to be collated. This rewriting process is effected by subtracting the value of the date 708 from the value in the area of origin day for reasoning 350 followed by setting again in the area of origin day for reasoning 350.

As the next step, a rule defining the pattern to be collated is found from the knowledge base 207 and taken out (step 1007). This step is to search for and take out a rule having a rule name 703 identical to the pattern 707 to be collated. Upon completion of taking out such a rule, the evaluation and execution are effected in relation to the particular rule (step 1008). This step may be performed through the same procedure as the steps 902, 903 and 905 at step 802 for reasoning of the rule group shown in FIG. 9. Specifically, in the case where a pattern 707 to be collated is lacking in the established pattern table 1200, a rule defining the particular pattern is found and checked for the executability. If the rule is found executable, it is executed and the particular pattern is written into the generated pattern table. After that, the value in the area of origin day for reasoning 350 is restored to the original value as before change at step 1006 (step 1009). Then, a step similar to step 1004 checks to see whether a corresponding pattern exists already in the established pattern table 1200 with reference to the same thereby deciding whether the collation is successful or not (step 1005). If this collation is a failure, the rule IF part evaluation step 902 is ended for ending the step regarding the IF part of the rule unestablished (step 1017). When the collation is a success, on the other hand, the process proceeds to the grade updating step 1014.

In the case where the step 1003 for deciding the type of a conditional clause decides that a particular conditional clause is not a pattern (but a comparison of feature data), then the comparison of feature data of the conditional clause is processed (step 1012). The steps of processing the comparison will be described later. In the case where after deciding the result of step 1012 (step 1013), the conditional clause of comparison is regarded established successfully, the value in the grade storage area 1100 is changed by the use of the grade involving the success (step 1014). The updating process of the grade storage area is for rewriting the value of the area to a smaller value to the extent that the smaller value is one updated from the grade stored. Specifically, the value held in the grade storage area assumes the smallest grade of all the conditional clauses described in the rule IF part 704 being checked for executability. The process is then returned from step 1014 to step 1002 for taking out and evaluating the conditional clause next to that described in the rule IF part 704. If a conditional clause exists no longer, the IF part is regarded established and the process of the rule condition section 704 is ended (step 1006). In the case where the feature data comparison step 1012 is not established with the decision thereof a failure (step 1013), on the other hand, the rule IF part is regarded unestablished thereby to end the rule IF part evaluation step 902. In this way, the conditional clauses described in the rule IF part are checked sequentially for establishment or not, and if there is any conditional clause found not established, the rule IF part is decided to be unestablished.

Figure 13:
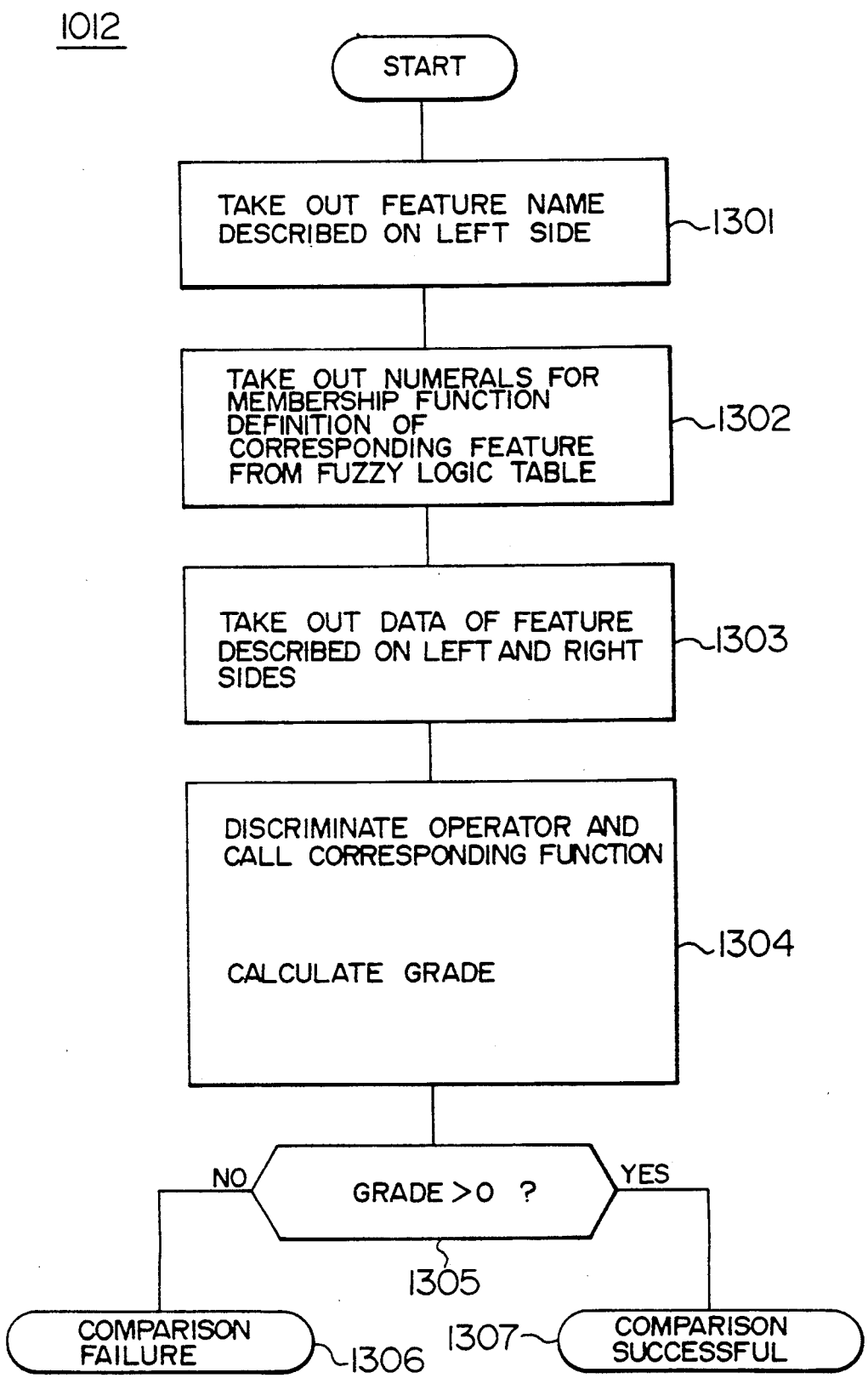
FIG. 13 is a flowchart showing the steps of procedure for comparing feature data in the IF part of the rule.

The steps of processing the comparison of feature data at step 1012 will be explained with reference to the flowchart of FIG. 13. As a prerequisite, let us confirm that the type of the conditional clauses taken out here is satisfied by all the conditional clauses of the rule IF part 704 included in the examples of rule description 710 shown in FIG. 7. First, the feature data name described on the left side of the conditional clause taken out is picked up (step 1301). Assuming that the conditional clause satisfies the relationship Upper wick (0) ≧ '0.06' for example, the upper wick is taken out. As the next step, a numeral for defining the membership function corresponding to the feature name thus taken out is collected from the fuzzy table 1400 (step 1302). In the case of the conditional clause mentioned above, the range 1402 providing the grade 0.5 corresponding to the upper wick is taken out, and therefore '0.03' of 1403 is collected. The feature data or the constant described on the left and right sides of a conditional clause is taken out (step 1303). Take the conditional clause mentioned above as an example. '0.05', for instance, is taken out as the left side, and '0.06' as the right side. The steps of taking out the value of the feature data are realized by taking out the data at a point of arrangement number of the value stored in the area of origin day for reasoning 350, less the relative date surrounded by '(',')' described immediately following the feature data name of the conditional clause in the raw transaction data table 300 or the feature data table 400 having a feature data name 310 coincidental with the feature name involved.

Further, the type of the comparison operator is discriminated and the grade computation of the related comparison operator is executed to determine the grade (step 1304).

Figures 14, 15:
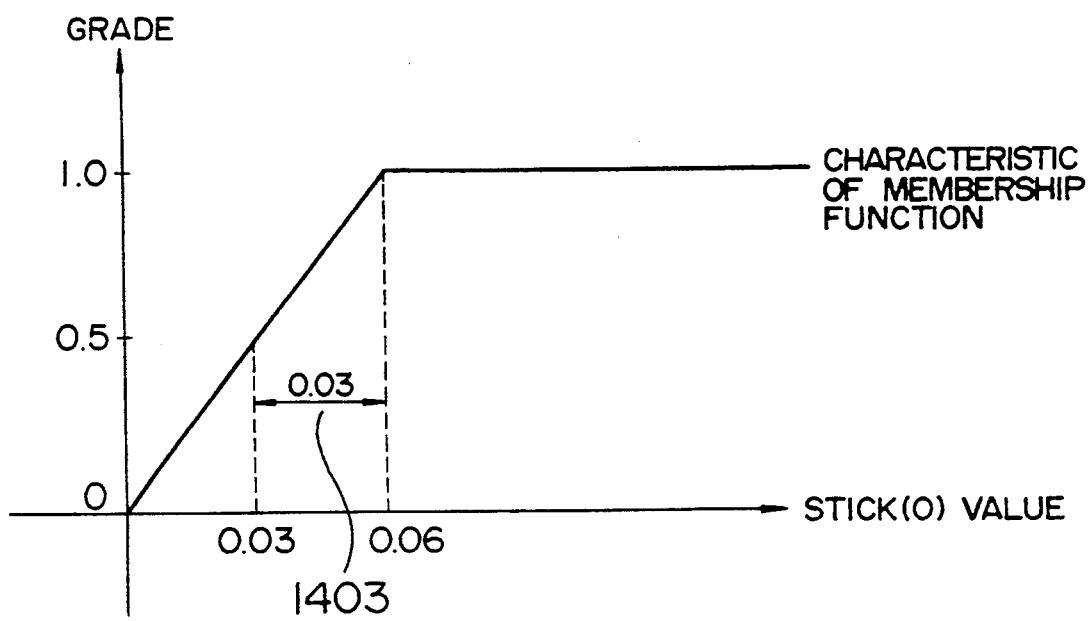
FIG. 14 is a diagram for explaining a fuzzy logic table.
FIG. 15 is a diagram for explaining the calculation of the grade of membership function.

The steps of determining the grade will be explained at this juncture by the use of the fuzzy logic table 1400 shown in FIG. 14 and the characteristics graph of the membership function shown in FIG. 15. As seen from FIG. 14, the fuzzy logic table 1400 is comprised of a feature name 1401 and a range 1402 providing the grade 0.5. The range 1402 associated with the grade 0.5 is defined for each feature data name 1401 by a numeral determining the characteristic of the membership function for processing the comparison. Assume, for example, that the conditional clause satisfies the relationship Upper wick (0) $\geq$ '0.06' and the value of the 'upper wick (0)' is '0.05'. Let us consider this conditional clause by replacing the above-mentioned relationship with '0.05' $\geq$ '0.06'

This condition is generally considered not to be satisfied. According to the fuzzy logic used in this embodiment, such a condition as this is not merely decided unestablished but the degree of establishment of this condition (grade) is expressed by a numeral in the range from 0.0 to 1.0. Specifically, if the value of the upper wick (0) is '0.06' or more, this conditional clause is established at the grade of 1.0. If it is '0.05', however, the grade is not considered 0.0, but the inclination of change in grade is determined by the use of the value described in the range 1402 providing the grade of 0.5. Taking the relationship Upper wick (0) $\geq$ '0.06' as an example, a graph representing the characteristic of the particular grade is shown in FIG. 15.

Figure 16:
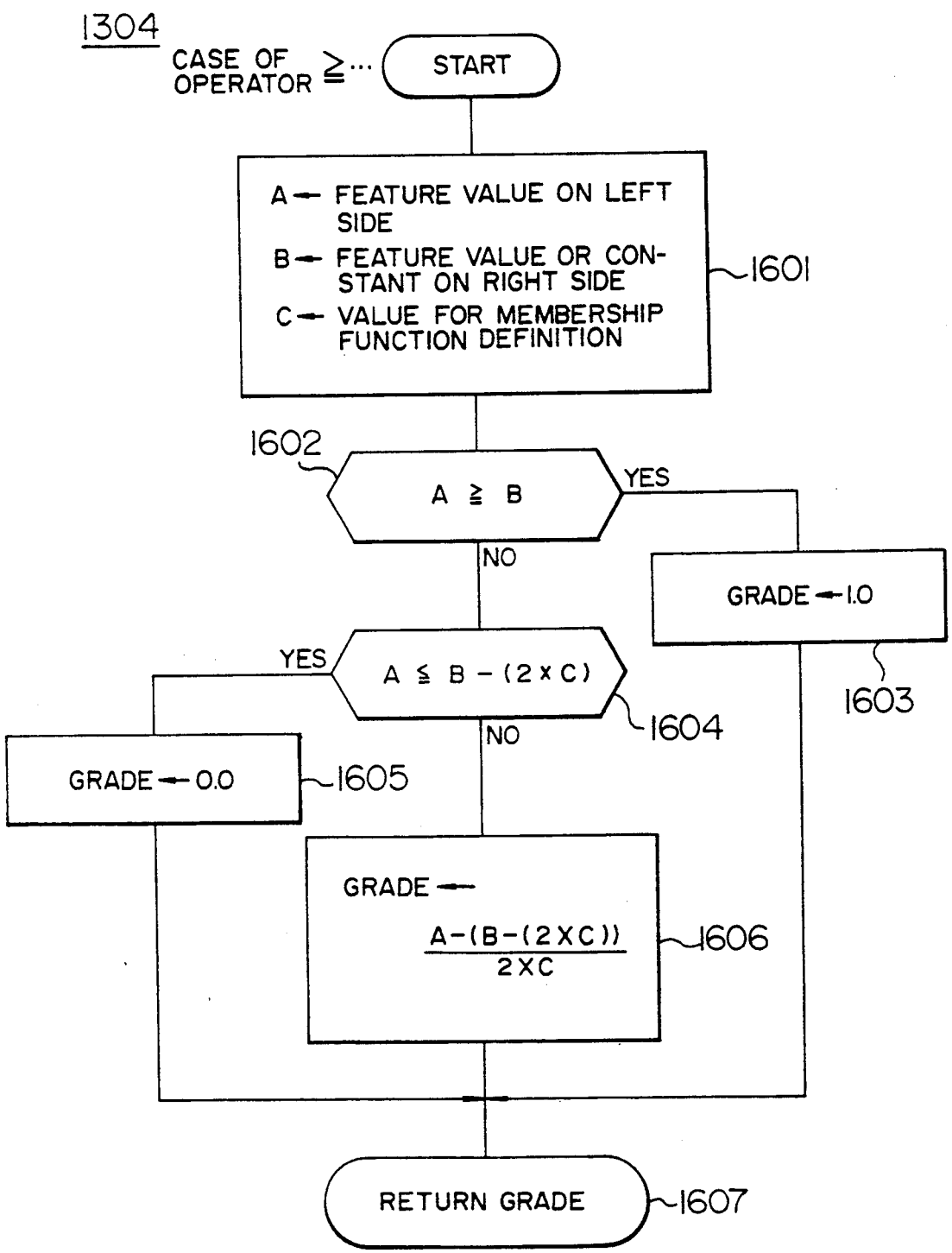
FIG. 16 is a flowchart showing the steps of processing for determining the grade of comparing feature data in the IF part of the rule.

The specific steps of processing the grade calculation at step 1304 will be explained with reference to the flowchart of FIG. 16. This flowchart is related to the case where the comparison operator is '$\geq$'.

First, the value of the feature data on the left side is set to a program variable A, the value of the feature data on the right side (which may alternatively be a constant) to a program variable B, and the value for defining the membership function taken out at step 1302 to a program variable C, respectively (step 1601). If the value of the program variable A is more than that of the program variable (step 1602), the grade is considered as 1.0 (step 1607), thereby ending the process (step 1607). In the case where the decision step 1602 is not established, on the other hand, decision is made as to whether the value of the program variable A is smaller than the value of the program variable B less the value of the program variable C multiplied by two (step 1604). If so, the grade is determined as 0.0 (step 1605), thus ending the process (step 1607). Otherwise, the calculation shown at step 1606 is effected, and with this value as a grade, the process is ended (step 1607). In the case of a conditional clause having the relationship Upper wick $\geq$ '0.06' for example, the value of the program variable A is '0.05', that of the program variable B '0.06', and that of the program variable C '0.03'. The step 1606 is thus processed with the grade determined as 0.83.

The flowchart shows the case in which the comparison operator is '$\geq$'. By introducing some change in line with the same concept as adapted in the above-mentioned steps, however, the comparison operators '$\geq$' and '=' are realizable, which will not be described in detail.

Decision is made as to whether the grade thus determined is larger than 0.0 (step 1305), and if so, the feature data comparison step 1012 is considered successful (step 1307). If the grade is 0.0, the feature data comparison step 1012 is regarded as a failure (step 1307), thus ending the process. Now, the explanation about the steps of processing the comparison of feature data is over.

Figure 17:
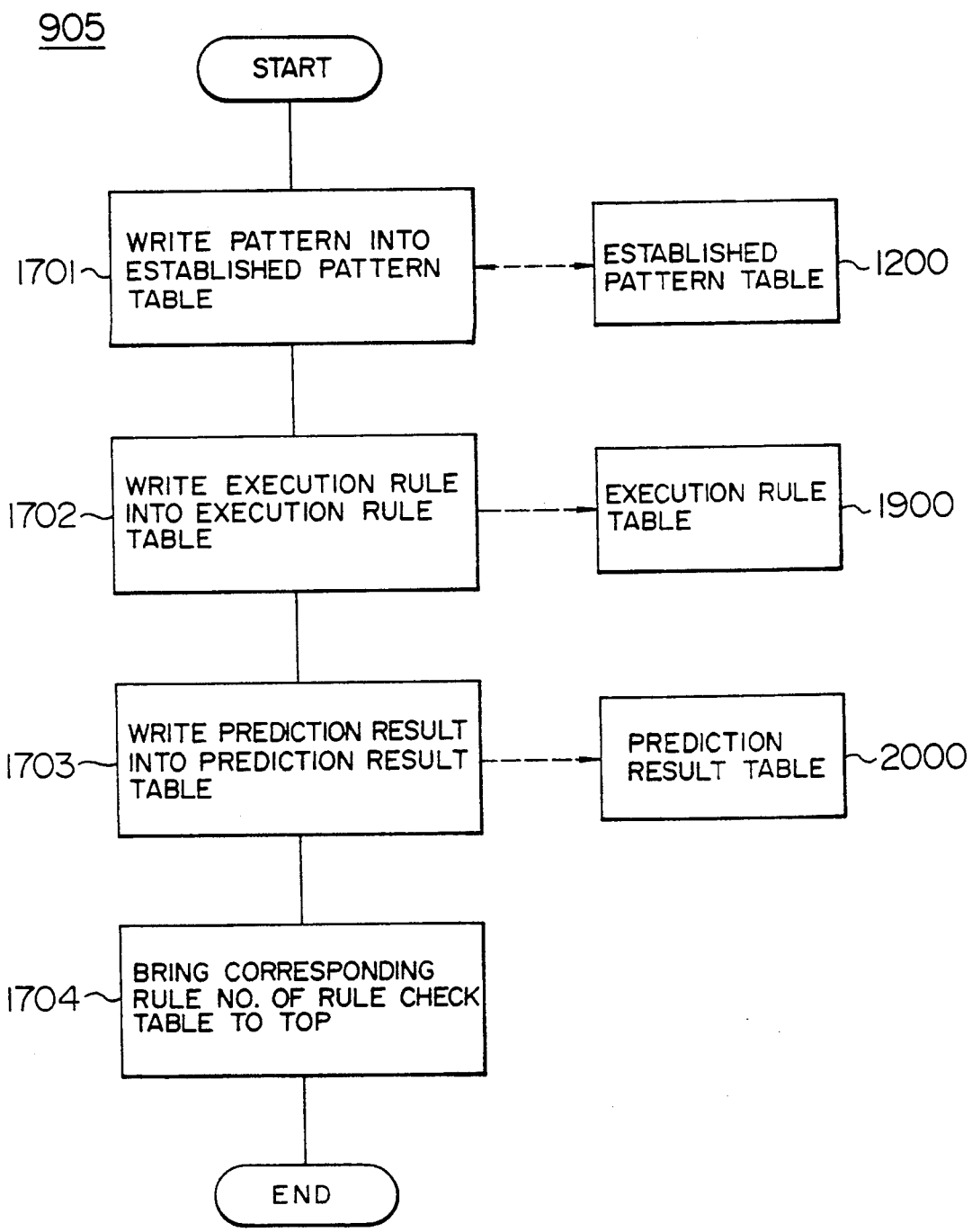
FIG. 17 is a flowchart showing the steps of executing a THEN part of the rule.

Returning to FIG. 9, the steps of executing the rule THEN part at step 905 will be described in detail. This process is the one conducted when the rule IF part is established. Specifically, it is for analyzing and executing the presentation described in the rule THEN parts 705 and 703. Let us explain this process with reference to the flowchart of FIG. 17. First, with the establishment of the rule IF part, the pattern defined by the particular rule is registered in the established pattern table (step 1701). The steps of this processing will be explained with reference to the flowchart of FIG. 18. The rule name 703 indicating the pattern name defined by this rule and the value of the grade storage area 1100 set by the rule IF part evaluation 902 are taken out (step 1801). Then, the date on which the same rule is energized is taken out (step 1802). The date of rule energization represents the relative difference between the value set in the area of origin day for initial reasoning 360 and that in the area of origin day for reasoning 350. If this date is set, for example, to '100' initially and now stands at '95', the actual date is determined as '$-5$' ($=$'95'$-$'100'). In this way, the date is calculated by subtracting the value in the initial area of origin day for reasoning 360 providing a reference date for the time point of taking out the rule at step 901 from the value in the area of origin day for present reasoning. By so doing, the requirement is met for the recursive evaluation of the rule IF part at step 1008. In the next step, it is decided whether or not a pattern having the same name and date as taken out at steps 1801 and 1802 is present in the generated pattern table 1200 (step 1803). This decision is effected in such a manner that the pattern 1201 coincidental to the rule name taken out is searched for, and becomes successful if the date 1202 on that particular line coincides with the date taken out as mentioned above. If as a result of the decision such a pattern already exists in the generated pattern table 1200, the grade taken out at step 1801 is compared with that in the table (step 1805), and if the value of the grade taken out at step 1801 is greater, the grade in the table is rewritten into the particular greater value (step 1806). Specifically, when a plurality of different rules define the same pattern, the value associated with the greatest grade is determined as appropriate. In the case where the step 1803 decides that a corresponding pattern is lacking in the generated pattern table, the name of the rule, the date and the value of the grade are additionally written into the generated pattern table 1200 (step 1804). Upon completion of the aforementioned steps, the number of the particular rule and the established grade of the rule IF part are written into the execution rule table 1900 (step 1702). The execution rule table 1900 includes, as shown in FIG. 19A, a column 1901 for storing the rule number executed and a column 1902 for storing the established grade of the particular rule IF part. This table has stored therein a history of the rule used (actually ignited) in the execution of reasoning. In the next step, the change prediction width of the bond price described in the rule THEN part 705 is taken out, so that the particular rule number, the value of the established grade 1100 of the rule IF part 704 and the value of the change prediction width are written into the prediction result table 2000 (step 1703). In view of the fact that there are as many prediction result tables 2000 as the charts (rule group), however, such a value is written into the table associated with the chart name (rule group) under reasoning as designated at step 801 in FIG. 8. The prediction result table 2000 includes, as shown in FIG. 20, an area 2001 indicating a chart (rule group), a column 2002 for storing the rule number, a column 2003 for storing the established grade of the rule IF part, a column 2004 for storing the low limit of reactive prediction width of the price and a column 2005 for storing the high limit thereof.

After these items are written into the prediction result table, the particular rule number is placed at the top in relation to the row 601 for the chart (rule group) name under reasoning of the rule check table 600 with the remaining rule numbers 602 shifted accordingly (step 1704). By doing so, the rule number actually ignited is placed upward of the rule check numbers 602.

Figure 23:
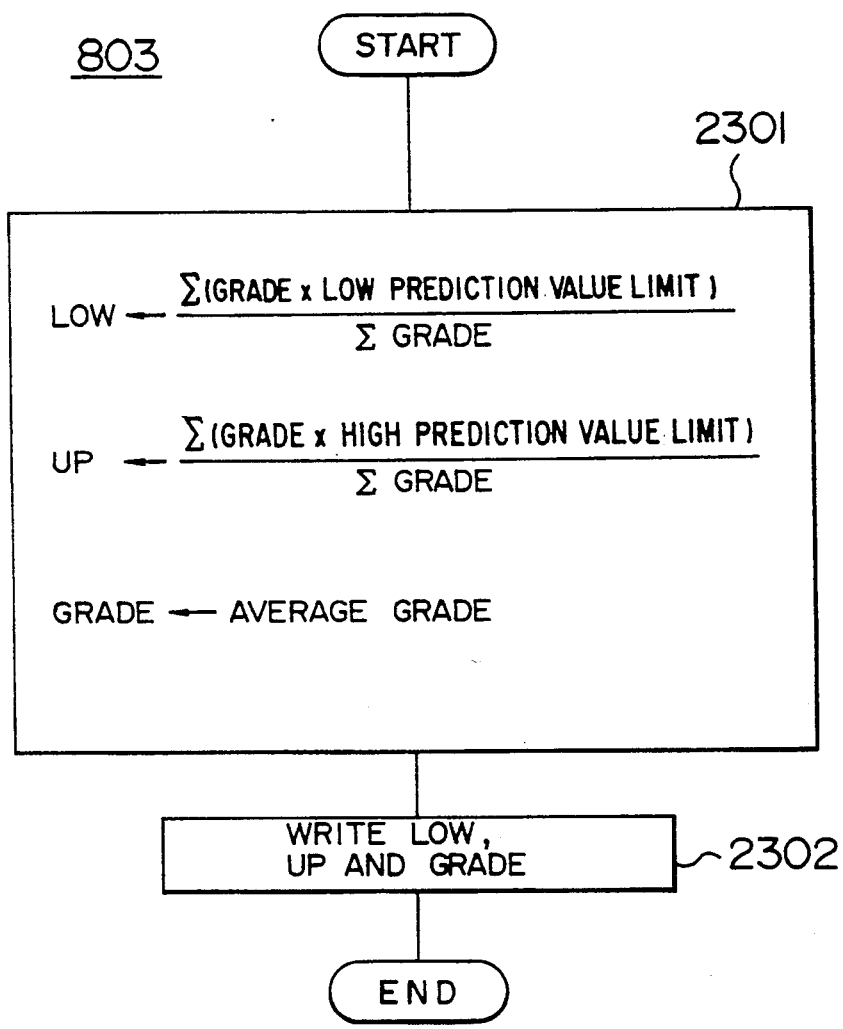
FIG. 23 is a flowchart showing the steps of processing for synthesizing a prediction price.

The steps of processing mentioned above executes a reasoning of the chart (rule group) (step 802). After that, the prediction result table 2000 is referred to for preparing a rule group execution result table 2100 summarizing the prediction result as a chart (rule group) (step 803). The steps of processing the summarization of the rule group execution result will be explained with reference to the flowchart of FIG. 23. First, with regard to the prediction result tables 2000 having a corresponding chart (rule group) in column 2001, the result written in the table is calculated by application of the process indicated by step 2301. As shown in the same step, once the sum of the grades 2003, the sum of the products of the grade 2003 and the low limit of predicted value 2004, and the average of the grades are determined, these steps are easily realizable. Specifically, the weighted average of the predicted low limit value 2004 is set to the program variable LOW, that of the predicted high limit value 2005 to the variable UP, and the average of the grades 2003 to the variable GRADE. The variables GRADE, LOW and UP thus determined are written together with the chart (rule group) name 2101 into the grades 2102, 2103 and 2104 respectively of the rule group execution result table 2100 (step 2302).

Upon complete summarization of the result of reasoning of the rule group (step 803), step 804 checks for any rule group not yet executed. If there is any rule group not yet executed, the process is passed to step 801 aimed at the particular rule group. If all the rule groups have been completely executed as a consequence, the rule group execution result table is referred to as the next step to determine a prediction result for the whole system (step 805). This process is effected by the same method as the process shown at step 803. As compared with the step 803 which uses the prediction result table 2000 as an input table and the rule group execution result table 2100 as an output table, however, the step 805 is such that the rule group execution result table 2100 is employed as an input table and the general result table 2200 as an output table. The general result table 2200 has determined therein, as shown in FIG. 22, the grade 2201, the low limit of predicted value 2202 and the high limit of predicted value 2203 indicating a predicted general price change of the system.

Figure 1B:
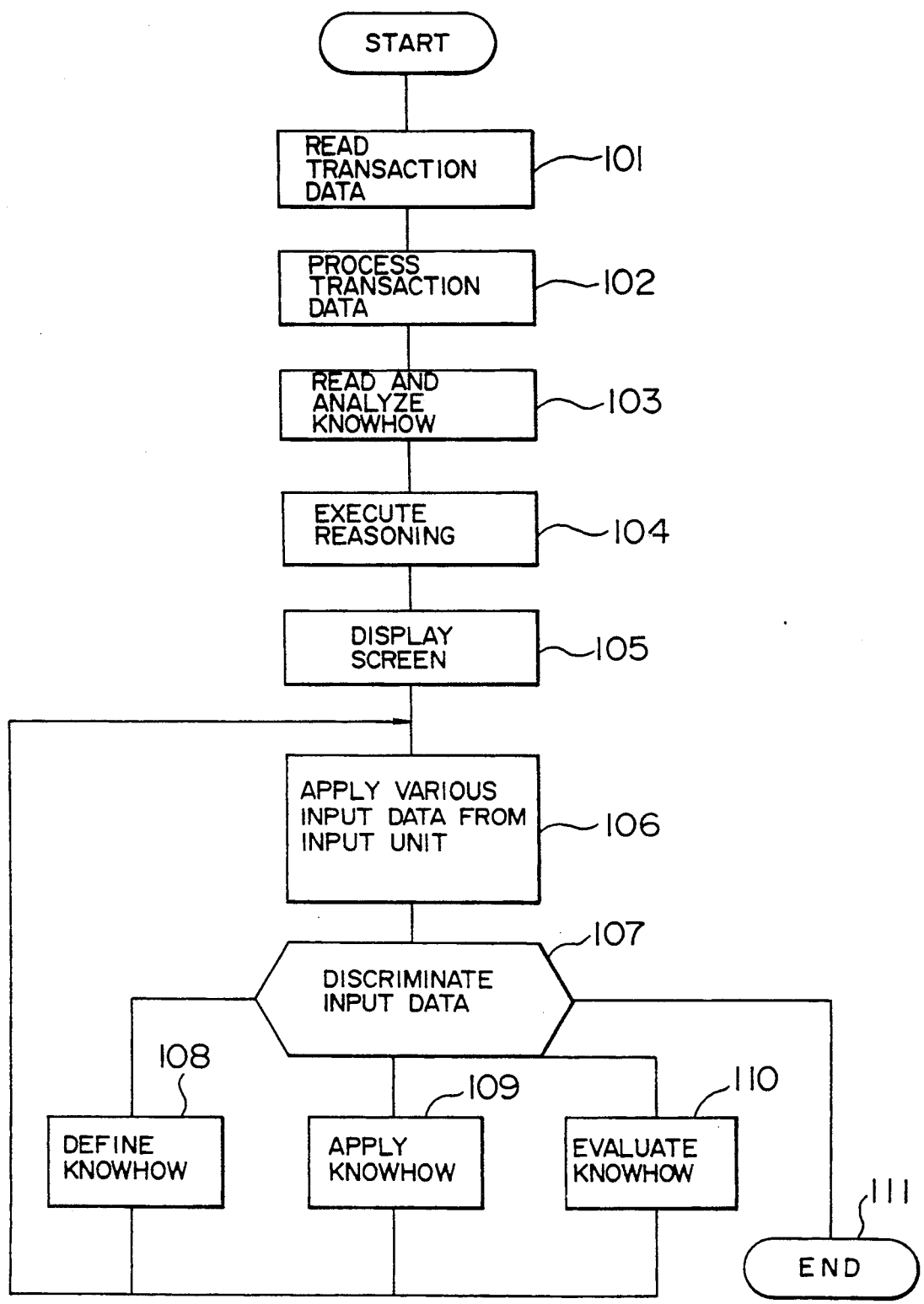
FIG. 1B is a flowchart showing a method of supporting the decision-making according to an embodiment of the present invention.

The foregoing description covers the whole execution of reasoning at step 104 shown in FIG. 1B. As explained already, the execution of reasoning at step 104 assumes the origin day to which the reasoning is applied as the latest date of storage of the time series data. More specifically, to the extent that there exists time series data up to the present time point, the system energization would automatically permit execution of the reasoning for prediction for the next day.

Figure 24:
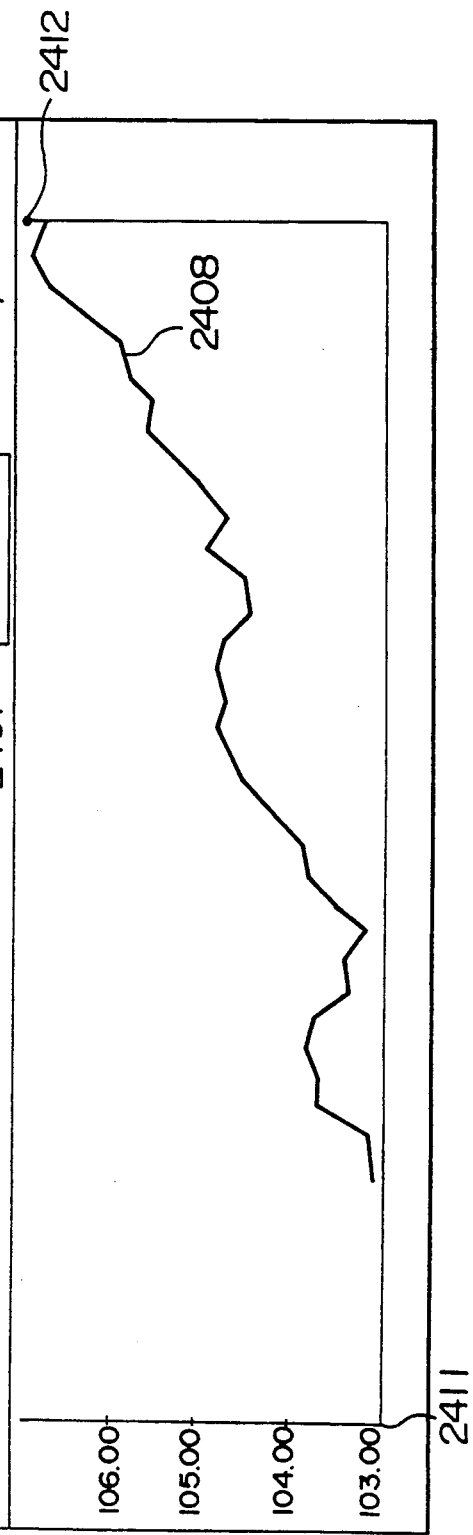
FIG. 24 is a diagram showing an example of output on a general prediction screen.

Explanation will be continued again with reference to FIG. 1B. As the next step, screens are displayed on the display unit 201 to indicate a chart graph of the time series data and the result of reasoning (step 105). The screens displayed at this step include the general prediction screen 2400 shown in FIG. 24 and the screen 2500 shown in detail for each chart in FIG. 25. The steps of this display will be explained with reference to the flowchart of FIG. 26.

First, the general prediction screen 2400 is produced on the display 201 (step 2601). In the process, the frame and characters produced are such that in such a manner as to permit identification of an area designated by mouse at the time of subsequent mouse input or in such a manner as to permit an output production of characters or numerals in a designated area, a table is prepared in which the position 2702 at the lower left and the position 2703 at the upper right coordinates of the rectangular area are rendered to correspond to the name 2704 given the particular area and the name 2701 of the output screen, as shown by 2700 in FIG. 27. The area 2409 of the general prediction screen 2400, for instance, as shown in the table 2400, has a screen name "General Prediction". The lower left and upper right coordinates of the rectangular area thereof are (1000, 650) and (1040, 670) respectively, with "End" attached as an area name thereto.

The result of prediction by chart is then displayed on this general prediction screen 2400 (step 2602). Specifically, the values of the predicted low limit 2103 and the predicted high limit 2104 stored in the rule group execution result table 2100 are added to the closed price or the day. The closed price of the day is capable of being determined by taking out the value associated with the feature name 310 of the raw transaction data table 300 stored at the position of the arrangement number stored in the area of origin day for reasoning 350 on the column of the closed price. The resulting sum is produced as an output in the predicted high value limit display area 2403 and the predicted low value limit display area 2402 on the same row as the corresponding chart name 2401. In similar fashion, the values of the predicted low limit value 2202 and the predicted high limit value 2203 stored in the general result table 2200 are taken out, calculated and produced as an output in the predicted high limit value display area 2403 and the predicted low limit value display area 2402 on the same row as "Summarization" 2410 of the general prediction screen 2400. In the process, the predicted low limit 2103 and the predicted high limit 2104 in the rule group execution result table 2100 and the predicted low limit 2202 and the predicted high limit 2203 in the general result table are checked for positive or negative values or zero. The signs '↓', '↑' and '.' are produced if they are negative, positive and zero respectively as an output similarly in the predicted low limit display area 2402 and the predicted high limit display area 2403 of the general prediction screen. Further, this step 2602 takes out the execution rule number 1901 sequentially from top, the rule of the particular number from the knowledge base 207 and the character train described in the message 706 of the particular rule with reference to the execution rule table 1900 indicating the rule executed at step 104 for execution of reasoning, thereby producing as an output the character train and the rule establishment grade 1902 in the message display area on the same row as the chart name 2401 corresponding to the chart associated with the particular rule.

As the next step, a graph showing the change in the feature data providing time series data is produced as an output of the general prediction screen 2400 (step 2603). According to this embodiment, a closed price change graph 2408 is displayed on the general prediction screen. The feature data of which a graph is to be displayed on each screen is determined by reference to the table shown in FIG. 28. This table has stored therein the name 2801 of each screen and the feature data name 2802 to be displayed on the particular screen in correspondence with each other. More specifically, a row having a screen name 2801 involved is searched for, a corresponding feature name 2802 displayed as a graph is taken out, the column 400 or the table 300 having the item 310 coincidental with the feature name is taken out and the value stored therein is plotted as a polygonal curve. This graph display is produced as an output on the rectangular area with points 2411 and 2412 predetermined on the screen as corners. As a result, assuming that the number of data to be plotted (maximum number of the arrangement having a data) is N, the coordinate of the corner 2411 (X0, Y0) and that of the corner 2412 (X1, Y1), then the value Xi on the X axis where the i-th data is plotted on the arrangement may be determined by $$\text{Equation 1: } Xi = X0 + \frac{(X1 - X0)}{N} \times i$$

This equation may be rewritten into $$\text{Equation 2: } i = \frac{Xi - X0}{X1 - X0} \times N$$

This makes up an equation for determining the arrangement number storing the data corresponding to the position, for example, where the value on the X axis of the coordinate designated on the screen by the use of the mouse input unit 203 is Xi.

The aforementioned displays as a graph the change in closed price providing the transaction data in addition to a message of the rule executed together with the price change of each chart on the general prediction screen.

Figure 25:
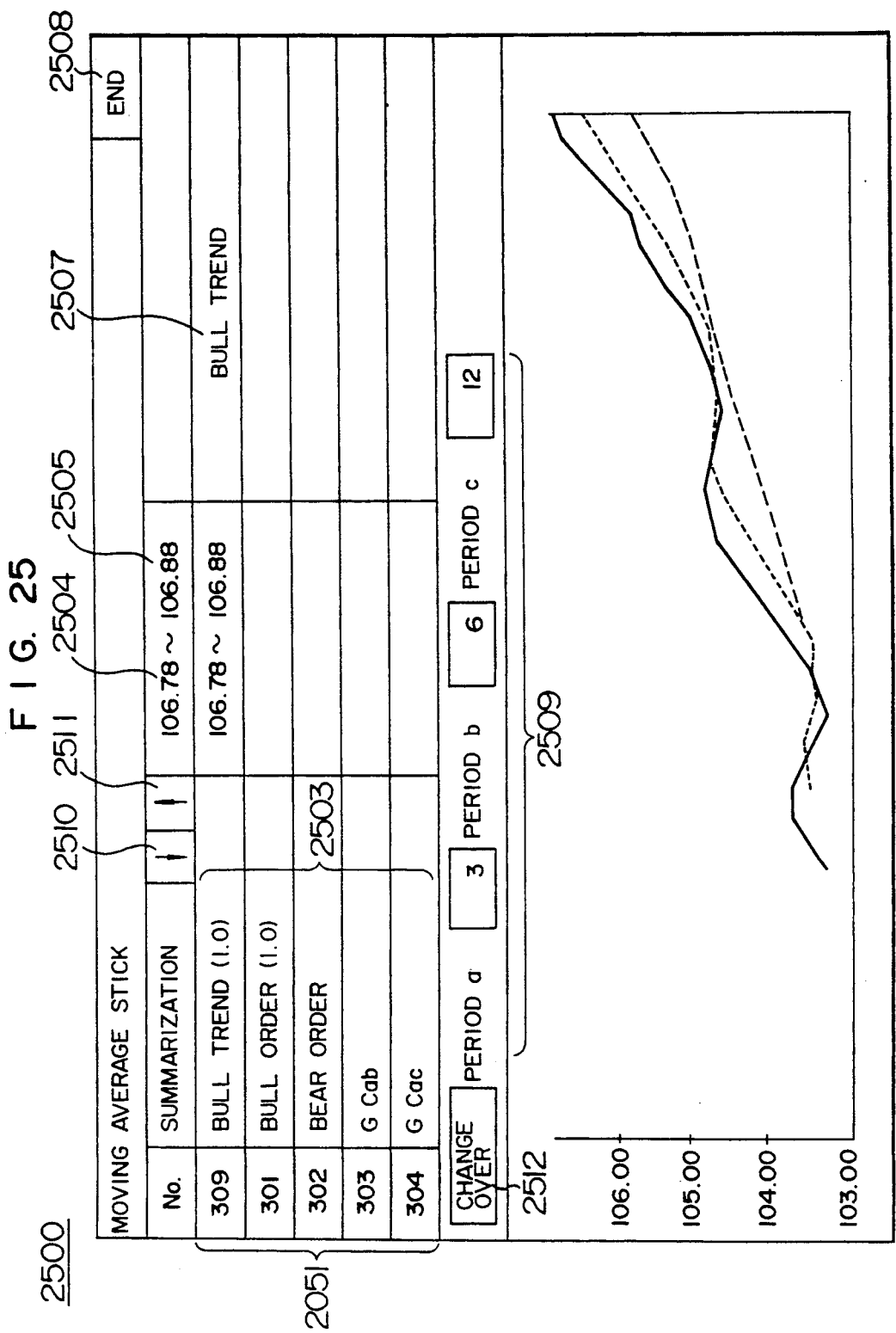
FIG. 25 is an output diagram of a screen by chart.
Figure 26:
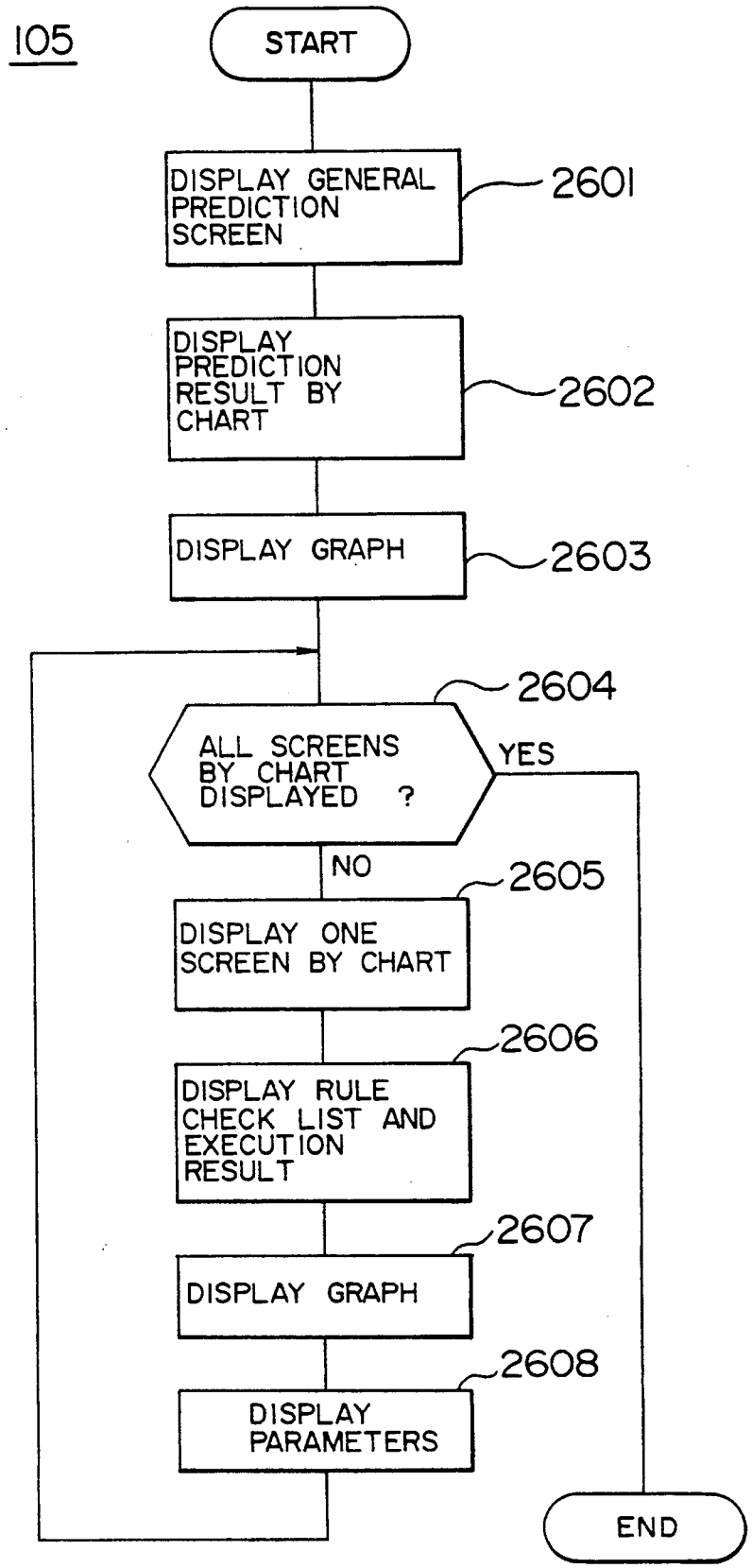
FIG. 26 is a flowchart showing the steps of displaying on the general prediction screen and the screen by chart.

After display of the general prediction screen, the screen by chart 2500 is displayed. The screen shown in FIG. 25 is one of the moving average stick providing an example of the screen by chart. Actually, there are a plurality of screens by chart, which are all displayed as the next step. First, it is checked whether or not all the screens by chart have been displayed (step 2604), and if there is any undisplayed, the particular undisplayed screen by chart 2500 is displayed (step 2605). In the process, as in the display of the general prediction screen of step 2601, the area of display is named and the data indicating the correspondence thereto is prepared in the table 2700.

As the next step, a rule check list and the result of execution are displayed for the screen by chart 2500 (step 2606). This process includes the steps of taking out the value of a rule display head arrangement number storage area 650 ('1' in initial value) corresponding one-by-one to the column of the corresponding chart (rule group) name 601 of the rule check table 600, taking out as many pieces of the rule number check information 602 as the rule name display areas 2503 (five in the case of screen under consideration) from the point of the particular arrangement number, fetching a rule having the rule number 602 from the knowledge base 207, and then producing the rule names 703 sequentially as an output in the rule name display area 2503. At the same time, it is checked whether or not any number coinciding with the rule number 602 displayed exists in the execution rule 1901 of the rule execution table 1900, and if there is any, a corresponding grade 1902 and the character train described in the message 706 of the particular rule are produced as an output in the rule name display area 2503 and the message output area 2507 respectively. Also, when a rule number coinciding with the rule number 602 displayed exists as the rule number 2002 of the prediction result table 2000, the predicted low limit 2004 and the predicted high limit 2005 are taken out and produced in the predicted low limit value display area 2504 and the predicted high limit value display area 2505 in the same manner as in the process described above in the step 2602.

Subsequently, a graph indicating the change in feature data related to the particular screen is produced as an output with reference to the table 2800 through the same process as step 2603 described above (2607).

Figures 29, 30:
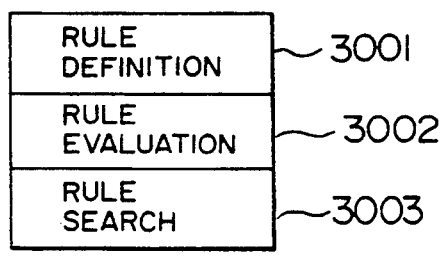
FIG. 29 is a diagram for explaining a parameter table.
FIG. 30 is a diagram showing an example of output of pull-down menu shown in the screen by chart.

Further, the value of the parameter for calculating the feature data of the chart is produced as an output in the parameter display area 2509 (2608). This parameter display is effected with reference to the parameter table 2900 shown in FIG. 29. Specifically, the parameter name 2902 and the parameter value 2903 of the chart name 2901 coinciding with the chart (screen) name on display are taken out sequentially and produced as an output in the parameter display area 2509. Also, this table has stored therein the corresponding name 2904 of the feature data requiring recalculation in case a parameter is changed.

These steps 2605 to 2608 are repeatedly applied for display of all the screens by chart.

Through the processes described above, the system execution result as to the latest date stored in the time series data 300 and 400 is proposed to the user. The information specifically displayed include the change value of the bond price predicted for the whole system, the change value of the bond price as a rule group unit called the chart, and details of the established grade of a specific rule actually ignited and the latest date as a message display produced by the particular rule.

Further, according to this embodiment, the rule check list information is displayed on the screen by chart 2500 collectively as a unit of rule group as actually used for reasoning. In addition, the data referred to by the particular rule group is displayed as a chart (graph) on the same screen. Therefore, it is possible for a dealing expert using the system to effectively decide, for instance, that "this rule should not be ignited under today's conditions" or the like while watching the actual chart conditions as compared with the ignited rule, thereby making it possible to easily determine a rule which requires regulation or change.

Returning to FIG. 1B, explanation will be continued. The processes up to step 106 have been covered by the foregoing description. The explanation that follows concerns the stage of the operator specifically operating the mouse 203 and the keyboard 202 making up input units of the system for executing various steps of process to obtain information in support of the decision-making.

The user makes manual input by direct designation through the display areas of the general prediction screen 2400 and the screen by chart 2500 in the display 201 by way of the mouse 203 (step 106). The information inputted through the mouse 203 specifically includes the type of input screen indicating the screen involved and a coordinate representing the position involved on the particular screen. This input information is used to discriminate the area designated (step 107). The discrimination is effected by the use of the table 2700. Specifically, with regard to the screen name 2701 of the table 2700 coinciding with the screen name inputted through the mouse input unit, the designated coordinate (X, Y) is checked as to whether it is present in a rectangular area having corners at the lower left coordinate 2702 (X, Y) and the upper right coordinate 2703 (X, Y), and if the designated coordinate (X, Y) is present in that particular area, the area name 2704 is taken out, so that the knowhow definition step 108, the knowhow application step 109 or the knowhow evaluation step 110 is executed in accordance with the value of the area name 2704 thus taken out, followed by proceeding again to the step 106 for receiving an input from the input units. In the process, if the area discriminated at step 107 is the end of the general prediction screen (if 2409 on the screen 2400 is designated by the mouse), the system processing operation is ended (step 111). The knowhow definition step 108, the knowhow application step 109 and the knowhow evaluation step 110 will be described in detail in that order.

Figure 31:
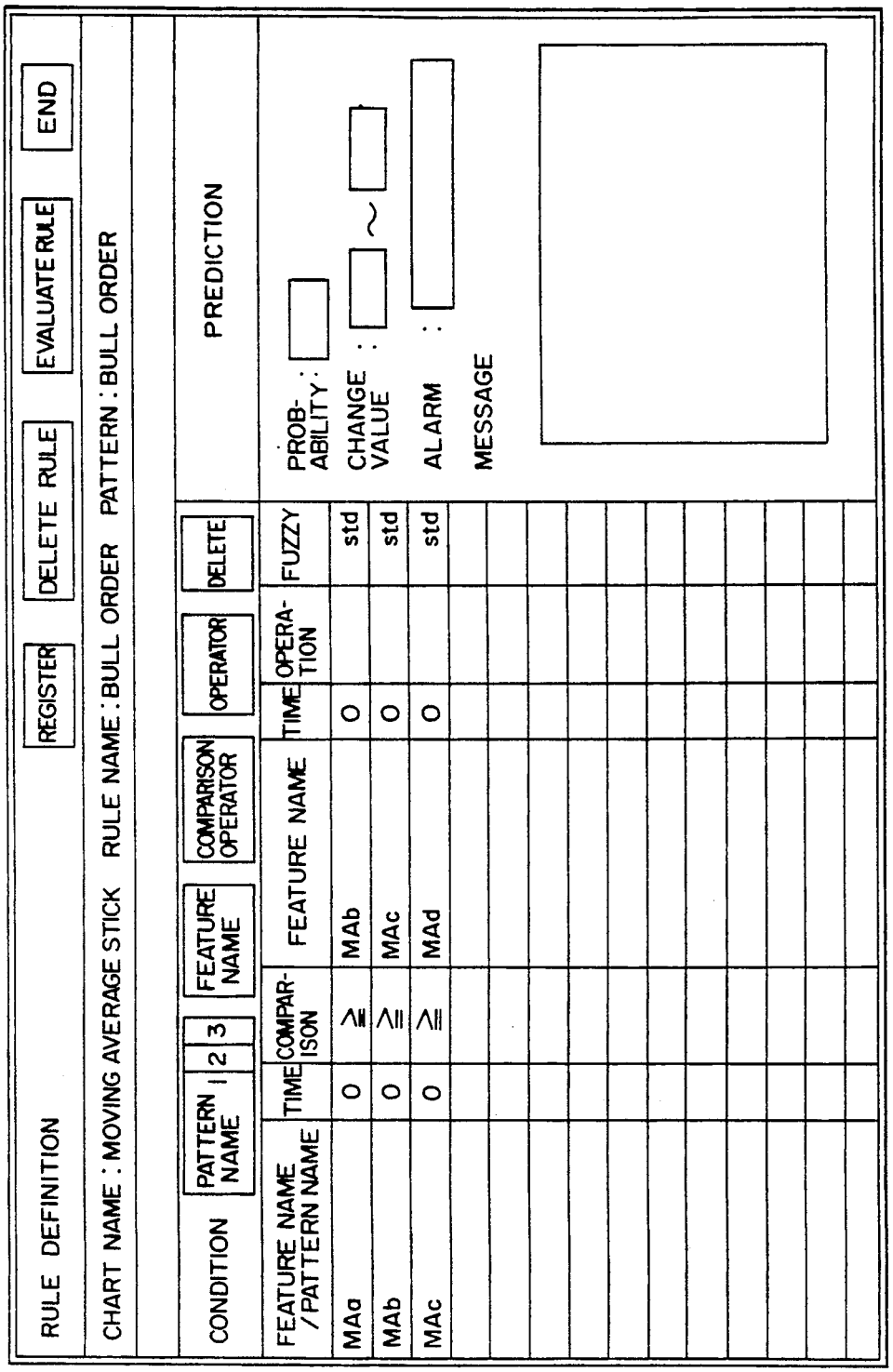
FIG. 31 is a diagram showing an example of output of a rule editor.

First, explanation will be made about the knowhow definition step 108. This step is literally the one for defining (deleting, correcting and newly registering) a rule providing a knowhow and is executed by the use of an exclusive editor against a designated rule. This step is energized by designating the rule name area 2503 of the screen by chart 2500 through the mouse 203. When any of the items of this area is designated, the pull-down menu 3000 shown in FIG. 30 appears in the neighbourhood of the area designated. The "rule definition" of 3001 is designated in any of the three areas of this menu thereby to energize the editor. The rule name display area 2503 designated has defined therein a "rule name 1", "rule name 2", . . . , "rule name 5" downward in that order. The last numeral of this name is taken out, and the value of the rule display head arrangement number storage area 650 corresponding to the numeral is added followed by subtraction of 1 therefrom leading to the arrangement number in the rule check table of the rule displayed in the designated area. The rule number 602 corresponding to the point of this arrangement number is taken out, and the rule of this rule number is fetched from the knowledge base 207 thereby to energize the step of rule editor. Upon energization of the rule editor, the screen shown in FIG. 31 is created to go through a predetermined process, and upon completion of this process, the present knowhow definition step 108 is ended. Details of the rule editor function will not be explained as it is considered unrelated to the present invention. The screen by chart 2500 has areas 2501 and 2502 for scrolling the rule check area. Upon designation of these areas by mouse, the value of the rule display head arrangement number storage area 650 is incremented by five in the former case (although no operation is performed if the sum exceeds the total number of rules of the corresponding chart) thereby to execute the process described at step 2600 in FIG. 26 and change the contents of the rule check list display. In the latter case, on the other hand, the value of the rule display head arrangement number storage area 650 is decremented by five (although no operation is performed if the difference is 0 or less) thereby to change the contents of the rule check list display through the process of the step 2606 in the same manner as in the former case.

According to the processes described above, the rule name used in actual reasoning and the characteristic graph of the data accessed by the particular rule group may be viewed on the same screen for each rule group making up a chart. Further, a rule providing an object of operation is capable of being designated of all the rules displayed, and the rule definition step thereof called. Thus the user is capable of studying the contents of the rule used for reasoning in collation with the data characteristics graph, thereby making it possible to call the change and regulation task on the rule involved easily.

Next, reference is had to the knowhow application step 109. This step is executed for renewing the reasoning when a rule is changed at step 108 or promoting the reasoning by recalculation of the feature data when a parameter in a given chart is changed. Also, as a function of this system, a reference may be set for application of the reasoning to a given data on the time series data to execute the reasoning thereon. Specific explanation will be made below.

Figure 32:
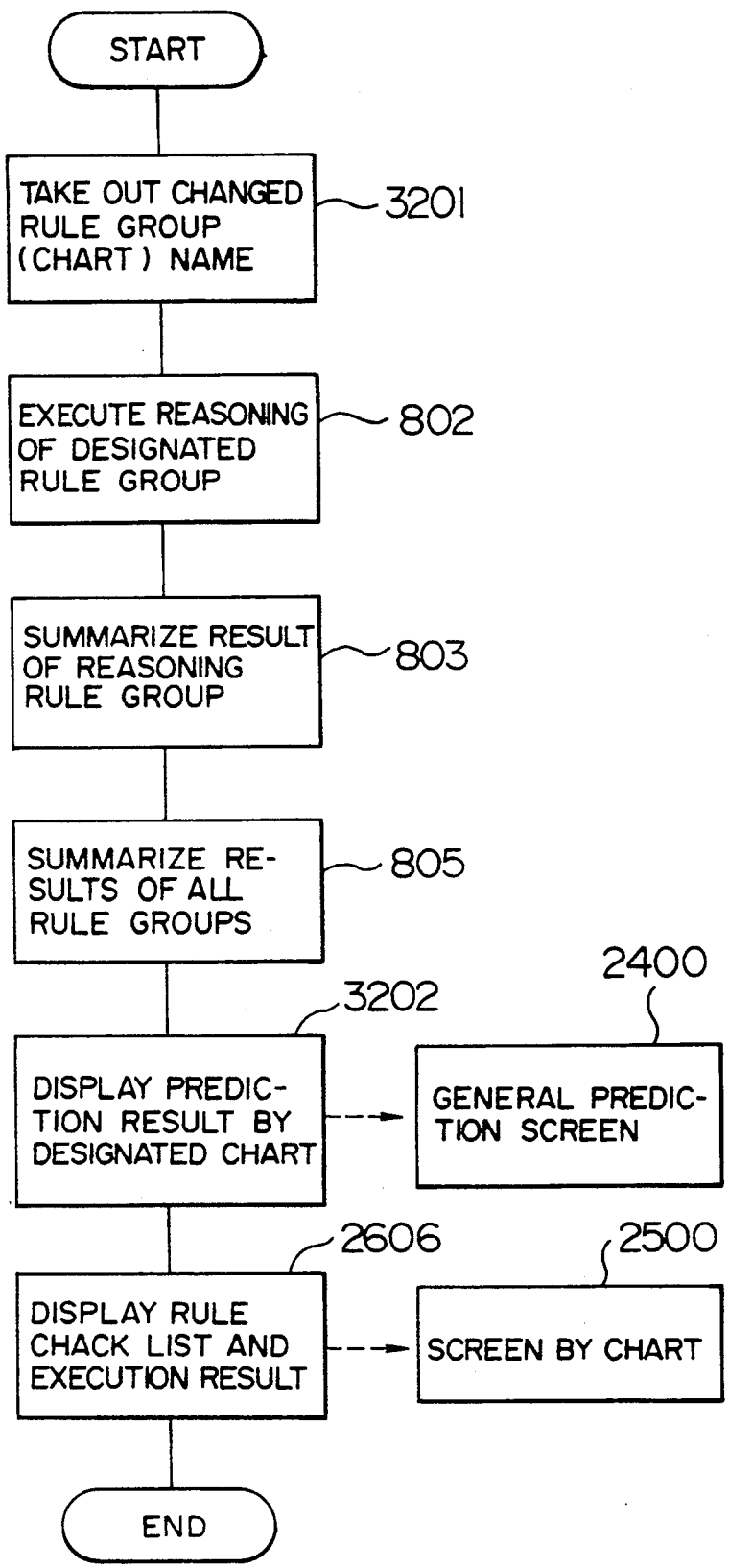
FIG. 32 is a flowchart showing the steps of execution of the reasoning for a related rule group after rule change.

First, the re-execution of reasoning with a rule changed is effected in such a manner that the reasoning is applied only to the rule group associated with the change rule, the result thereof is displayed, and the synthesis of the change price prediction is recalculated. This process will be explained with reference to the flowchart of FIG. 32. The process shown in this flowchart is energized by changing the rule at step 108 and designating the "end of change" in the area 2512 of the screen by chart 2500 through the mouse 203. First, the screen name where an instruction has been inputted is taken out. This screen name is a rule group name (step 3201). Then the rule group reasoning is executed for this rule group name (step 802). Further, the result of reasoning of the rule group is summarized (step 803), followed by summarizing all the rule group results (step 805). After that, the prediction result by chart of a designated chart is produced as an output on the general prediction screen 2400 (step 3202), and a rule check list and the result of execution are displayed on a screen by chart 2500 corresponding to the particular rule group (step 2606). The steps 802, 803 and 805 are already explained with reference to FIG. 8. Step 3202, on the other hand, is such that step 2602 is applied to a designated chart name, followed by referring to the general result table 2200 and displaying the same in the area 2401 "summarization" of the screen 2400. Also, step 2600 is the same as the corresponding step described in FIG. 26.

Figure 33:
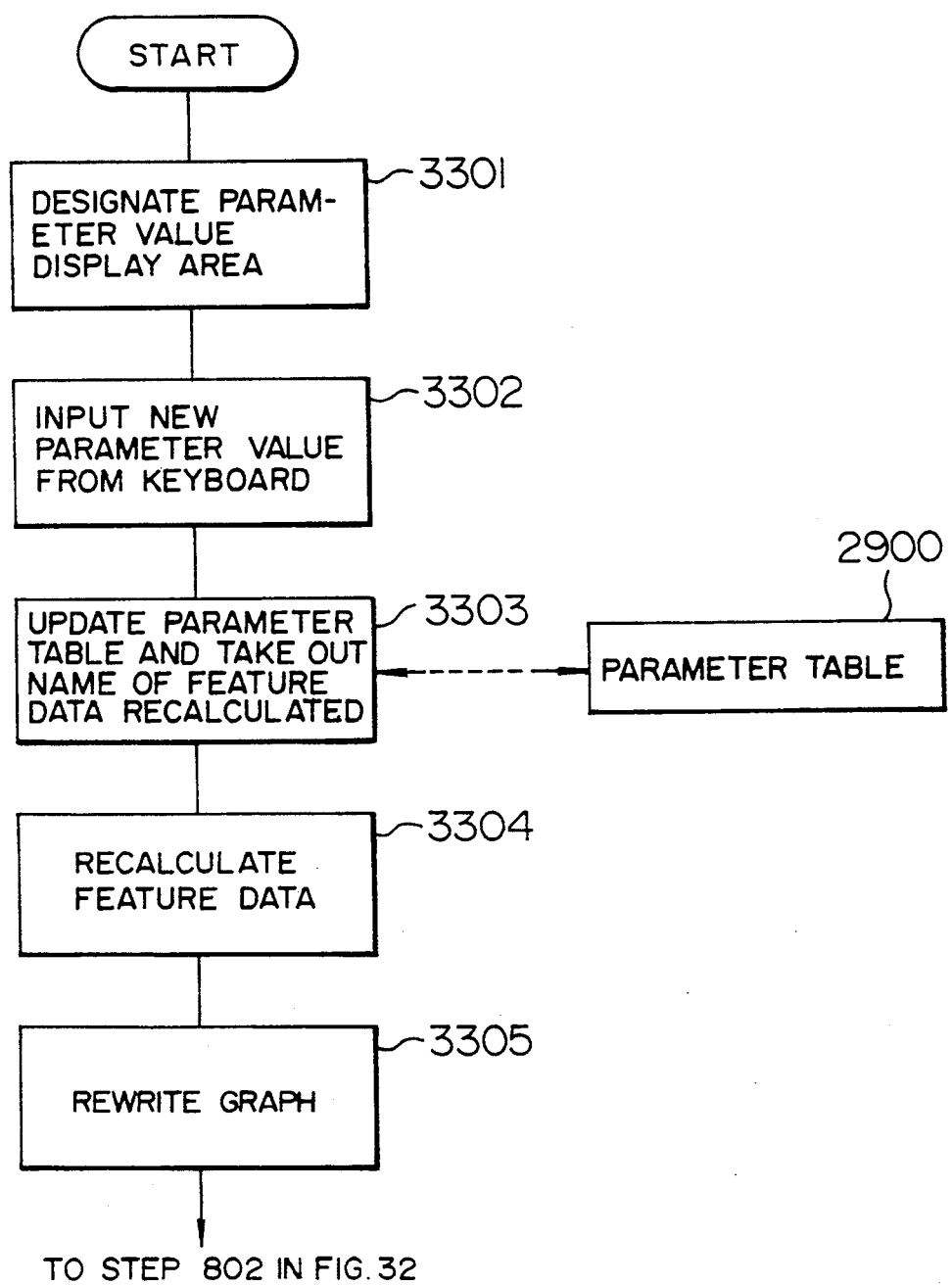
FIG. 33 is a flowchart showing the steps of processing the execution of reasoning at the time of parameter change.
Figure 34:
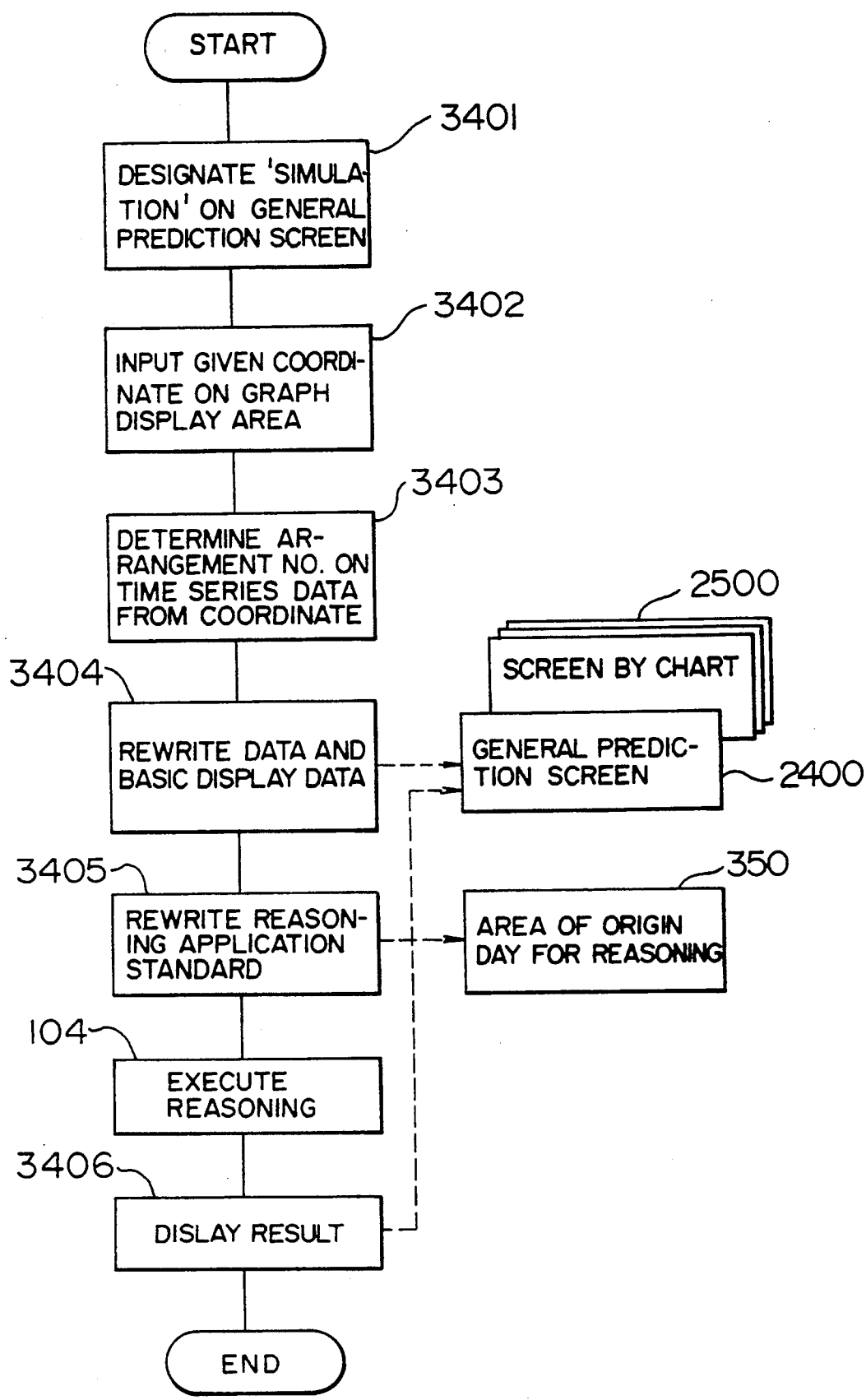
FIG. 34 is a flowchart showing the steps of processing the execution of reasoning for the simulation function.

The process of further executing the reasoning by recalculating the feature data at the time of changing a parameter in an individual chart will be explained with reference to the flowchart of FIG. 33. This process is started by designating by mouse 203 the parameter value display area surrounded by a rectangular frame of the parameter display area 2509 of the screen by chart 2500 (step 3301). The areas individually designated are named "parameter 2", ..., "parameter 5" respectively In the next step, the keyboard cursor is indicated in the designated area to input a new parameter value by way of keyboard (step 3302). The new parameter value thus input and the last digit of the area name input are taken out to update the parameter table 2900. This updating process is such that a chart name 2901 coinciding with the screen name input is searched for, so that the parameter value 2903 at a point having the last number of the area name taken out which coincides with the number as counted from the top of the parameters is updated. Further, the recalculation feature name 2904 of that row is taken out (step 3303). After that, the recalculation feature name 2904 present on the left side of the feature data definition table 500 is found, and the feature data is recalculated in accordance with the formula in the definition table thereby to set the row of the feature name 310 again (step 3304). Further, on the basis of the feature data thus set, the change graph thereof is redisplayed on the screen by chart 2500 inputted with a parameter change (step 3305). The graph is rewritten by executing the step 2607 in FIG. 26. After that, in order to execute the reasoning of the rule group of the particular chart, the process proceeds to the step 802 shown in FIG. 32 thereby to continue the remaining processes. Assume, for example, that the value of "period "a" providing a parameter of the chart (rule group) moving average stick shown in FIG. 25 is changed from '3' on display to '4'. Then the value '3' of the top parameter 2903 in the moving average stick of the chart name 2901 is updated to '4' in the parameter table 2900, thereby taking out the 'short moving average' of the recalculation feature name 2905. The feature data definition table 500 having this 'short moving average' on the left side is searched for, and in accordance with the calculation formula thereof, the values in the rows of the feature data table 400 of the 'short moving average' are rewritten. After that, the feature name in graph display on the row having the 'moving average stick' as a chart name 2801 in the display graph table 2800 is taken out, the value in the feature data table 400 of the particular feature name is also taken out, and the change thereof is plotted and redisplayed as a graph. Since the specific value of the feature data has been changed, the rule associated with the moving average stick rule group is re-executed.

Now, explanation will be made about the process of executing the reasoning by setting a reference for application of the reasoning to a given date on a time series data as the last function of the knowhow application step 109. First, this step is started by designating 'simulation' of the general prediction screen 2400 by the mouse 203 (step 3401). Then, a given point in the graph display area is further designated by the mouse 203, and the coordinate data of that point is inputted (step 3402). Of this coordinate data, the X coordinate is taken out, and applying this to $X_i$ of the equation 2 above, the corresponding arrangement number i of the time series data is determined. Since the arrangement number is of course an integer, the orders below the integral point are discarded in the conversion from right to left sides (step 3403). After that, the values of the date, open price, high quotation, low quotation and closed price on the customer data table 300 at the point of the arrangement number are taken out and produced as an output in a display area corresponding to al the screens by chart 2500 (step 3404). Further, the value of the corresponding arrangement number i is written in the area of origin day for reasoning 350 (step 3405). All the rules are then subjected to reasoning again (step 104), and the result thereof is displayed in the general prediction screen 2400 and all the screens by chart (step 406). In the process, the reasoning execution step 104 functions in the same manner as described with reference to FIG. 1B. The result of reasoning is displayed at step 3406 by executing the steps of screen display of step 105 in FIG. 1B except for those related to screen creation. The explanation about the knowhow application of step 109 is now over.

The knowhow evaluation process at step 110 will be explained in detail below.

This process is to check to see to what extent the knowhow stored in the knowledge base 207 is reasonable, and specifically includes the following three evaluation steps:

(1) Rule evaluation

This step is for applying a rule designated to past dates of a time series data sequentially, taking out the date on which the rule is established, further taking out the transaction price data for the day immediately following (or two or three or more days later than) the established date, and supplying the user with the information as to how much the price has actually changed.

(2) Chart evaluation

This step is for evaluating the extent to which the result of knowhow application of the designated chart (rule group) is correct. Only the rules associated with the designated chart are applied sequentially to the past dates of the time series data, with the result that information is presented on the amount by which the predicted change value of the price determined is displaced from an actual price change.

(3) General evaluation

This step evaluates the extent to which the result of application of the entire knowhow in the knowledge base is correct. Specifically, the past dates of a time series data are subjected sequentially to the reasoning, and information is presented on the amount by which the general predicted price change determined as a result thereof is displaced from the actual price change.

Now, the process for realizing the steps (1) to (3) will be explained below.

Figure 36:
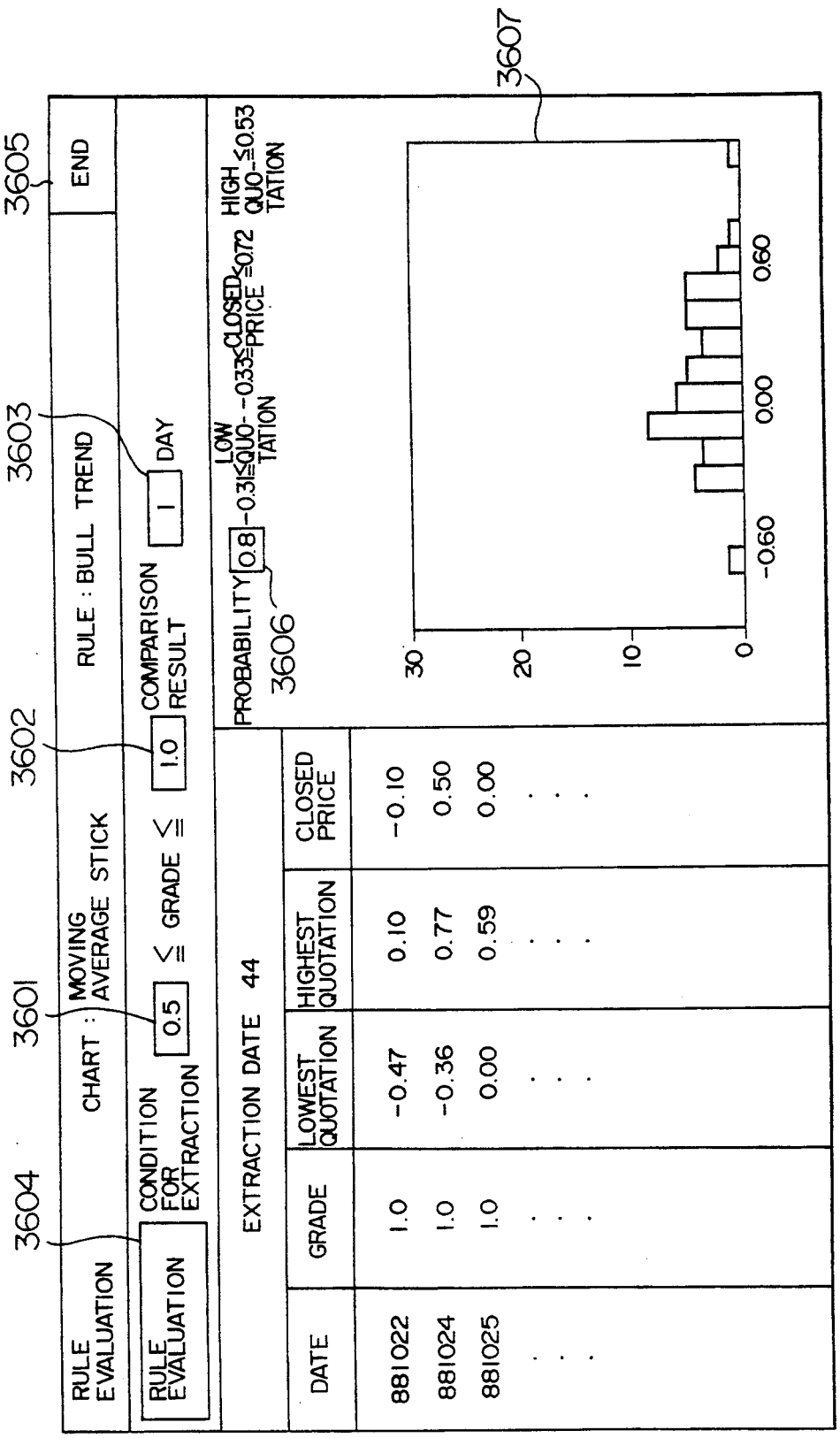
FIG. 36 is a diagram showing an example of output on the rule evaluation screen.
Figure 38:
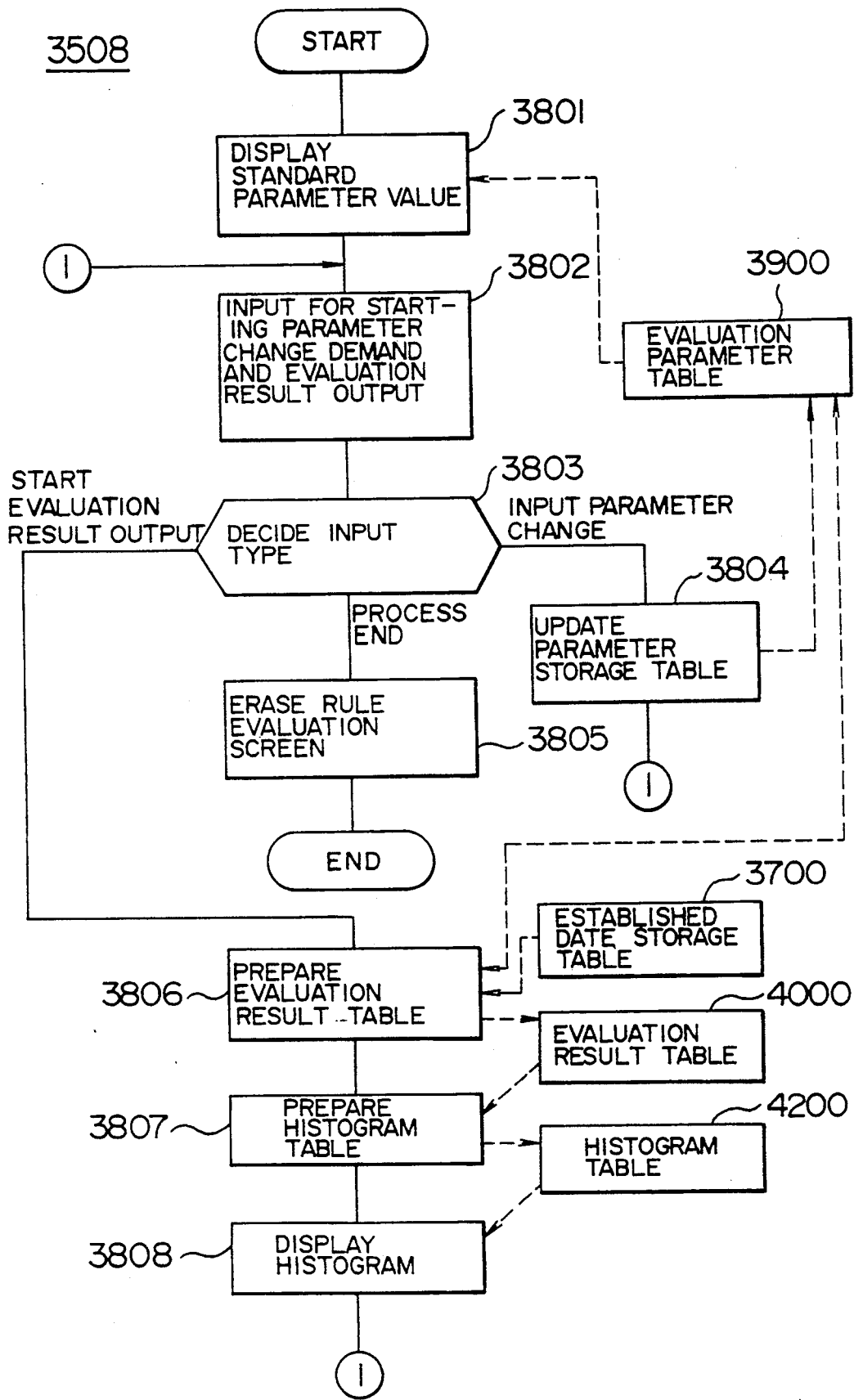
FIG. 38 is a flowchart showing the steps of processing the input on the rule evaluation result screen.

First, the rule evaluation will be explained with reference to the flowchart of FIG. 35. This process is started by designating any of the rule name display areas 2503 of the screen by chart 2500 through the mouse 203, and by further designating the "rule evaluation" 3002 of the pull-down menu 3000 subsequently displayed through the mouse 203. The rule number designated at this stage is capable of being taken out through the steps similar to those for taking out a designated rule number in the knowhow definition step 109. First, the rule evaluation screen 3600 shown in FIG. 36 is displayed (step 3501). Although various data values and a histogram are displayed as shown, the display is limited to the titles and frames at this stage. In the next step, the rule 710 corresponding to the rule number taken out is taken out of the knowledge base 207 (step 3502). After that, the range of reasoning application is set in the form of a period from one to another given day on a time series data (step 3503). This setting covers the entire range of existence of the time series data. In other words, the arrangement numbers '1' to '100' are covered in the case of FIG. 4. Then, the head arrangement number '1' in this range is set in the area of origin day for reasoning 350 and the initial area of origin day for reasoning 360 (step 3504). Then, evaluation is made as to whether the rule section 704 of the rule 710 taken out at step 3502 is established or not (step 902), with the result that whether the IF part is established or not is decided (step 903) If the IF part is established, the value of the area of origin day for reasoning 350 in which the arrangement numbers of the time series data under reasoning and the grade of rule establishment are stored sequentially in the established date storage table 3700 (step 3505) Unless the rule is established, the step 3505 is not executed. The established date storage table 3700, as shown in FIG. 37, is comprised of an area 3701 for storing a plurality of arrangement numbers of a time series data and an area 3702 for storing a rule establishment grade associated therewith. Then, the values in the area of origin day for reasoning 350 and the initial area of origin for reasoning 360 are incremented by one (step 3506). Subsequently, it is decided whether the value of the area of origin day for reasoning 350 exceeds the range of reasoning application (step 3507). If this value does not exceed the range of reasoning application as yet, the process is returned to step 902. In the case where the range of reasoning is exceeded, by contrast, various data for taking out achievement data are applied as an input, and according to these parameters, the established date storage table 3700 is referred to while at the same time taking out the achievement data, which is processed with the result thereof produced as an output on the rule evaluation screen (step 3508). The step 3508 will be explained more in detail with reference to the flowchart of FIG. 38.

Figure 41:
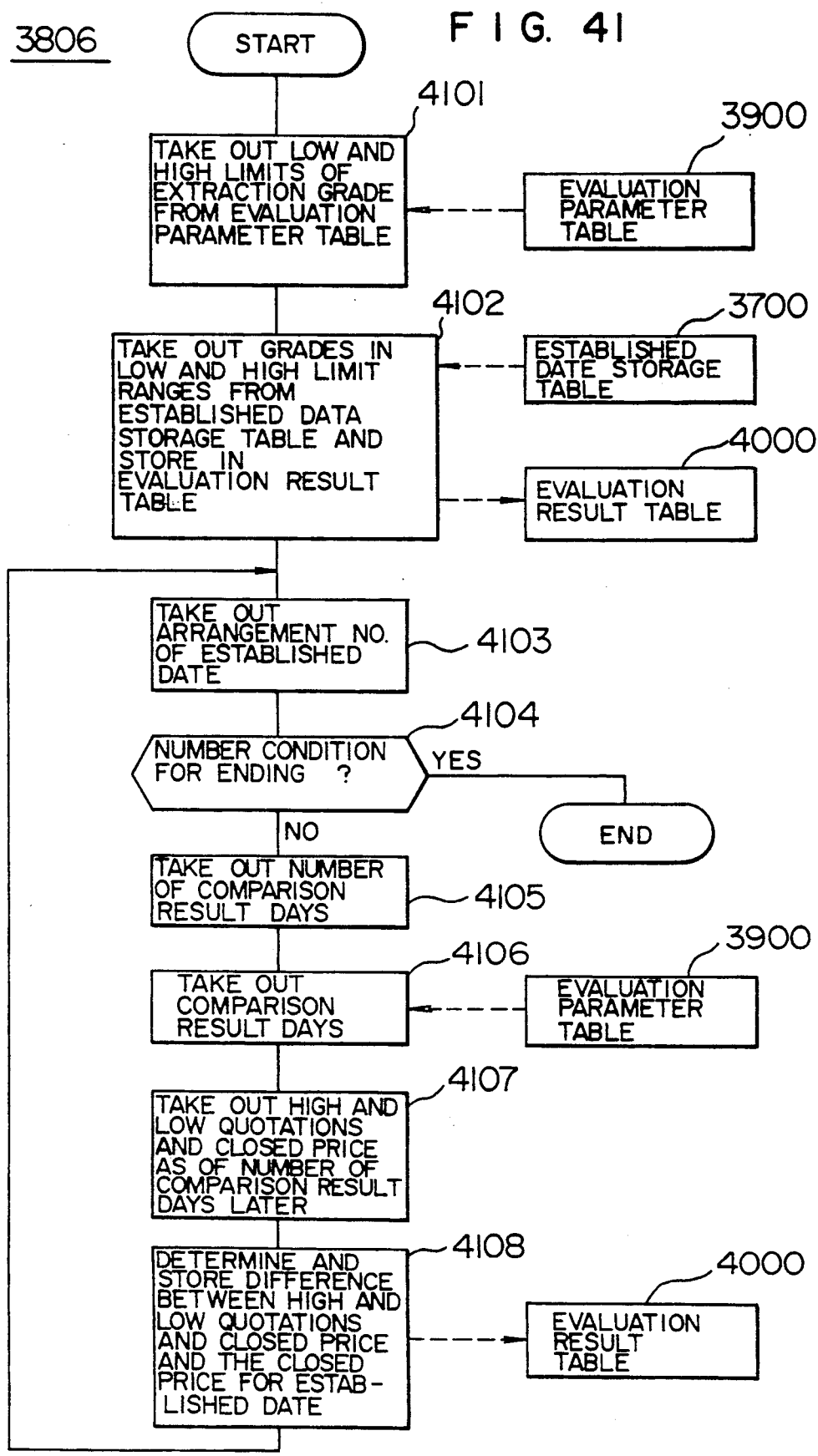
FIG. 41 is a flowchart showing the steps of processing the preparation of an evaluation result table.

First, by reference to the evaluation parameter tables 3900, the standard values of the parameters stored in the table in advance are displayed on the rule evaluation screen 3600 (step 3801). The evaluation parameter table 3900 is configured of an area name column 3901 on the screen for displaying parameters and the parameter values 3902 displayed therein, as shown in FIG. 39. As a result, these tables are taken out one by one, and the value written in the display area on the actual rule evaluation screen 3600 coinciding with the name written in the display area name 3901 is produced as an output, thereby making it possible to display a standard value of each parameter. Then, various inputs for starting the process are applied by designating an area on the screen through the mouse 203 (step 3802). The type of the area thus inputted is determined (step 3803), and if any of the parameter display areas 3601, 3602, 3603 and 3606 is designated, a new parameter value is inputted from that particular area through the keyboard 202 while updating the parameter value of the corresponding evaluation parameter table 3900 (step 3804) If the area designated is 'End' 3606, on the other hand, the rule evaluation screen 3600 is erased (step 3805) thereby to end the process. In the case where the designated area is 'Execution of Rule Evaluation' 3604, the evaluation result table 4000 shown in FIG. 40 is prepared. The steps of processing the preparation of this table will be explained with reference to the flowchart of FIG. 41. The parameter values of the low extraction grade limit 3601 and the high extraction grade limit of the evaluation parameter table 3900 are taken out (step 4101), and an established date storage table 3700 having a range of these two parameters covering the particular establishment grade 3702 is searched for, so that the related established arrangement number 3701 is sequentially stored in the established date arrangement number 4001 of the evaluation result table 4000 (step 4102). Specifically, the date of establishment of the evaluation rule is further reduced to the days covering a specific range of establishment grade. Then the arrangement numbers stored in the established date arrangement number 4001 of the evaluation result table 4000 are sequentially taken out (step 4103), and if there is no data (step 4104), the process is ended, while if there is any data, the value of the particular arrangement number on the closed price column of the raw transaction data table 300 is taken out (step 4105). And the parameter value of the compared result number of days 3603 of the evaluation parameter table 3900 is taken out (step 4106), and added to the arrangement number taken out at step 4103. The high and low quotations and the closed price at a point associated with the resulting sum are taken out from the raw transaction data table 300 (step 4107). The closed price of the established date taken out at step 4105 is subtracted from the values of the high and low quotations and the closed price taken out at step 4107, and the respective differences are stored in the low quotation achievement 4002, high quotation achievement 4003 and the closed price achievement 4004 of the evaluation result table 4000 respectively (step 4108). This process prepares a data indicating a change that the transaction data as of a designated number of days after the day when the rule is established has undergone from the closed price of the established date.

Returning to FIG. 38 again, a histogram table 4200 is prepared on the basis of the evaluation result table 4000 prepared at step 3806 (step 3807). The histogram table 4200 is configured of, as shown in FIG. 42, an area 4201 indicating the range of specific ranking numerals and areas 4202, 4203 and 4204 for storing the numbers corresponding to each rank. These three number storage areas have written therein by rank the values stored in the low quotation achievement 4002, high quotation achievement 4003 and the closed price achievement 4004 respectively of the evaluation result table 4000. According to the steps of preparing the present table, therefore, all the values of the three number storage areas 4202, 4203 and 4204 are cleared to zero in the first place, the low quotation achievements 4002 of the evaluation result table 4000 are taken out sequentially from the top of the column, the range 4201 to which the particular low quotation applicable is searched for, and the value stored in the low quotation number 4202 of the corresponding row is incremented by 1. The high quotation achievement 4003 and the low quotation achievement 4004 are also processed in similar manner.

The three numbers stored in the histogram table 4200 thus prepared are taken out, and rectangles as tall as the numbers are plotted and displayed as a histogram in the histogram display area 3607 of the rule evaluation screen 3600 (step 3808). In the process, three numbers are produced by different colors or patterns.

Figure 43:
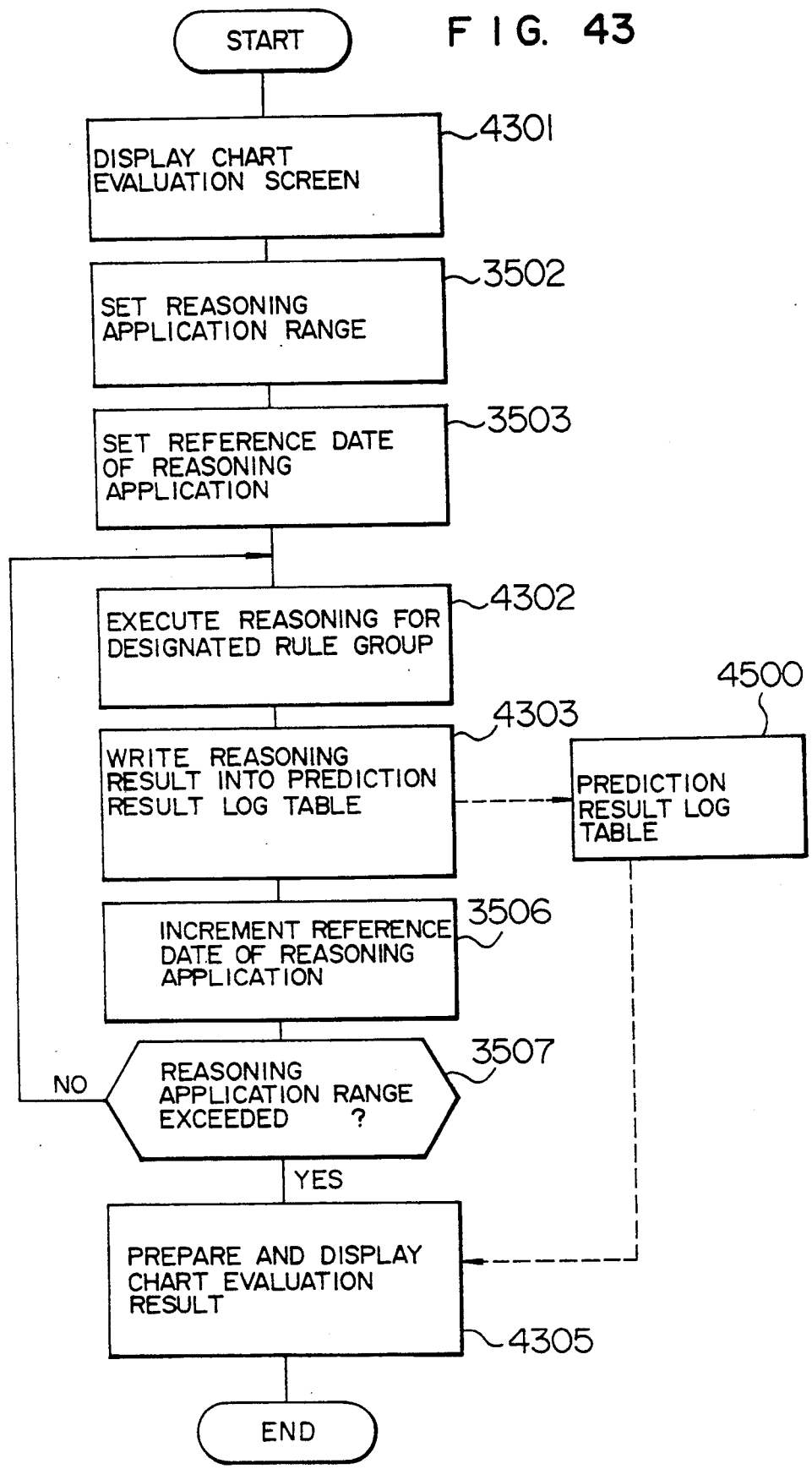
FIG. 43 is a flowchart showing the steps of processing the chart evaluation.

The foregoing is the description of the rule evaluation of the knowhow evaluation step 110. The chart evaluation, as a second evaluation, will be explained with reference to the flowchart of FIG. 43. This process is started by designating the 'Summarization' of the display area 2502 of the screen by chart 2500 through the mouse 203 and subsequently by designating the 'chart' evaluation 4401 of the pull-down menu 400 displayed in the screen by chart 2500 by mouse 203. The name displayed on the screen by chart 2500 designated by mouse at this stage becomes a rule group to be evaluated.

Figures 44, 45:
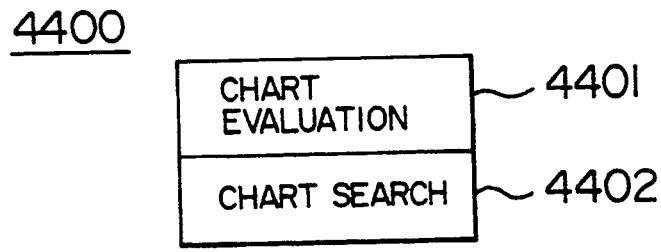
FIG. 44 is a diagram showing an example of output of a pull-down menu displayed on the screen by chart.
FIG. 45 is a diagram for explaining a prediction result log table.
Figure 46:
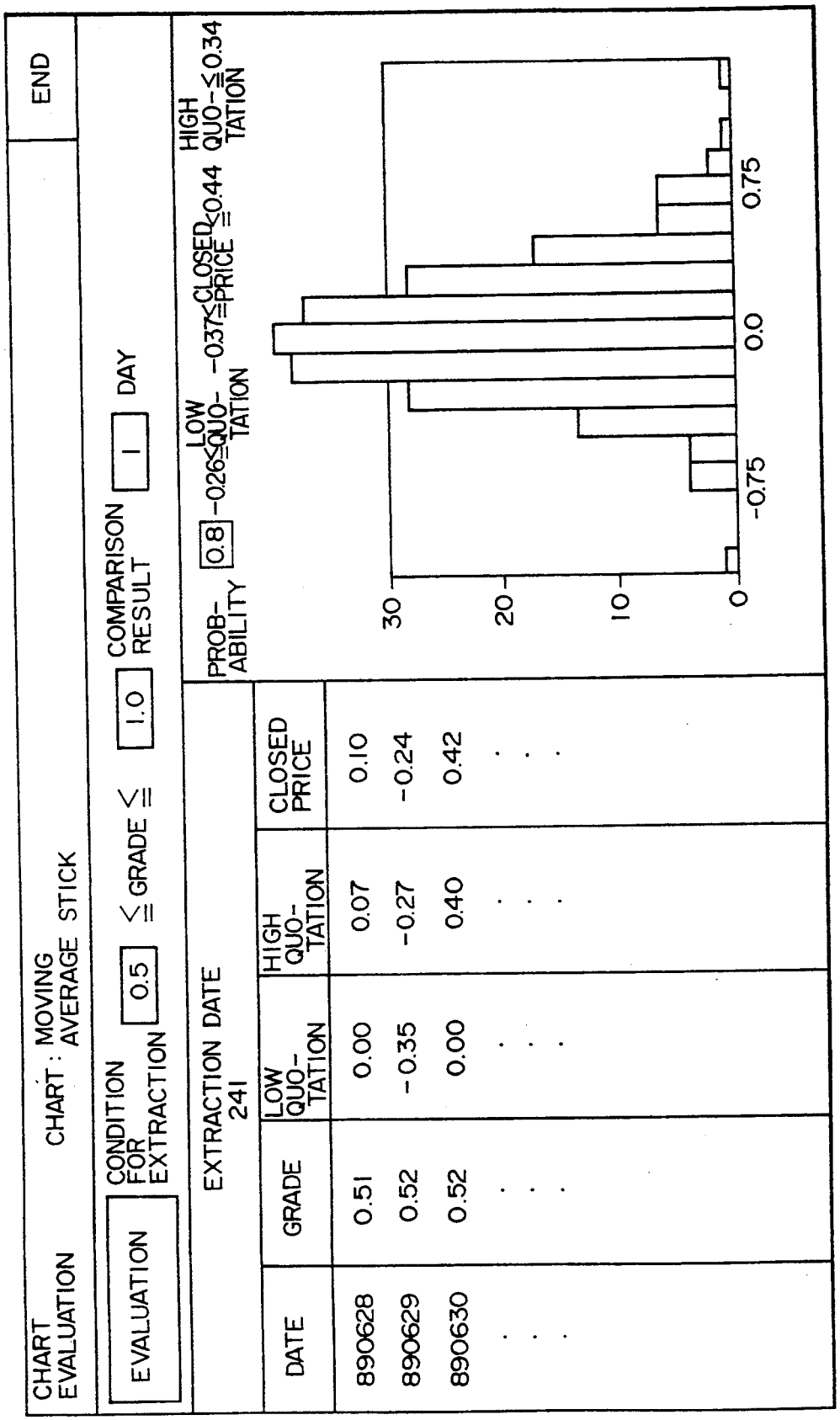
FIG. 46 is a diagram showing an example of output on a chart evaluation screen.

First, a chart evaluation screen 4600 is displayed on the display unit 201 (step 4301). The chart evaluation screen 4600, as shown in FIG. 46, is similar to the rule evaluation screen shown in FIG. 36 except for the screen title. Then, the range of reasoning application is set (step 3502), and an initial value of the range of reasoning application is set in the initial area of origin day for reasoning 360 (step 3503). In the next step, the reasoning of the rule group involved is executed (step 4302). The reasoning executed at this step is a process similar to the step 802 shown in FIG. 8, except that the table of the same stick as the prediction result table accessed in FIG. 8 is not accessed but a table having the same structure with a different stick. This is in view of the fact that the result of the table accessed in FIG. 8 is inconvenient if rewritten as it is used again in the knowhow application step 109. After that, by reference to a table having the same structure as the prediction result table 2000, a step similar to 803 shown in FIG. 8 summarizes the result of reasoning of the rule group. In the process, the predicted price change value is not stored for the whole rule group in the rule group execution result table 2100, but sequentially together with the arrangement number 4501 of the time series data subjected to reasoning in a prediction result log table 4500 shown in FIG. 45 (step 4303). The columns 4502, 4503 and 4504 of the table 4500 correspond to the columns 2102, 2103 and 2104 of the rule group execution result table 2100 respectively. Further, the values of the area of origin day for reasoning 350 and the initial area of origin day for reasoning 360 are incremented by 1 respectively (step 3506), and it is decided whether the values have exceeded the scope of reasoning application (step 3507). If not, the process jumps again to step 4302. If the range of reasoning application is exceeded, on the other hand, the step 4305 of preparing and evaluating the chart evaluation result is executed with reference to the prediction result log table 4500, thus ending the process. In detail, the step 4305 may be executed in similar fashion to step 3508 in FIG. 35. As compared with the fact that the values stored in the low quotation achievement 4002, high quotation result 4003 and the closed price achievement 4004 of the evaluation result table 4000 prepared at step 3508 are the change values of transaction data after a designated number of days (the parameter value at step 3603), however, the process under consideration is such that the displacement of the change value of the transaction data after a designated number of days from the predicted price value produced as an output from the system is calculated and stored.

Specifically, the low quotation value after a designated number of days, less the closed price of the day of reasoning application, less the value of the low predicted value limit 4503, is calculated and stored in the low quotation achievement 4002; the value of high quotation after a designated number of days, less the closed price of the day of reasoning application, less the value of high predicted limit 4504, in the high quotation achievement 4003; and the closed price after a designated number of days, less the closed price of the day of reasoning application, less the intermediate value between 4503 and 4504, in the closed price achievement 4504.

Now, the explanation about the chart evaluation process is over.

Figure 47:
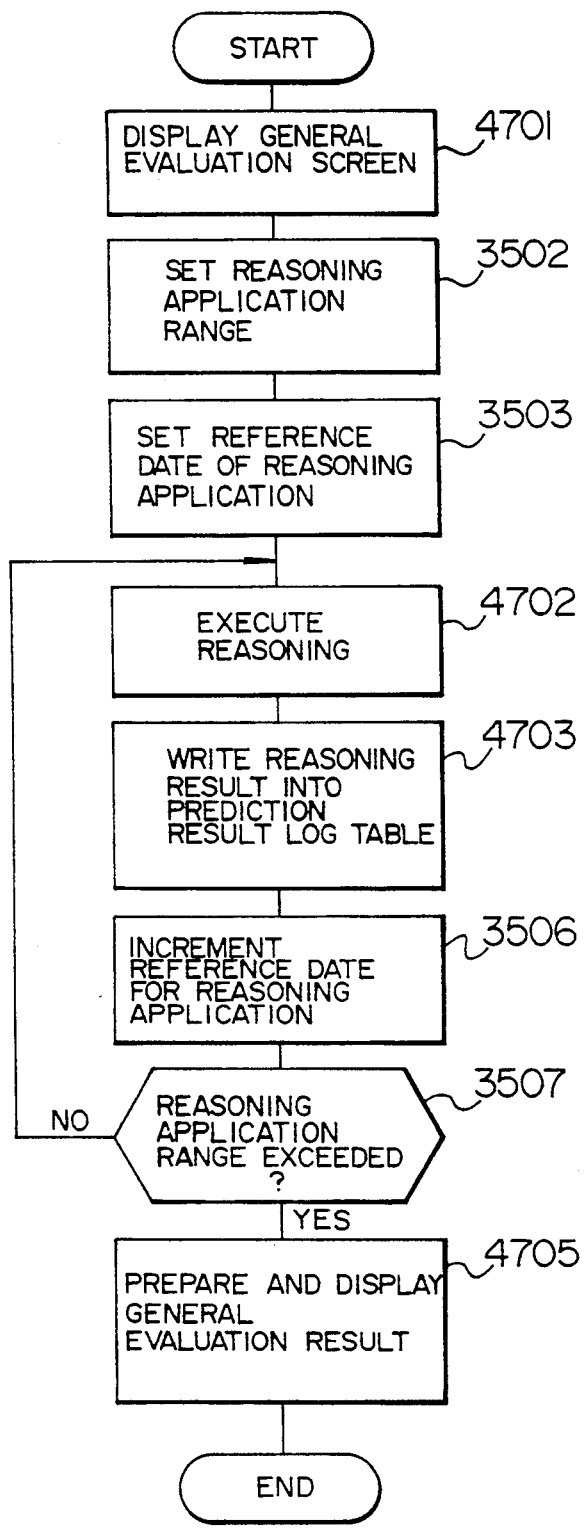
FIG. 47 is a flowchart showing the steps of processing the general evaluation.
Figure 48:
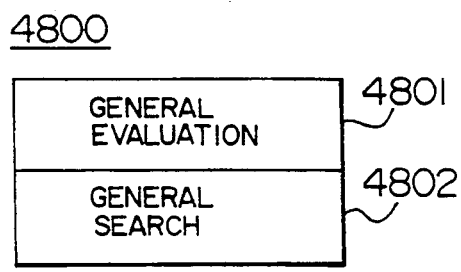
FIG. 48 is a diagram showing an example of output of a pull-down menu displayed on a general prediction screen.

The steps of processing the general evaluation of the whole system are shown in the flowchart of FIG. 47. This process is started by designating the 'Summarization' of the display area 2410 of the general prediction screen 2400 and further the 'General evaluation' of the menu area 4801 of the pull-down menu 4800 by the mouse 203. These steps are realized by substantially the same process as that for the chart evaluation shown in FIG. 43.

As compared with the chart evaluation in which a rule evaluation screen is displayed in the display unit at step 4301, however, a general prediction screen is displayed in the display unit at step 4701. The only difference between the screens is the title name, and therefore no example of screen display is shown in the process under consideration. Also, unlike in the rule evaluation where the reasoning is executed only for a designated rule group (step 4302), the general evaluation is such that the reasoning is executed for all rules (step 4702). This reasoning is executed by applying a step similar to step 104 shown in FIG. 1B. Like the step 402 of the rule evaluation process, however, the prediction result table 2000 accessed and the rule group execution result table 2100 are not the same stick as the table accessed at step 104 but are assumed to have the same structure as but a different stick from such a table. After that, by reference to a table having the same structure as the rule group execution result table 2100, the result of execution of all the rule groups is summarized through the same step as 805 shown in FIG. 8. In the process, the predicted general price change is stored not in the general result table 2200 but in the prediction result log table 4500 shown in FIG. 45 sequentially together with the arrangement number 4501 of the time series data subjected to reasoning (step 4303). The columns 4502, 4503 and 4504 of the table 4500 correspond to the columns 2201, 2202 and 2203 of the general result table 2200 respectively. The other parts of the process are similar to those of the rule evaluation. Step 4705 realizes the same result as step 4305.

Now, the explanation of the knowhow evaluation step 110 is over.

As will be seen from the foregoing explanation, according to the present embodiment, a knowhow relating to the interpretation of the conditions of a time series data held by an expert is capable of being described in an easily understandable expression. Also, when the conditions described in a rule are established, a message indicating the particular conditions and a predicted change of bond price may also be presented to the user, thereby making it possible to supply effective information supporting the decision-making on the bond selling and buying. Further, a rule executed may be displayed in an easily-visible layout as against a related time series data, so that by immediate change of a rule, such information as the frequency with which the particular rule is established in the past and the actual price change are capable of being produced repeatedly as required. Also, information on the extent to which the price prediction knowhow has been correct in the past for the whole system is made available repeatedly. As a result, the preparation and evaluation of the individual knowhows as well as the evaluation of the system as a whole may be efficiently carried out with simple operation on trial and error basis.

Further, if various optional functions are added to the system described according to the present embodiment, it is possible to supply information more effective to the user's decision-making. Such additional functions will be explained below.

Figure 49:
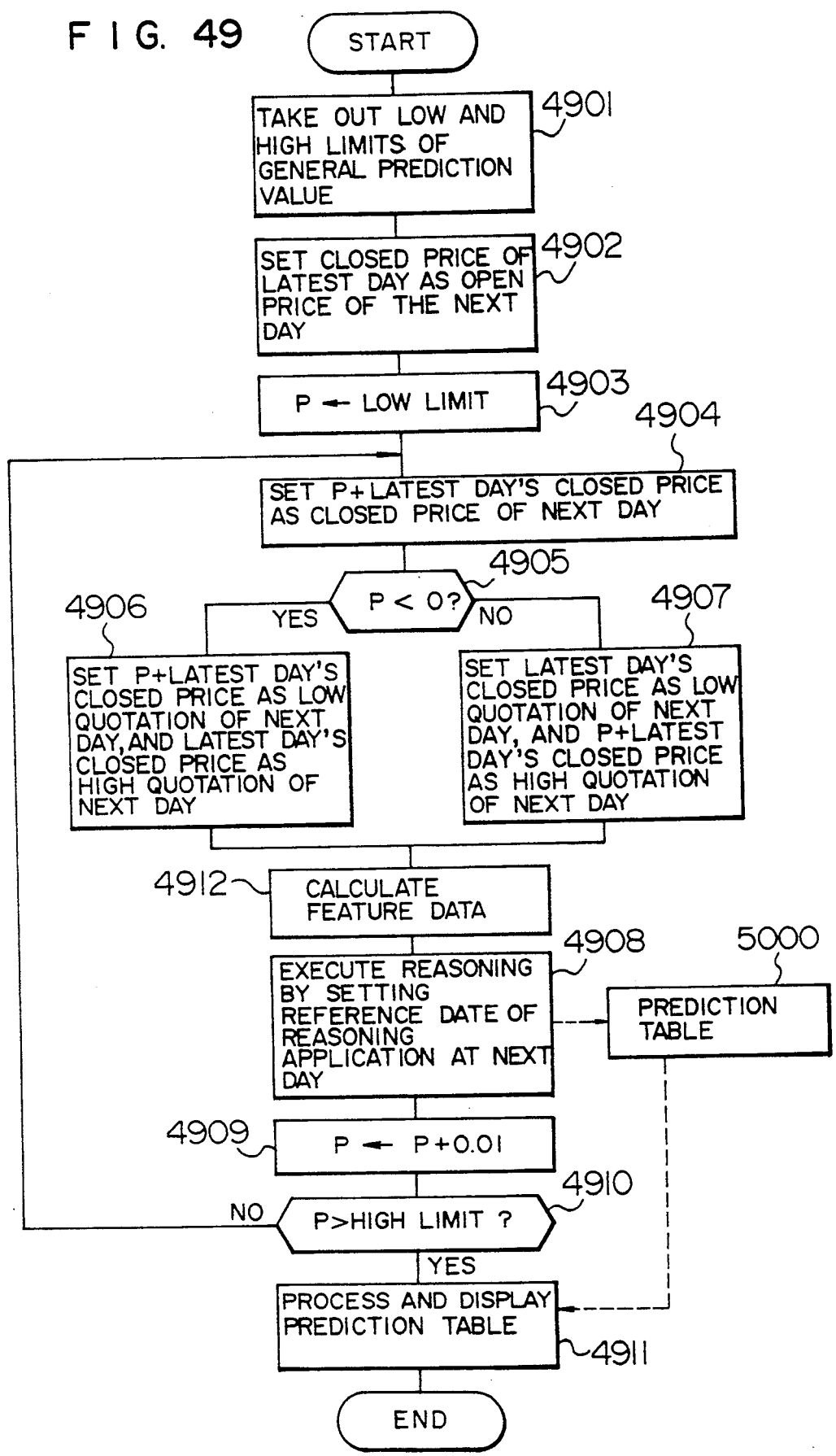
FIG. 49 is a flowchart showing the steps of processing the prediction function.

A first additional function, which is associated with the knowhow application step 109, is to determine information on the type of conditions which may be established in the future if the price undergoes a change within the framework of the bond price change predicted by the system. The steps of executing this function will be explained with reference to the flowchart of FIG. 49. This function is energized when the prediction result display area of 2406 in the general prediction screen 2400 is designated by mouse 203. First, the values of the predicted low limit 2202 and the predicted high limit 2203 of the general result table 2200 are taken out (step 4901). Then, the closed price of the latest data is set at the point for the next day's open price of the raw transaction data table 300 (at a point of arrangement number '101' when the latest data is available up to the arrangement number '100', for example) (step 4902). The low limit value taken out at step 4901 is set in the program variable P (step 4903). Further, the closed price plus P is set at the point of the day immediately following the closed price of the raw transaction data table 300 (step 4904). It is then checked whether or not the value P is negative (step 4905), and if it is negative, P plus the closed price of the latest day is set as the low quotation of the next day (step 4906). If P is not negative, on the other hand, the latest day's closed price is set as the low quotation of the next day, and P plus the latest day's closed price as the high quotation of the next day (step 4907). After that, the feature data is calculated for the hypothetical transaction data set up by the aforementioned step (step 4912). The feature data calculation is effected by the steps described with reference to the transaction data processing of step 102 in FIG. 1B. As the next step, the arrangement number for the day immediately following the latest day is written in the area of origin day for reasoning 350 and the initial area of origin day for reasoning 360 (step 4908). In this step of reasoning execution, the table 2000, 2100 or 2200 is not prepared, but in the case where a rule is established, the associated rule group name 702 and the message contents 706 described in the particular rule are sequentially written into a prediction table 5000 together with the closed price value set at the present time. The prediction table 5000, as shown in FIG. 50, is configured of a section 5001 for storing the contents of the message, a section 5002 for storing the associated rule group names, and a section 5003 for storing a plurality of hypothetical closed prices. As a result, to the extent that there are any associated rule group name 702 and message contents 706 of an established rule coinciding with 5001 and 5002 in the prediction table 5000, therefore, only the closed price value set at the present time is written additionally at a corresponding point, while otherwise the message 706, the associated rule group name 702 and the hypothetical closed price are newly written into the message 5001, the rule group name 5002 and the hypothetical closed price 5003 respectively of the same table 5000. As the next step, the value P is incremented by 0.01 (by one sen each) (step 4909), deciding whether the value P has exceeded the high limit taken out at step 4901 (step 4910). If the high limit is not exceeded, the process is returned to step 4904 to prepare a new hypothetical transaction table, while if it is exceeded, the value stored in the prediction table 5000 is produced as an output in the form shown in the prediction result display area 2404 of the general prediction screen 2400 (step 4911).

According to the embodiment described above, an event which may happen in the future is capable of being presented to the user in the range of the price change determined at step 104 by the system. The output of the general prediction screen 2400 of FIG. 24, for example, predicts as of August 3 that the next day's bond price would change between 106.74 and 106.88 yen. Further, it is noted that if the bond price for the next day reaches 106.74 yen, the event called 'Top on unsteady high plateau' would occur. Also, no matter what value the next day's bond price may take between 106.74 and 106.88, it is seen from the chart 'Stocastics' that 'K and D are KD'. In other words, this information relates to a time point beyond the next day's prediction and provides an important support for the bond trading by the dealer, i.e., the user.

Figure 51:
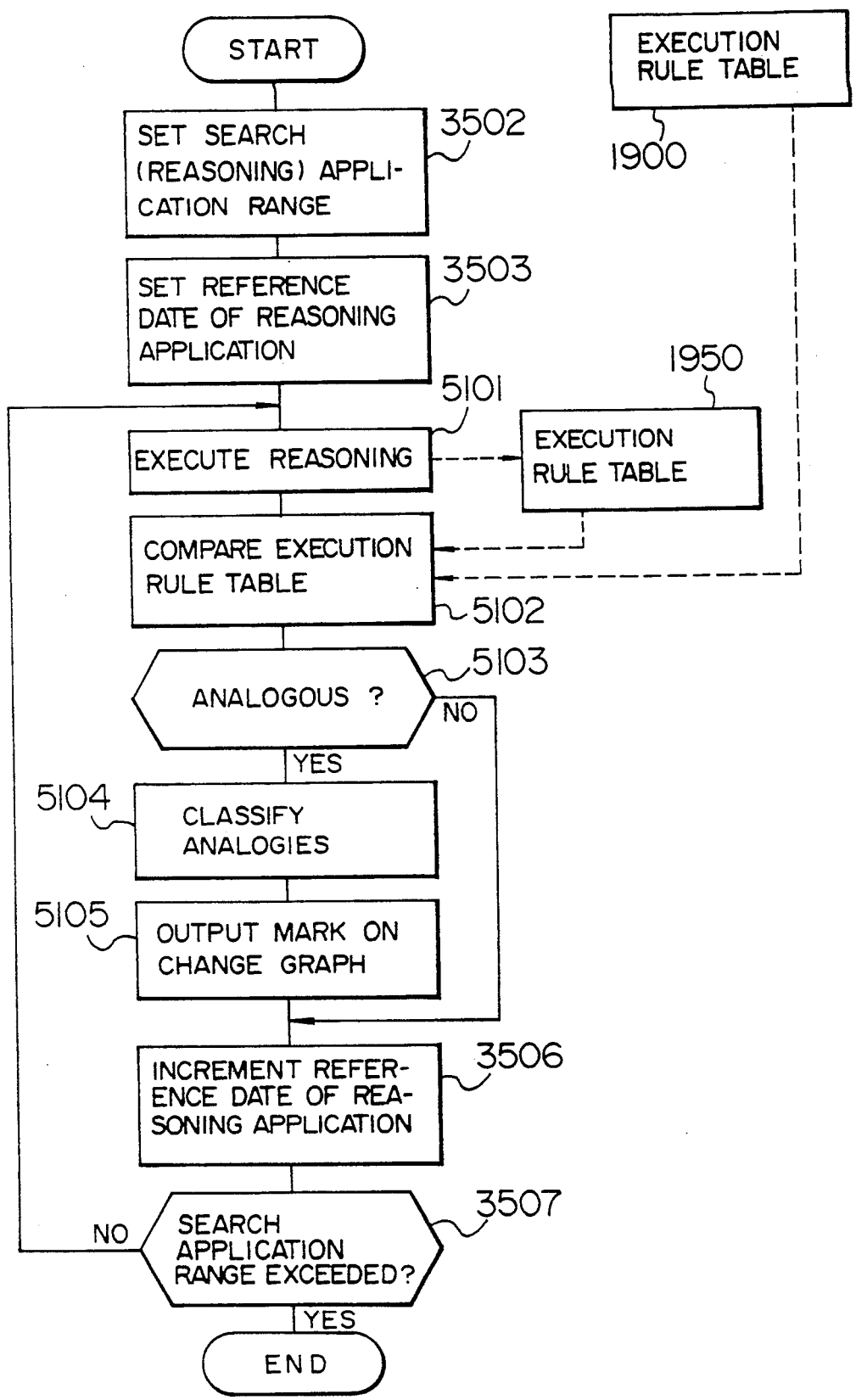
FIG. 51 is a flowchart showing the steps of processing the search function.

The search process which makes up another additional function will be explained. This process is also a part of the knowhow application 109, and functions to search the past for a day with the conditions analogous to those of the present time point and visually display the analogous day on a change graph in the screen. This process is started by designating 'Summarization' of the display area 2410 of the general evaluation screen 2400 by mouse 203, and the menu area 'general search' 4802 of the pull-down menu 4800 displayed subsequently, also by mouse 203. The execution rule table 1900 has already been prepared by the execution of reasoning of step 104 by this time. Specific steps of processing will be explained with reference to the flowchart of FIG. 51.

Figure 52:
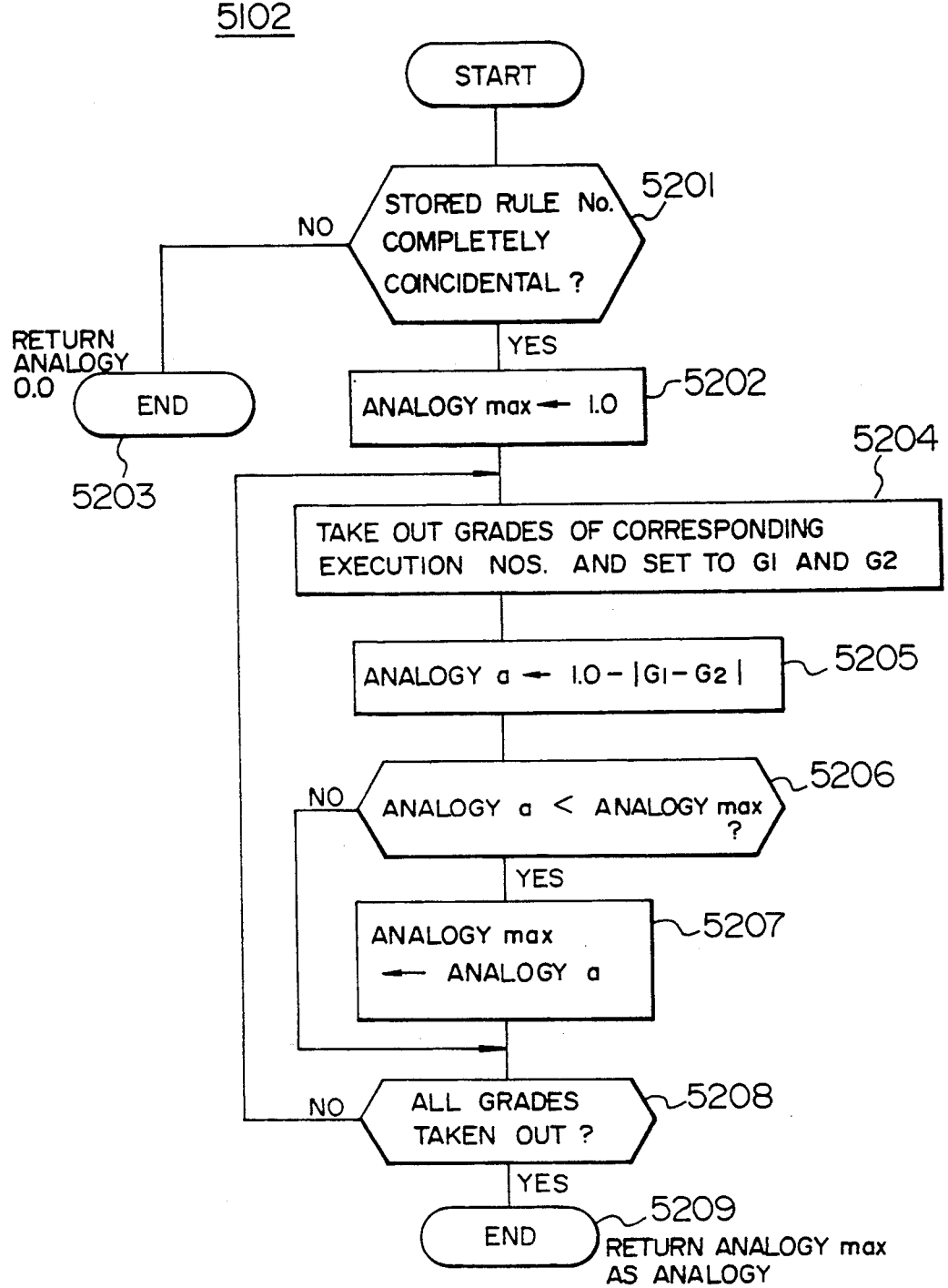
FIG. 52 is a flowchart showing the steps of processing the calculation of the degree of analogy.

First, the range of search application is set (step 3502). The range of search application means that of reasoning application, which is set by a process similar to that of step 3502 used for the rule evaluation in FIG. 35. Then, the initial value of the range of reasoning application is set in the area of origin day for reasoning 350 and the initial area of origin day for reasoning 360 (step 3503), followed by execution of reasoning (step 5101). This step of reasoning execution is similar to step 104, except that the same stick as the various tables created at step 104 is not accessed but a different stick having the same structure. As a consequence, the execution rule table 1950 is prepared. This table, as shown in FIG. 19B, has the same structure as the execution rule table 1900. More specifically, an execution rule for the latest day for which the transaction data is available is stored in the execution rule table 1900, while the execution rule table 1950 has stored therein an execution rule for a past day presently intended for search. Then, the degree of analogy is determined by comparing these two tables with each other (step 5102). The steps of this process will be explained in detail with reference to FIG. 52. First, it is checked to see whether the execution rule numbers 1901 stored in the execution rule tables 1900 and 1950 coincide completely with each other (step 5201), and if any one of them is incoincident, the process is ended with the analogy set to '0.0' (step 5203). If the execution rule numbers are exactly coincident with each other, the initial value '1.0' is set to the program variable 'analogy max' (step 5302). The values of the grade 1902 of the corresponding rule number 1901 are taken out one by one and stored in the program variables G1 and G2 respectively (step 5204). After that, the value determined by the formula 1.0−|G1−G2| is set to the program variable 'analogy a' representing the individual analogy (step 5205). It is checked whether this individual 'analogy a' is smaller than 'analogy max' (step 5206). And if so, the value of 'analogy a' is set to the 'analogy max' (step 5207). Otherwise, the step 5207 is not executed. After that, it is checked whether or not the grades for all the execution rule numbers 1901 have been taken out (step 5208), and if all of them are not yet taken out, the process returns to step 5204 to take out the next execution rule number. If all the execution rule numbers 1901 have been taken out, on the other hand, the value of the 'analog max' is employed as an analogy to end the process (step 5209). Upon completion of analogy calculation, this value is decided to determine whether it is analogous (step 5103). The analogy is considered present if the figure is larger than '0.0'. When it is decided that analogy exists, it is classified by the degree of analogy thereby to determine the type of the marker produced as an output at a subsequent step 5105 (step 5104). When the analogy is 0.5 or less, for example, the marker type 'x' is determined as 'Δ' for 0.8 larger than 0.5 and as '0' for larger than 0.8. Further, the marker type thus determined is produced as an output by determining a position on a change graph presently subjected to reasoning (step 510). A position on the graph is determined by a method in which the arrangement number stored in the area of origin for reasoning 350 is applied to the variable i in equation 1 thereby to calculate the X coordinate thereof. Also, the Y coordinate is determined in such a manner that the equation of the X coordinate shown by equation 1 is replaced by the Y coordinate from the closed price data (table 300) of the arrangement number in the area of origin day for reasoning 350 and the minimum and maximum values of the graph display area.

After that, the values in the area of origin day for reasoning 350 and the initial area of origin day for reasoning 360 are incremented by 1 (step 3506), followed by checking whether this value exceeds the range of reasoning application (step 3507). If not, the process proceeds to step 5101, while otherwise the process is ended. According to the present embodiment, a day analogous to the latest day on the time series data is indicated on the graph representing the change in time series data, and therefore it is possible for the user to view a chart graph actually to refer to an analogous past point automatically in the system, thereby making possible accurate display of an analogous point. Also, an application of this process to a specific rule group facilitates the finding of an analogous day on a specific chart, while at the same time easily realizing the marker indication of the date of establishment of an individual rule on the graph by designating the particular individual rule. Further, since the marker types indicated on the graph are different depending on analogy, not only information about an analogous date but also the extent of analogy are presented very clearly to the user. Further, assume that the general prediction screen 2400 and the graph display area of the screen by chart 2500 are designated by mouse 203 and the value of the abscissa of the input coordinate is applied to Xi in the equation 2 above, then a time series data arrangement number corresponding to the input position is determined, so that the data at the point of the arrangement number by the feature data displayed on the input screen is capable of being taken out by mouse 203. By displaying this value, the data value at a point designated by mouse 203 may be presented as a specific numeric character train This process may be combined to observe a detailed data value at the point involving the marker display.

According to this embodiment of the invention, the knowhow held by an expert on the interpretation of a time series data is capable of being described in an easy-to understand rule presentation. In executing the reasoning by application of this process and establishing the conditions described in the rule, a message indicating the particular conditions and a predicted change of the bond price may be presented to the user, thereby making it possible to propose an accurate support information effective for decision-making on the bond trading. Further, executed rules may be displayed in an easily visible layout against a related time series data. By changing these rules immediately, information is obtainable as to the frequency with which such rules are established in the past and the actual price change whenever required.

Also, such information as the percentage of correctness of the price prediction knowhow for the system as a whole in the past is displayable repeatedly as required. Thus not only the preparation and evaluation of individual knowhows but also the evaluation of the whole system may be implemented effectively with simple operation on trial and error basis.

Now, explanation will be made in detail about a decision-making support system according to another embodiment of the present invention as applied to option and spot bond tradings.

Figure 53:
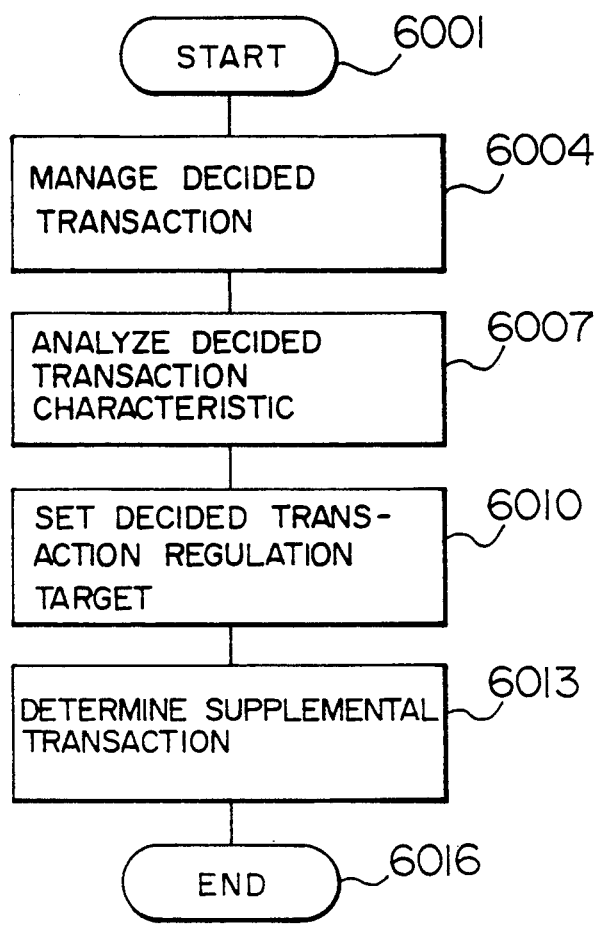
FIG. 53 is a flowchart showing a method of decision-making support according to another embodiment of the present invention.
Figure 54:
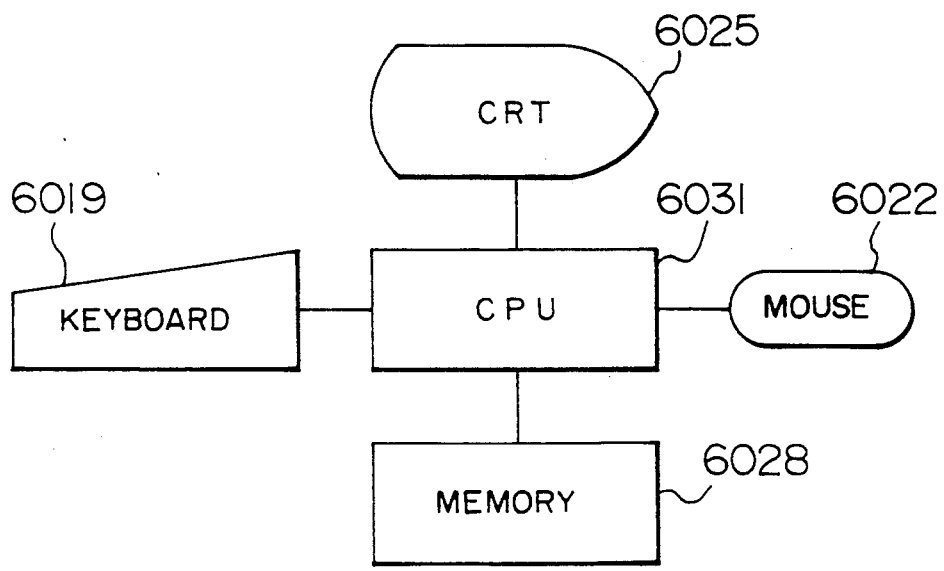
FIG. 54 is a diagram showing a configuration of a computer system according to the present invention.
Figure 80:
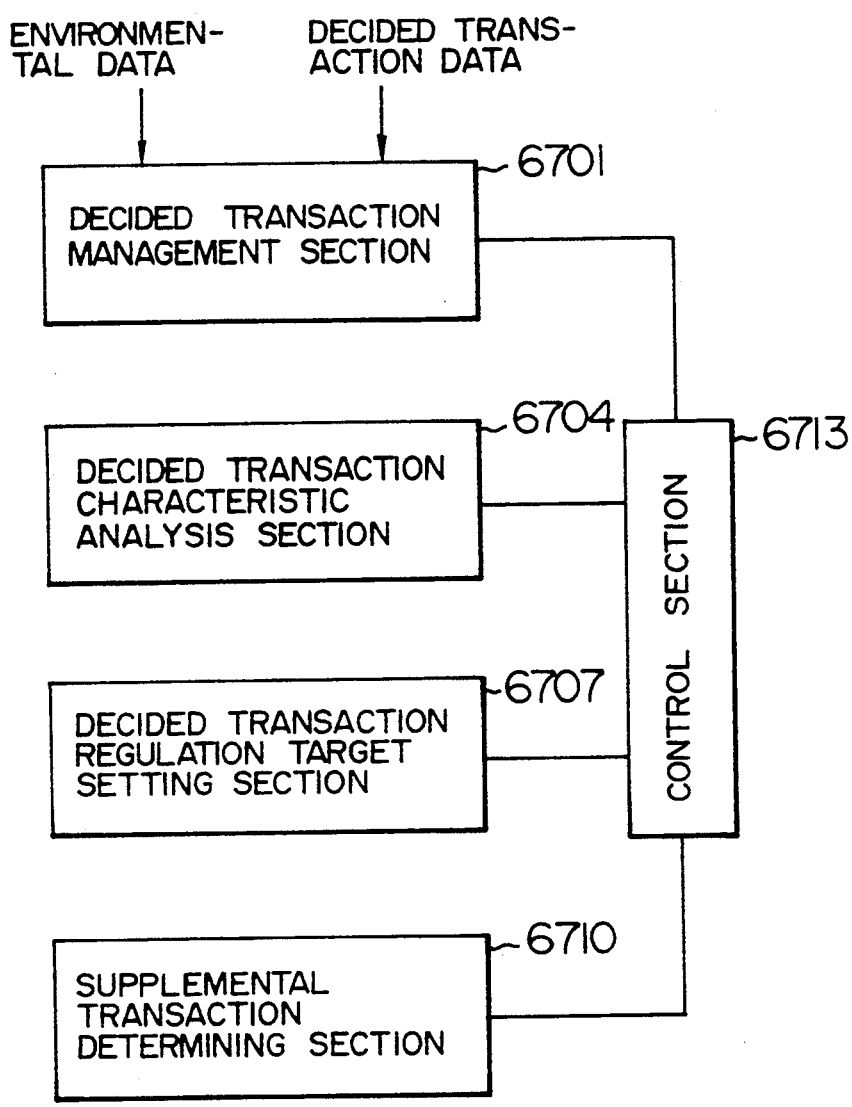
FIG. 80 is a block diagram showing a decision-making support system according to the present invention.

A flowchart according to such another embodiment of the present invention is shown in FIG. 53, a configuration of a computer system according to the present invention in FIG. 54, and a functional block diagram of a decision-making support system according to the present invention in FIG. 80. Also, FIG. 55 is a diagram for explaining the position characteristics of the option bond trading according to the present invention.

First, reference is had to FIGS. 54, 80 and 55.

In FIG. 54, reference numeral 6019 designates a keyboard, numeral 6022 a mouse for responding to the system and inputting or correcting data, numeral 6025 a CRT for displaying the data from the system, numeral 6028 a memory for storing programs and data of the system, and numeral 6031 a CPU for controlling the system.

In FIG. 80, numeral 6701 designates a decided transaction management section, numeral 6704 a decided transaction characteristic analysis section, numeral 6707 a decided transaction regulation target (object) setting section, numeral 6710 an additional transaction (trading) determining section and numeral 6713 a control section.

The position characteristics will be explained with reference to FIG. 55.

In applying the present invention to the support of decision-making in financial transactions, a decided transaction is an agreed one held at the time of execution of the system according to the present invention. The position according to the present embodiment, therefore, is indicative of the total sum of option and spot transactions (trading) of a bond of a given description. The characteristics of such a position are indicated by position characteristics indexes including the position payoff, position delta, position gamma, position theta and position kappa.

The position payoff is the total of profit and loss evaluations associated with a position and is given by the equation 6034. Each call option and put option (hereinafter called merely "call and put") is evaluated by the use of a Black-Scholes price model expanded to divided payment. According to this model, the call prices C (S, K, t, c, r, v) and put prices P (S, K, t, c, r, v) are given by equations 6036 and 6037 respectively, and the spot bond price B (S, U) by the equation 6038. Through these equations, the call price, put price and spot bond price at the present time are given by 6039, 6040 and 6041 respectively. The position delta, gamma, theta and kappa are differential factors of the position payoff, and are given by equations 6043, 6046, 6049 and 6052 respectively.

Now, the flowchart of FIG. 53 will be explained.

First, the system is energized (step 6001), and the position is grasped and the position characteristic calculated at the decided transaction management section 6701 (step 6004). Then, the decided transaction characteristic analysis section 6704 prepares a figure indicating the position characteristic which is displayed on the CRT 25 (step 6007). The user, referring to this figure, sets a position regulation target fitting an investment target at the decided transaction regulation target setting section 6707 (step 6010). The system then determines a supplemental transaction required for changing the position toward such a direction as to satisfy the position regulation target (object) at the supplemental transaction determining section 6710, and displays the supplemental transaction on the CRT 6025 (step 6013), thus ending the process (step 6016). The control section 6713 is for controlling the transaction (trading) of the process over different sections and the delivery and receipt of the data held by each section.

Now, each step in FIG. 53 and each block in FIG. 80 will be explained in detail below.

Figure 56B:
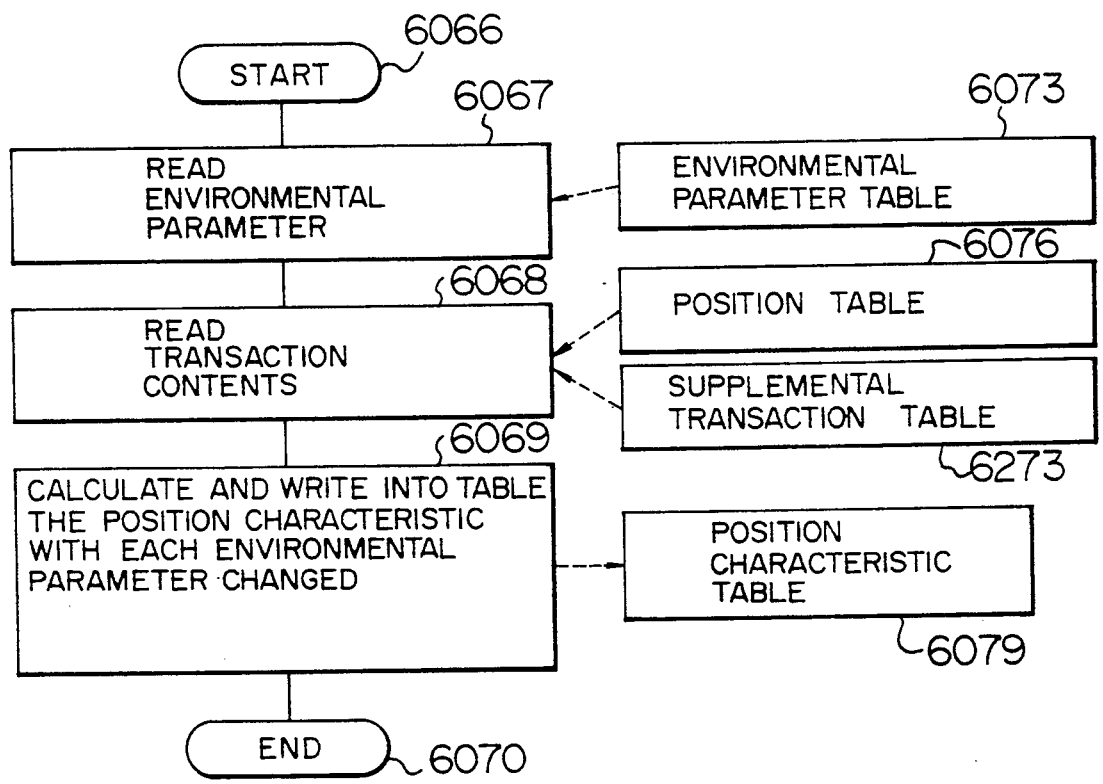
Figure 81:
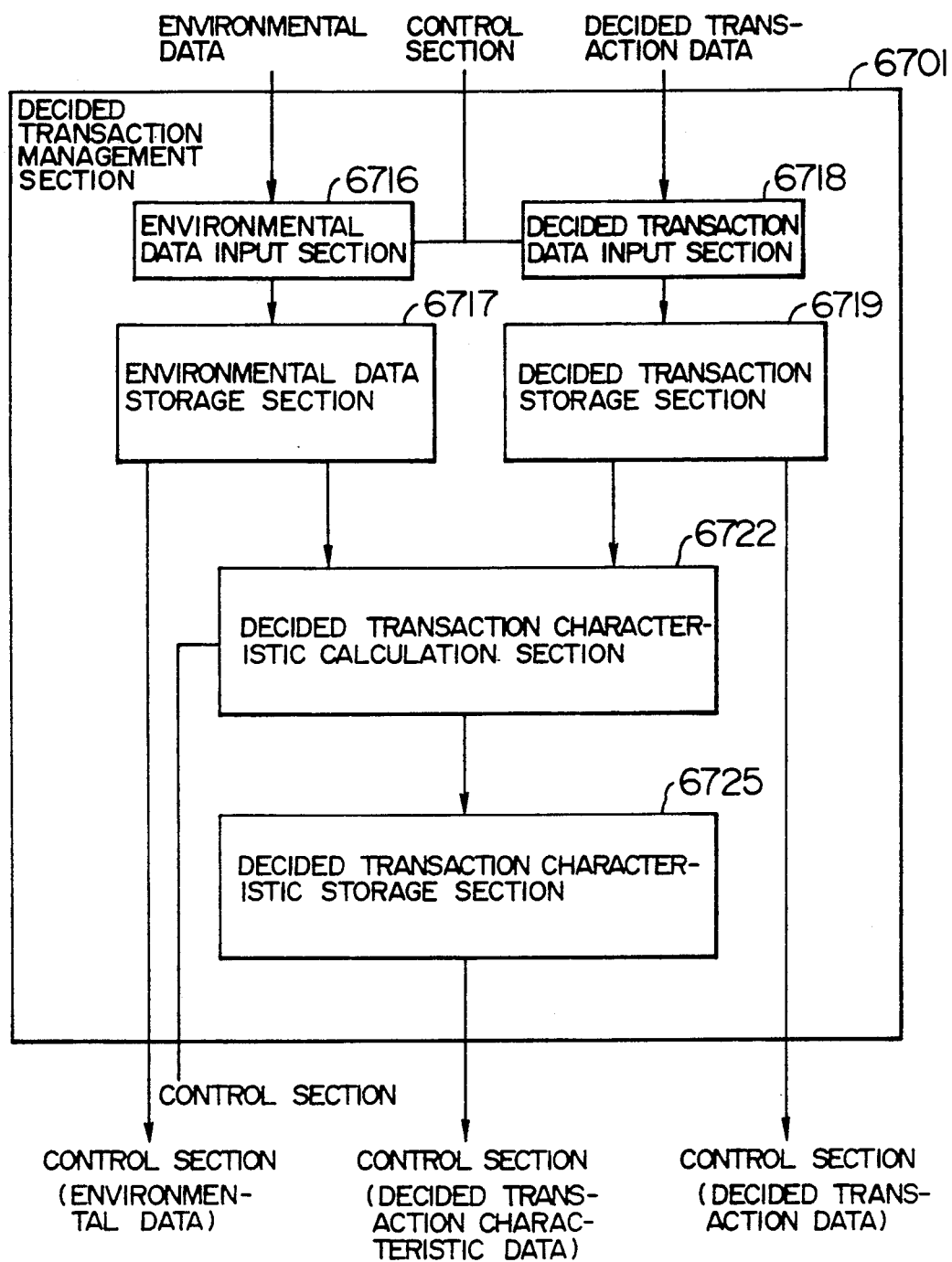
FIG. 81 is a block diagram showing a decided process management unit shown in FIG. 80.

FIGS. 56A, 56B are flowcharts representing a specific operation of the decided transaction management step 6004 in FIG. 53. FIG. 81 is a block diagram showing a specific configuration of the decided transaction management section 6701. Also, FIGS. 57, 58 and 59 are diagrams for explaining tables prepared at the decided transaction management step 6004 respectively.

First, reference is had to FIGS. 81, 57, 58 and 59.

In FIG. 81, numeral 6716 designates an environmental data storage input section, numeral 6717 an environmental data section, numeral 6718 a decided transaction data input section, numeral 6719 a decided transaction storage section, numeral 6722 a decided transaction characteristic calculation section, and numeral 6725 a decided transaction characteristic storage section.

The environmental parameter table 6073 shown in FIG. 57 is prepared for each description, and has written thereinto parameters required for calculating the position characteristic, including and limited to the risk free rate determined by market trend, change rate of bond price (hereinafter called "the volatility"), the bond price and the dates of input thereof.

The position table 6076 in FIG. 58 is prepared by description, and has written thereinto the call/put/spot the option and spot bond tradings, buy or sell, strike price, strike date (expiration), amount of transaction (trading) (face value of transaction (trading) amount in the case of spot bond).

The position characteristic table 6079 of FIG. 59 has written thereinto the position characteristic values obtained as a result of changing such environmental parameters as the bond price, volatility, risk free rate and data (present time point) (the parameters other than those making up variables are fixed to the latest values set in the environmental parameter table).

Now, the flowcharts of FIGS. 56A and 56B will be explained with reference to the blocks of FIG. 81 and the data set in the tables of FIGS. 57, 58 and 59. In the flow of steps shown in FIG. 56A, the environmental parameters and the decided transaction data are inputted and written into the tables. The flow of steps of FIG. 56B is continued from that of FIG. 56A to calculate the position characteristics.

In the flow of steps shown in FIG. 56A, when the decided transaction management step 6004 is started (step 6054), the description (=national bond 111), risk free rate (=4.5), volatility (=3.0), bond price (=100.00) and data input date (=1989/12/14) of the bonds held for option and spot transactions (tradings) are inputted through the environmental data input section 6716 (step 6055), and the data thus inputted are written into the environmental parameter table 6073 in the environmental data storage section 6717 (step 6058). Then, the description, call/put/spot, sell or buy, strike price, strike date and the transaction (trading) amount (the face value in the case of spot bond) making up the contents of the option and spot bond tradings held are applied as an input to the decided transaction data input section 6718 as [call, buy, 99.50, 1990/1/10, 10] and [put, buy, 100.50, 1990/1/11, 10], and the data thus inputted are written into the position table 6076 included in the decided transaction storage section 6719 (step 6064), thereby ending the process (step 6065).

In the flow of steps shown in FIG. 56B, the process is started at step 6066, environmental parameters are written by way of the environmental parameter table 6073 included in the environmental data storage section 6717 (step 6067), the contents of transaction (trading) are read from the position table 6976 included in the decided transaction storage section 6719 or the supplemental transaction (trading) table 6273 included in the supplemental transaction storage section 6752 described later (step 6068), the values of the position characteristics (including the position payoff position delta, position gamma, position theta and position kappa) with a designated environmental parameter changed are calculated by the use of the equations 6034, 6036, 6037, 6038, 6039, 6040, 6041, 6043, 6046, 6049 and 6052 at the decided transaction characteristics calculation section 6722 with the calculation result written into the position characteristic table 6079 included in the decided transaction characteristic storage section 6725 (step 6069), thereby ending the process (step 6070). The present embodiment, however, deals with only a case in which the bond price of all the environmental parameters is changed by units of 10 sen in the range of the present bond price between +1.00 and −1.00 yen. Also, the decided transaction characteristic calculation section 6722 calculates the position characteristic value in accordance with the flow of steps shown in FIG. 56B in response to the demand from each processing section described later.

Figure 60:
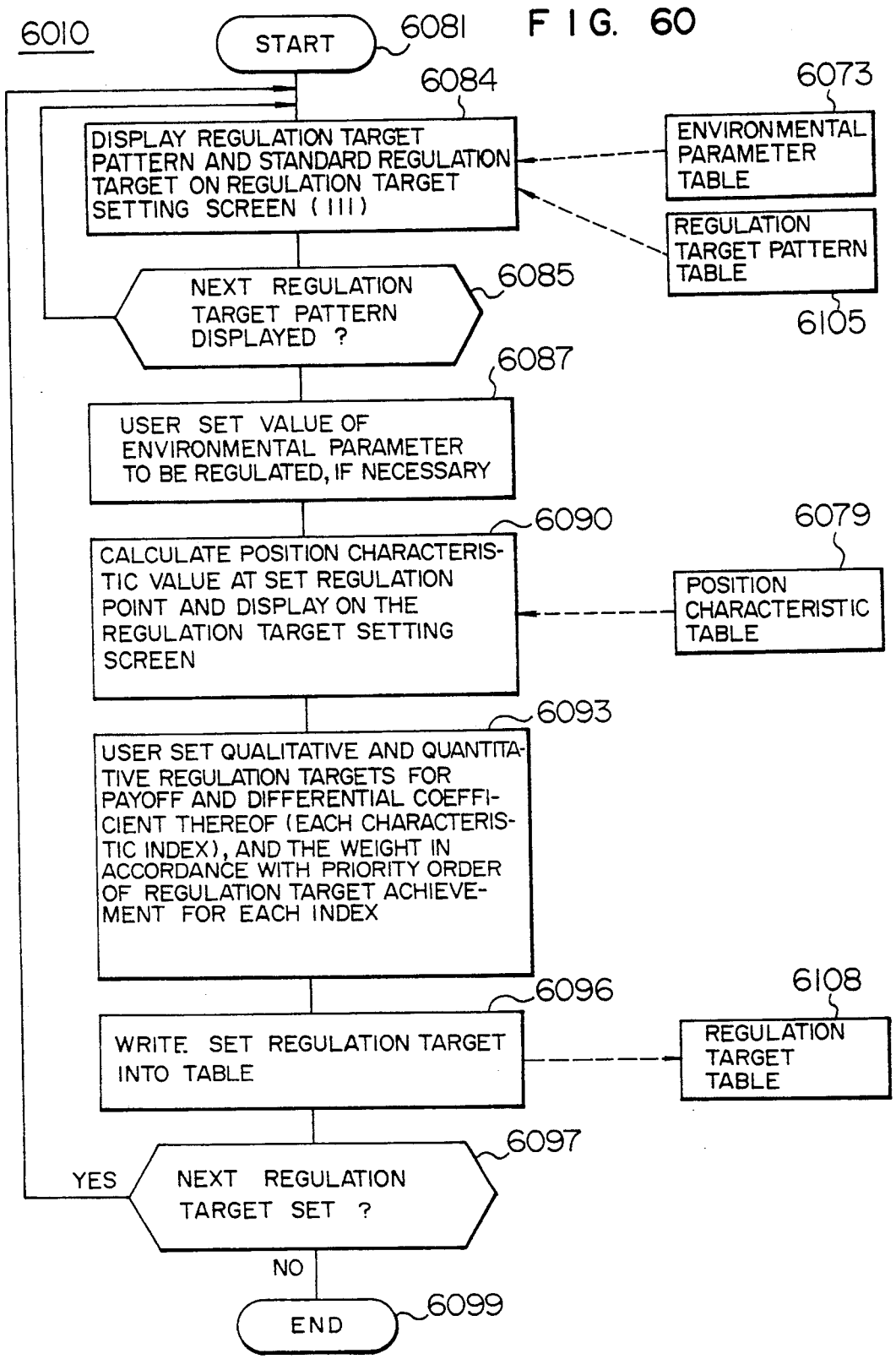
FIG. 60 is a flowchart showing a decided transaction regulation target-setting step shown in FIG. 53.

FIG. 60 is a flowchart of a decided transaction regulation target setting step 6010 shown in FIG. 53. FIG. 82 is a block diagram showing a specific configuration of the decided transaction regulation target setting section 6707 in FIG. 80. FIG. 61 is a diagram for explaining the tables referred to at step 6010, FIG. 62 a diagram for explaining the tables prepared at step 6010, and FIG. 63 a diagram for explaining the screen for setting a regulation target (objective) using step 6010.

First, the block diagram FIG. 82, the tables of FIGS. 61 and 62 and the screen of FIG. 63 will be explained.

In FIG. 82, numeral 6728 designates a decided transaction target (objective) setting processing section, 6731 a decided transaction regulation target (objective) pattern storage section, and 6734 a decided transaction regulation target storage section.

The regulation target (objective) pattern table 6105 in FIG. 61 has registered therein a patternized qualitative regulation policy directed to each position characteristic index at the time of position regulation. The availability of the regulation target pattern table permits the storage of each investment policy of the user in the form of pattern.

The regulation target (objective) table 6108 shown in FIG. 62 has written therein an environmental parameter to be regulated, the target value after regulation, the direction of regulation (+, −) and the weight representing the order of priority of regulation of each position characteristic as a regulation target (objective) set at the decided transaction regulation target (objective) setting step 6010 against each position characteristic index.

The regulation target (objective) setting screen 6111 in FIG. 63 is displayed on the CRT 6025 of FIG. 54. Numeral 6123 in the screen designates a display section and numeral 6126 a setting section. Numeral 6129 in the display section 6123 designates a display column of the regulation target pattern No. In order to display the regulation policy for each position characteristic index 6132 associated with a particular pattern and the present value of the position characteristic, the screen also includes a regulation policy display column 6135 and a column 6138 for displaying the present value of the position characteristic. Also, the setting section 6126 includes, for enabling the user to designate a regulation point of an environmental parameter, a bond price setting column 6141, a date setting column 6144, a volatility setting column 6147, a risk free rate setting column 6150, and an after-regulation target (objective) setting column 6153 for setting a target value, a value representing the amount of regulation of each position characteristic (hereinafter called "the regulation value"), the direction of regulation and the weight, a regulation value setting column 6156, a regulation direction setting column 6159 and a weight setting column 6162.

Now, the flowchart of FIG. 60 showing the decided transaction regulation target setting step 6010 will be explained with reference to the block diagram of FIG. 82, the data in the tables of FIGS. 59, 61 and 62 and the position regulation target setting screen 6111 of FIG. 63. Step 6010 is executed for enabling the user to set a regulation target while referring to a position characteristic analysis screen 6501 (FIG. 78) displayed at a decided transaction characteristic analysis step 6007 according to the present embodiment. The decided transaction characteristic analysis step 6007 will be described at the end of the explanation of the present embodiment.

In the decided transaction regulation target setting step 6010 (FIG. 53), upon starting the process (step 6081), the following steps are executed at the decided transaction regulation target setting processing section 6728. A regulation target setting screen 6111 is displayed on the CRT 6025 (FIG. 54) thereby to read the regulation target pattern 1 at the head of the regulation target pattern table 6105 included in the decided transaction regulation target pattern storage section 6731. The regulation policy of each position characteristic index is displayed in the regulation policy display column 6135 of the setting screen. Then, the present environment is read from the environmental parameter table 6013 and displayed in the regulation point setting column 6141, 6144, 6147 and 6150 of the setting screen (step 6084). If the regulation target pattern displayed is not the one intended for by the user, the is displayed by being read from the regulation target pattern table. According to the present embodiment, the regulation target pattern 1 is selected to end pattern selection (step 6085). In the next step, the user corrects and sets the regulation point of an environmental parameter if required (step 6087). Upon this setting, the position characteristic value at the regulation point thus set (with the bond price of 100.00, regulation time point of 0, volatility of 3.0, and risk from rate of 4.5) is calculated at the decided transaction characteristic calculation section 6722 according to the flow of steps shown in FIG. 56B. Then the position characteristic values at the regulation point (position payoff of 3.99, position delta of 1.24, position gamma of 8.40, position theta of −0.103 and position kappa of 1.11) are read and displayed in the present value display column 6135 of the regulation target setting screen 6111 (step 6090). Then, the user sets the target value after regulation, the regulation value and weight. In the process, with regard to the characteristic index position payoff for which 0 is set as the weight, '*' is set in the columns of the target value after regulation, regulation value and direction of regulation for exclusion from the position regulation target. By inputting a selected one of the target value after regulation and the regulation value, on the other hand, the other is determined and set automatically from the relationship "Target value after regulation=-Present value+Regulation value". According to this embodiment, the target value after regulation is inputted, so that according to the regulation policy, the target value 0 after position delta regulation is set to "approach 0" for the position delta, the target value 10.00 after position gamma regulation is set to "further increase the positive value" for the position gamma, the target value −0.103 after position theta regulation is set to "approach the present value" for the position theta, and the target value 1.11 after position kappa regulation providing a value for maintaining the present condition is set "to assume a positive value" for the position kappa. The regulation values are automatically set in the regulation value setting column 6156 on the basis of the above-mentioned relationship in such a manner that the position delta regulation value assumes −1.24, the position gamma regulation value +1.60, the position theta regulation value 0 and the position kappa regulation value 0. Also, with regard to the direction of regulation, on the other hand, with the directivity of the regulation value viewed qualitatively, the position delta direction '−' and the position gamma direction '+' of regulation are set in the regulation direction setting column 6159, while the position theta and the position kappa, which are liable to satisfy the regulation target regardless of whether regulated to the direction '+' or '−', are such that the position theta direction '*' and the position kappa direction '*' of regulation are automatically set. With regard to the weight, the position payoff weight 0, the position delta weight a, the position gamma weight b, the position theta weight c and the position kappa weight d (a, b, c and d given positive numbers) are set in the weight setting column 6162. In spite of this, a standard value of 1 may be set as the weight in advance. In this step, the target value after regulation and the regulation value may be set as a standard value determined from the regulation policy and the present value in advance (step 6093). Then, the target value after regulation, the direction of regulation and the weight thus set are written in the regulation target table 6108 included in the decided transaction regulation target storage section 6734 (step 6096), and when setting the next regulation target, the process is returned to step 6084, while when the next regulation target is not set (step 6097), the process is ended (step 6099).

Figure 64:
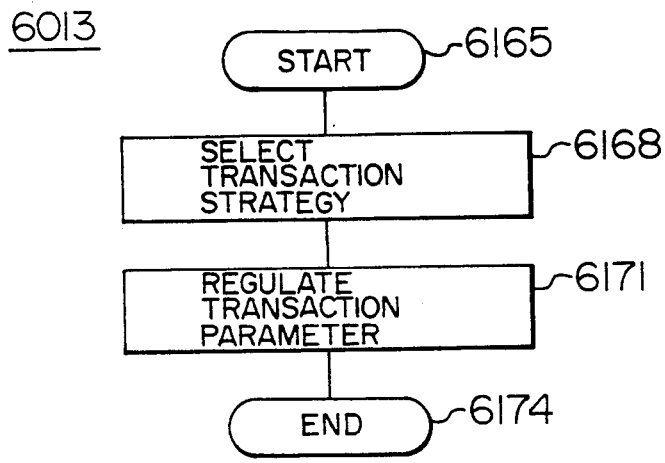
FIG. 64 is a flowchart showing the supplemental transaction determination step shown in FIG. 52.
Figure 83:
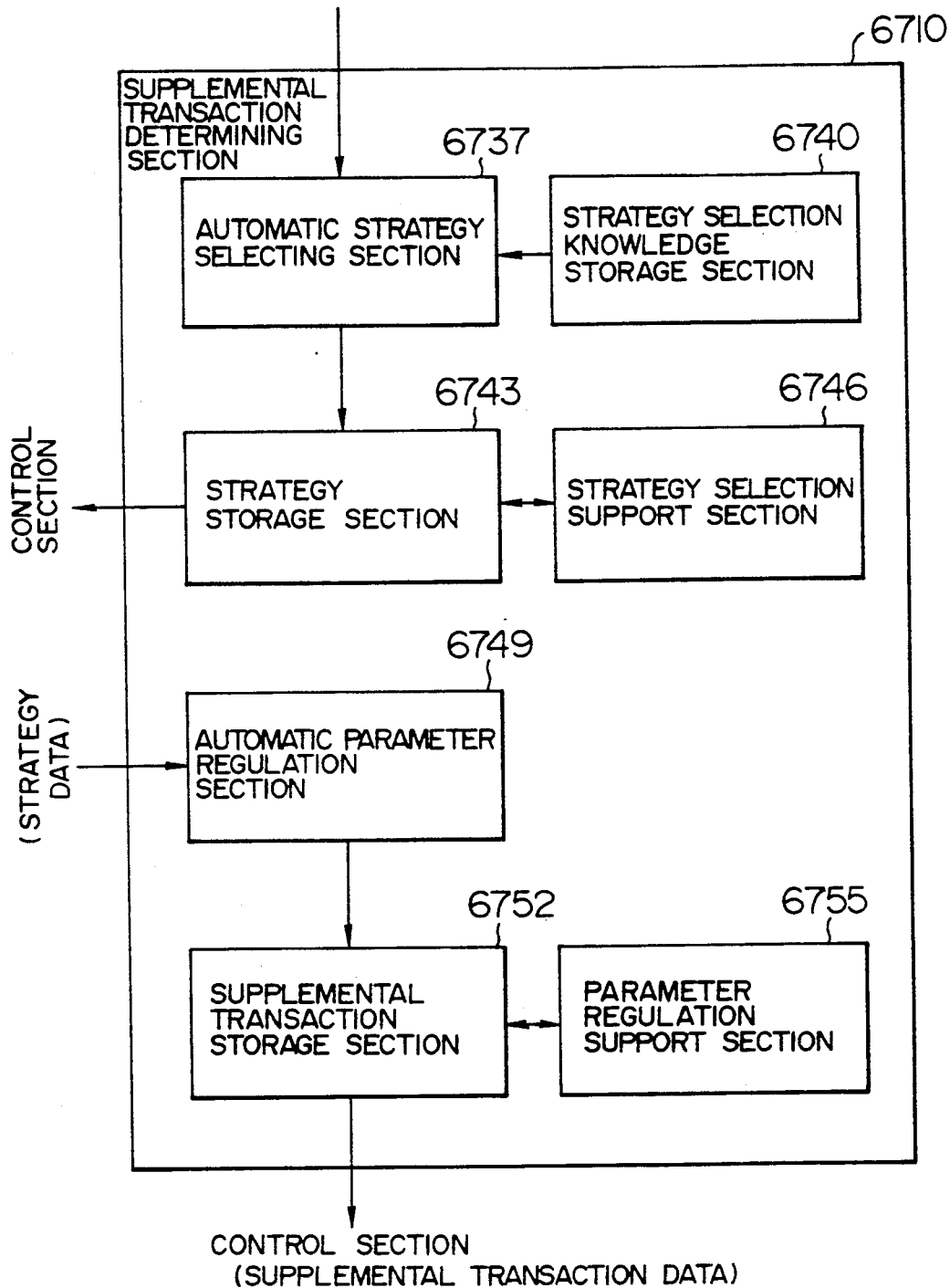
FIG. 83 is a block diagram showing a supplemental transaction determination unit in FIG. 80.

FIG. 64 is a flowchart of the supplemental transaction determining step 6013 shown in FIG. 53. When this step 6013 is started (step 6165), the relationship between the combination of supplemental transactions qualitatively satisfying the position regulation target, allowable range of transaction parameters and the parameter (called "the strategy") is selected (step 6168). In the range of this strategy, the transaction parameters are regulated to determine the contents of the supplemental transaction (step 6171), thus ending the process (step 6174). In this way, the range of search for a solution is defined at the first stage and a solution is searched for within the particular range at the second stage, thereby making it possible to seek a solution efficiently. Also, the supplemental transaction determining step 6013 is processed at the supplemental transaction determining section 6710 shown in the block diagram of FIG. 83. In FIG. 83, numeral 6737 designates an automatic strategy selecting section, 6740 a strategy selection knowledge storage section, numeral 6743 a strategy storage section, numeral 6746 a strategy selection support section, numeral 6749 an automatic parameter regulation section, numeral 6752 a supplemental transaction storage section, and numeral 6755 a parameter regulation support section.

Now, explanation will be made in detail about the transaction strategy selecting step 6168 and the transaction parameter regulation step 6171 with reference to the block diagram of the supplemental transaction determining section shown in FIG. 83.

Figure 65:
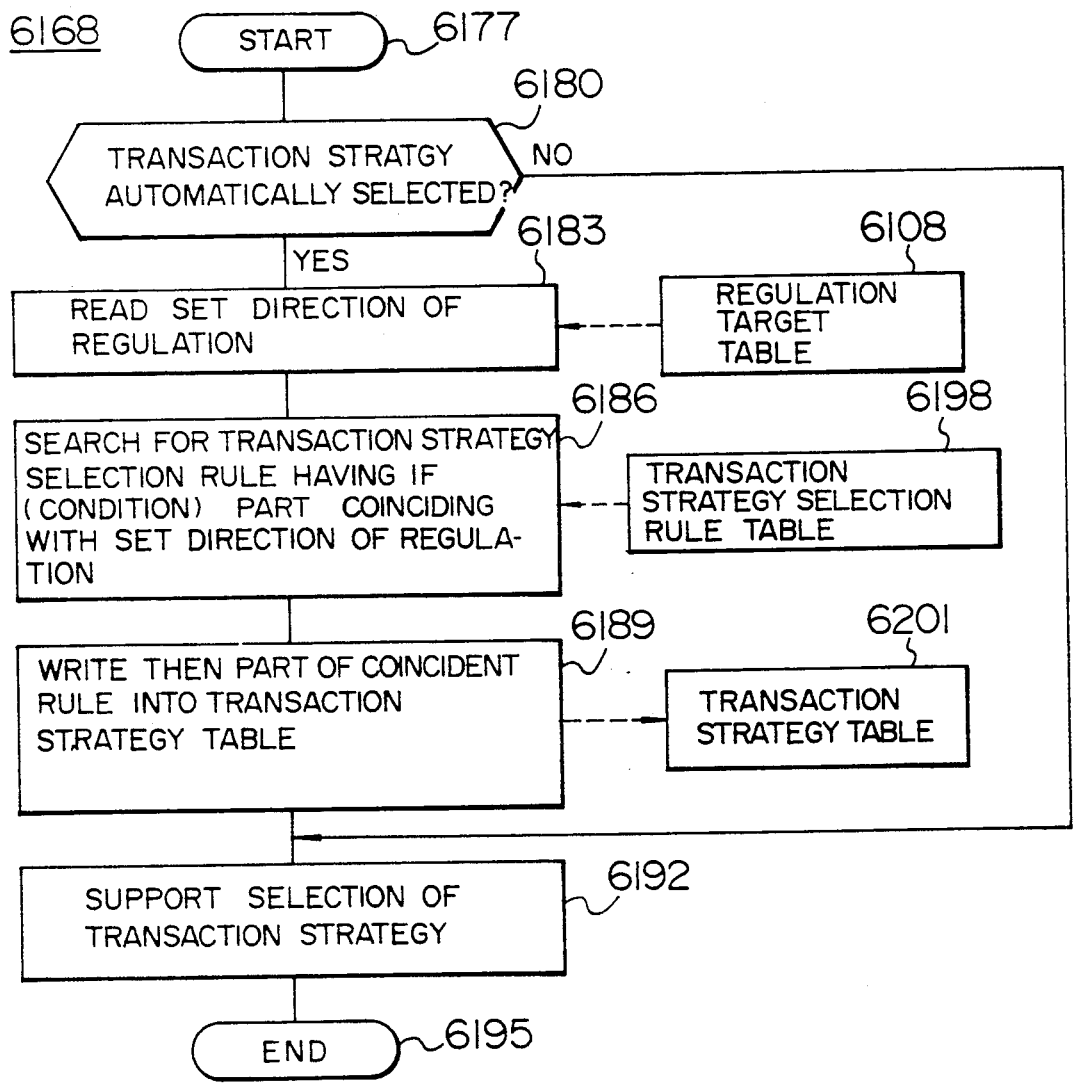
FIG. 65 is a flowchart showing the transaction strategy selection step shown in FIG. 64.
Figure 68:
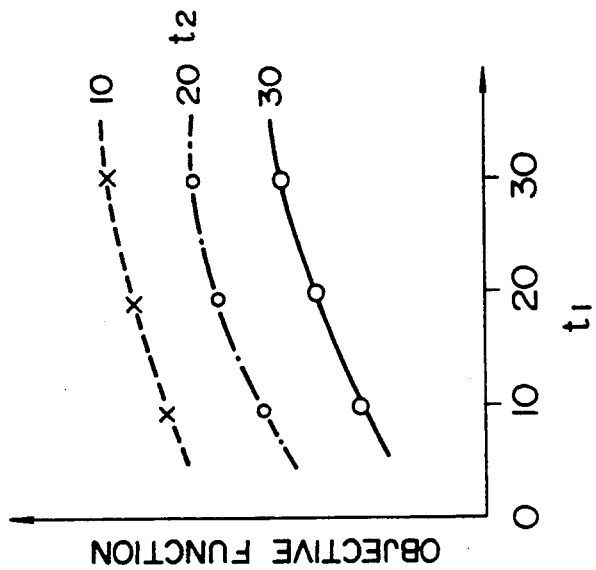
FIG. 68 is a diagram for explaining a transaction strategy selection screen used for the processing shown in FIG. 65.

FIG. 65 is a flowchart for the transaction strategy selecting step 6168, FIG. 66 a table referred to at step 6168, FIG. 67 a table into which the strategy selected at step 6168 is written, and FIG. 68 a diagram for explaining the display screen for the strategy selected at step 6168.

First, the tables of FIGS. 66 and 67 and the screen of FIG. 68 will be explained.

The transaction strategy selection rule table 6198 shown in FIG. 66 is a storage table for a transaction strategy selection rule presented in IF-THEN form. A IF part has set therein the direction of regulation of each position characteristic index by symbols representing the qualitative direction of regulation +, −, 0 or *, and a THEN part has set therein the call/put/spot, sell or buy, the range of strike price, the range of period up to the strike date (expiration), the range of transaction amount (the range of face value of transaction in the case of spot trading) and the relationship between parameters. When the Black-Scholes formula is used as a payoff function, an extreme change in an environmental parameter might change the qualitative tendency of the position characteristic, and therefore according to this rule, description is made within a range of environmental parameters having a predetermined tendency or the range of environmental parameters is also described in the IF part. This embodiment represents the former case.

The transaction strategy table 6201 in FIG. 67 is one for writing thereinto the transaction selected at the transaction strategy selecting step 6168, the range of the parameters and the relationship between parameters, and has set therein the call/put/spot, sell or buy, the range of strike price, the range of period to the strike date (expiration), the range of transaction amount (the range of face value of the transaction amount in the case of spot trading), the relationship between parameters and the transaction number added to each transaction.

The transaction strategy selecting screen 6204 of FIG. 68 is for displaying the transaction selected at the transaction strategy selecting step 6168 and has displayed thereon the information similar to the transaction strategy table 6201. Also, this screen is utilized at the transaction strategy selection support step 6192 described later.

Now, the flowchart of the transaction strategy selecting step 6168 of FIG. 65 will be explained with reference to the block diagram of FIG. 83, the regulation target table 6108 of FIG. 62, the transaction strategy selection rule table 6198 of FIG. 66 and the transaction strategy table 6201 of FIG. 65.

First, the transaction strategy selecting step 6168 is processed at the automatic strategy selecting section 6737, so that when the step 6168 is started (step 6177), an inquiry as to whether the transaction strategy is to be selected automatically is issued from the system. If the automatic selection is not involved, the transaction strategy selection support step 6192 is executed to end the process (step 6195). If the automatic selection is intended for, on the other hand, the direction of regulation set at the decided transaction regulation target setting step 6010 is read from the regulation target table 6108 (step 6183), thereby matching the pattern of the direction of regulation thus read [payoff *, delta −, gamma +, theta * and kappa *] with that of the IF part of the transaction strategy selection rule table 6198 included in the strategy selection knowledge storage section 6740. In the process, the symbol * indicating the impossibility of determining the direction of regulation at '+' or '−' is matched with the rule No. 2 because it can be matched with any of '+', '0' and '−' of the rule IF part according to this embodiment. In the case where a plurality of regulation targets are set, a rule is selected satisfying a plurality of directions of regulation at the same time (step 6186). The contents of the two transactions written in the THEN part of the rule No. 2 are written into the transaction strategy table 6201 included in the strategy storage section 6743 and further displayed on the transaction strategy selecting screen 6204. At the same time, the range of strike price [S−1, S, S+1] is applied as an output to the table after being substituted by the present bond price S of 100 yen (step 6189). After that, the transaction strategy selection support step 6192 is executed at the strategy selection support section 6746 thereby to end the process (step 6195).

Now, the diagram of FIG. 69 showing a flowchart of the transaction strategy selection support step 6192 will be explained with reference to the transaction strategy table of FIG. 67 and the transaction strategy selection screen 6204 of FIG. 68.

In this step, the call/put/spot, sell or buy, the range of strike price, the range of period before the strike date (expiration), the range of transaction amount (the range of face value of transaction amount in the case of spot trading) and the whole or part of the parameter relations making up the contents of a transaction strategy are corrected and set, and a part of the parameters is fixed while only the remaining independent parameters are changed by the user to calculate the transaction position characteristic and the objective function mentioned later, so that the degree of satisfaction of the regulation target is displayed in accordance with the parameter change (called the analysis support), thereby enabling the user to support the understanding of a transaction strategy as well as correct the transaction strategy.

First, when the transaction strategy selection support step 6192 is started (step 6202), a strategy, if any is stored in the transaction strategy table 6201, is read and displayed on the transaction strategy selecting screen 6204 (step 6205), thus enabling the user to select whether or not the transaction strategy is to be analyzed (step 6207). If no analysis is made, the parameter regulation support is not effected, and if required, the user sets the range of the transaction strategy parameter (step 6222), thus ending the process (step 6225). In the case where the transaction strategy is analyzed, by contrast, four of the six parameters K1, t1, L1, K2, t2 and L2 in the transaction strategy selecting screen 6204 the values of which are fixed (K1, L1, K2 and L2 according to the present embodiment) are selected, and the values thereof (K1=100.00, L1=10, K2=100.00 and L2=10 according to the present embodiment) are selected by being picked up on the screen by way of mouse 6022. In a system according to the present invention, a maximum of two parameters may be changed and the result of analysis thereof may be displayed on the graph. Therefore, all the parameters except for two or less independently changeable (t1, t2 according to the present embodiment) ones are fixed. In the case of a strategy having three transactions with nine parameters, for example, seven parameters are fixed. Further, the range of independently changeable parameters is set (step 210). Then, as a form of the graph for displaying the result of analysis, a parameter assumed on the abscissa of the two independent parameters (t1 according to the present embodiment) and a parameter displayed with the graph line type changed (t2 according to the present embodiment) are selected. Further, as an evaluation value assuming the ordinate, the position characteristic or an objective function is selected (step 6213). On the basis of this setting, the position characteristic or the objective function is calculated at the decided transaction characteristic calculation section 6722, and the combination of values most satisfying the regulation target (t1=10 and t2=30 according to the present embodiment) in the ranges (10, 20, 30) of the parameters t1 and t2 set free is displayed by attaching the mark * on the transaction strategy selecting screen 6204 and produced as an output on the graph (step 6216). Then, the process is returned to step 6207, and the user selects whether or not the analysis is to be continued. If the analysis is to be continued, steps 6210, 6213 and 6216 are executed repeatedly. If the analysis is ended, on the other hand, the user decides whether or not the transaction strategy should be corrected on the basis of the analysis result. In the case where the transaction strategy should be corrected, the call/put/spot, sell or buy, the range of strike price, the range of period before the strike date (expiration) and the range of transaction amount (the range of the face value of the transaction, amount in the case of spot trading) and the relationship of parameters providing the contents of the strategy are set again in the transaction strategy selecting screen 6204, and the resulting data is written into the transaction strategy table 6201 (step 6222), thereby ending the process (step 6225).

FIG. 70 shows a flowchart of the transaction parameter regulation step 6171, and FIG. 71 a diagram for explaining the objective function used to optimize the transaction parameter. FIGS. 72 and 73 are diagrams for explaining a table holding an intermediate data required for the processing at step 6171, FIG. 74 a diagram for explaining a table into which the contents of the supplemental transaction determined at step 6171 are written, and FIG. 75 a diagram for explaining the display screen of the supplemental transaction determined at step 6171.

First, explanation will be made about the objective function of FIG. 71, the tables of FIGS. 72, 73 and 74 and the screen of FIG. 75.

The transaction parameter regulation step 6171 uses an objective function in order to determine the transaction parameter, the strike price K, the period T before the strike date and the transaction amount L suitable for satisfying the regulation target for the characteristics including the position payoff II, the position delta $\Delta$, the position gamma $\Gamma$, the position theta $\Theta$ position kappa K. Such an objective function will be explained with reference to FIG. 71.

In such a manner as to take a minimum value when satisfying the target value after regulation for each position characteristic index set in the regulation target table 6108, assume that the objective functions determined for each characteristic index are $Q\pi$, $Q\delta$, $Q\gamma$, $Q\theta$ and K respectively. Then the objective function for optimizing all the characteristic indexes may be presented in the form as shown by equation 6521 with the respective objective functions coupled in linear fashion. The objective function for each characteristic index according to the present embodiment assumes a minimum value when satisfying the target value after regulation and the regulation pattern selected at the regulation target setting step 6010 (FIG. 60), and may be determined in such a manner as to be subjected to penalty for other values. More specifically, $Q\delta$ is subjected to penalty when $\Delta$ assumes a value other than the target value 0; $Q\gamma$ when $\Gamma$ assumes a value smaller than the target value 10.0; $Q\theta$ when $\Theta$ assumes a value other than the target value of $-0.103$; and Qz when K assumes a value other than the target value of $-1.11$ as shown in equations 6522, 6523, 6524 and 6525 respectively. Since the weighting of the position payoff II is 0, however, no objective function for II is set.

The parameter regulation table by transaction 6267 shown in FIG. 72 is one into which the position characteristics are written relating to all the combinations of the parameters by transaction as calculated within the range of the transaction parameters and the regulation point determined by a transaction strategy.

The parameter regulation table 6279 of FIG. 73 is one into which the result is written of the value of the objective function relating to all the combinations of transactions by the use of the value of the parameter regulation table by transaction 6267.

The supplemental transaction table 6273 shown in FIG. 74 is one into which the call/put/spot, sell or buy, the strike price, the period before strike date and the transaction amount (which is the face value of the transaction amount in the case of spot trading) are written making up the contents of the supplemental transaction determined by regulating the transaction parameters at the transaction parameter regulation step 6171.

The supplemental transaction screen 6276 shown in FIG. 75 is one for displaying the contents of the supplemental transaction determined at the transaction parameter regulation step 6171, on which is displayed information similar to the one written into the supplemental transaction table 6173. Also, this screen is used at the transaction parameter regulation support step 6261.

Now, the flowchart of the transaction parameter regulation step 6171 of FIG. 70 will be explained with reference to the block diagram of the supplemental transaction determining section of FIG. 83, the transaction strategy table 6201 of FIG. 67, the parameter regulation table by transaction 6267 of FIG. 72, the parameter regulation table 6270 of FIG. 73, the supplemental transaction table 6273 of FIG. 74 and the supplemental transaction screen 6276 of FIG. 75.

First, the transaction parameter regulation step 6171 is processed at the automatic parameter regulation section 6749. When the step 6171 is started (step 6228), the user selects whether the transaction parameter should be subjected to automatic regulation or not (step 6231). If automatic regulation is not involved, the transaction parameter regulation support step 6261 is executed and the process is ended (step 6264), while if automatic regulation is involved, the transaction 1 [call, buy] making the transaction at the head of the transaction strategy table 6201 is read (step 6234), the range of the parameters [K1={99.00, 100.00, 101.00}, T1={10, 20, 30}, L1={10, 30, 100}] is also read (step 6237), and the position characteristics for all the parameter combinations are calculated and written into the parameter regulation table by transaction 6267 (step 6240). In the case where the transaction strategy table has the next transaction, the next transaction 2 [put, buy] and the range of the parameters thereof [K2={99.00, 100.00, 101.00}, T2={10, 20, 30}, L2={10, 30, 100}] is read, followed by repeating the step 6240 (step 6243). Upon reading the transaction strategy table 6201, an objective function reflecting the regulation target set at step 6010 is automatically set (step 6244). Then, one of the combinations of the parameters of the transactions 1 and 2 [{K1=99.00, T1=10, L1=10}, {K2=99.00, T2=10, L2=10}] is determined (step 6246), while verifying whether the relationship (L2=L1) of parameters read from the transaction strategy table 201 is satisfied (step 6249), and if not, the next combination is determined. When the parameter relationship is satisfied, on the other hand, the objective function automatically set is calculated, and the result thereof written into the parameter regulation table 6270 together with the parameter combination (step 6252). In the presence of the next combination, the combinations [{K1=99.00, T1=10, L1=10}, {K2=99.00, T2=10, L2=30}] are determined, followed by steps 6249 and 6252. When there is no combination any longer, a minimum calculation value of the objective function is searched for from the parameter regulation table 6270, and the parameter combination involved is read and written into the supplemental transaction table 6273 included in the supplemental transaction storage section 6752 (step 6258). The parameter regulation support section 6755 executes the transaction parameter regulation support step 6261, thereby ending the process (step 6264).

Figure 76:
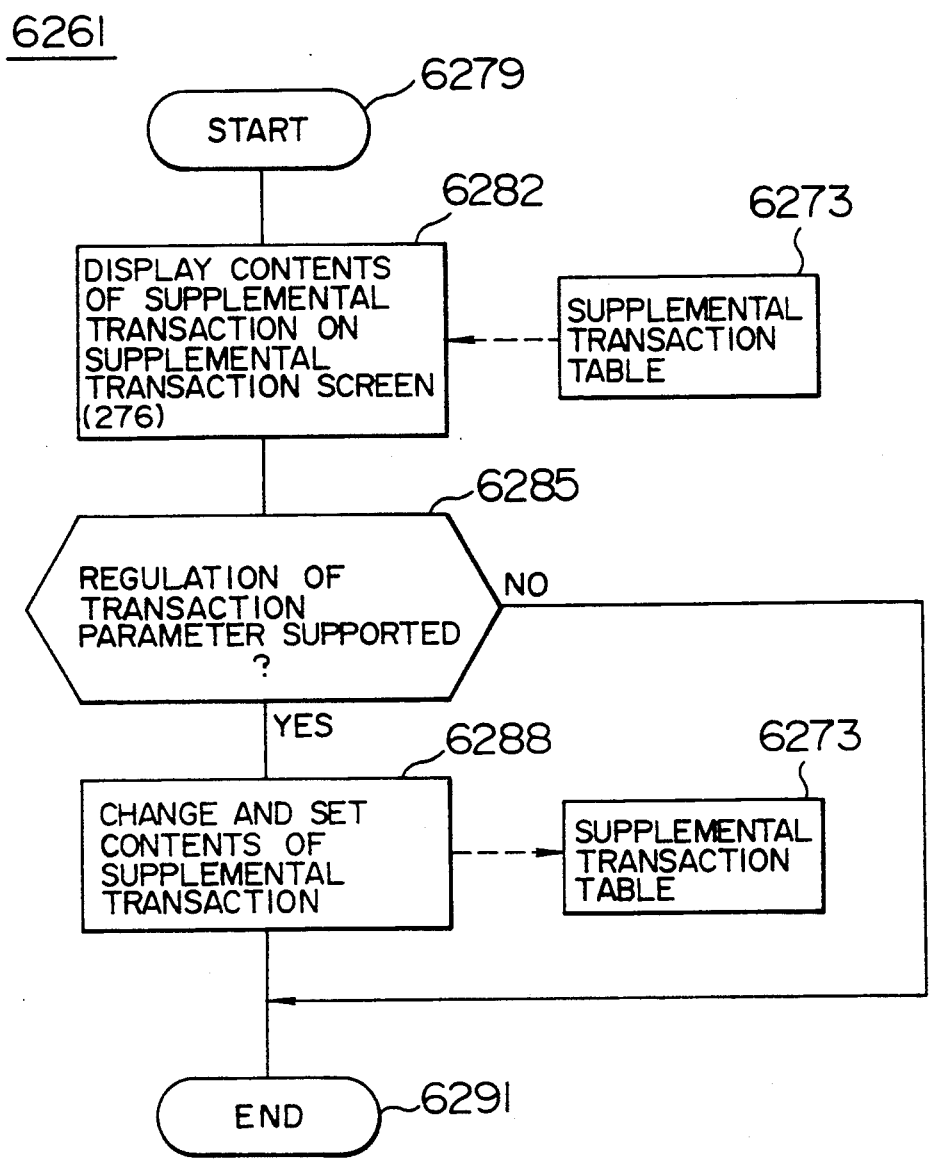
FIG. 76 is a flowchart showing the transaction parameter regulation support step in FIG. 70.

A flowchart of the transaction parameter regulation support step 6261 will be explained below with reference to the supplemental transaction screen 6276 of FIGS. 76 and 75.

First, when the transaction parameter regulation support step 6261 is started (step 6279), the contents of the supplemental transaction are read from the supplemental transaction table 6273 and displayed on the supplemental transaction screen 6276 (step 6282). Then, the user selects whether or not the transaction parameter regulation support is to be executed (step 6275), and if not, the process is ended (step 6291). In the case where the support is executed, on the other hand, the user changes and sets the contents thereof on the screen, and the result thereof is written into the supplemental transaction table 6273 (step 6288), thereby ending the process (step 6291).

The effect that the contents of the supplemental transaction have on the position regulation as a result of this change and setting is capable of being viewed on the position characteristic analysis screen 6501 (FIG. 78) by the decided transaction characteristic analysis explained in detail later with reference to FIG. 77.

Figure 77:
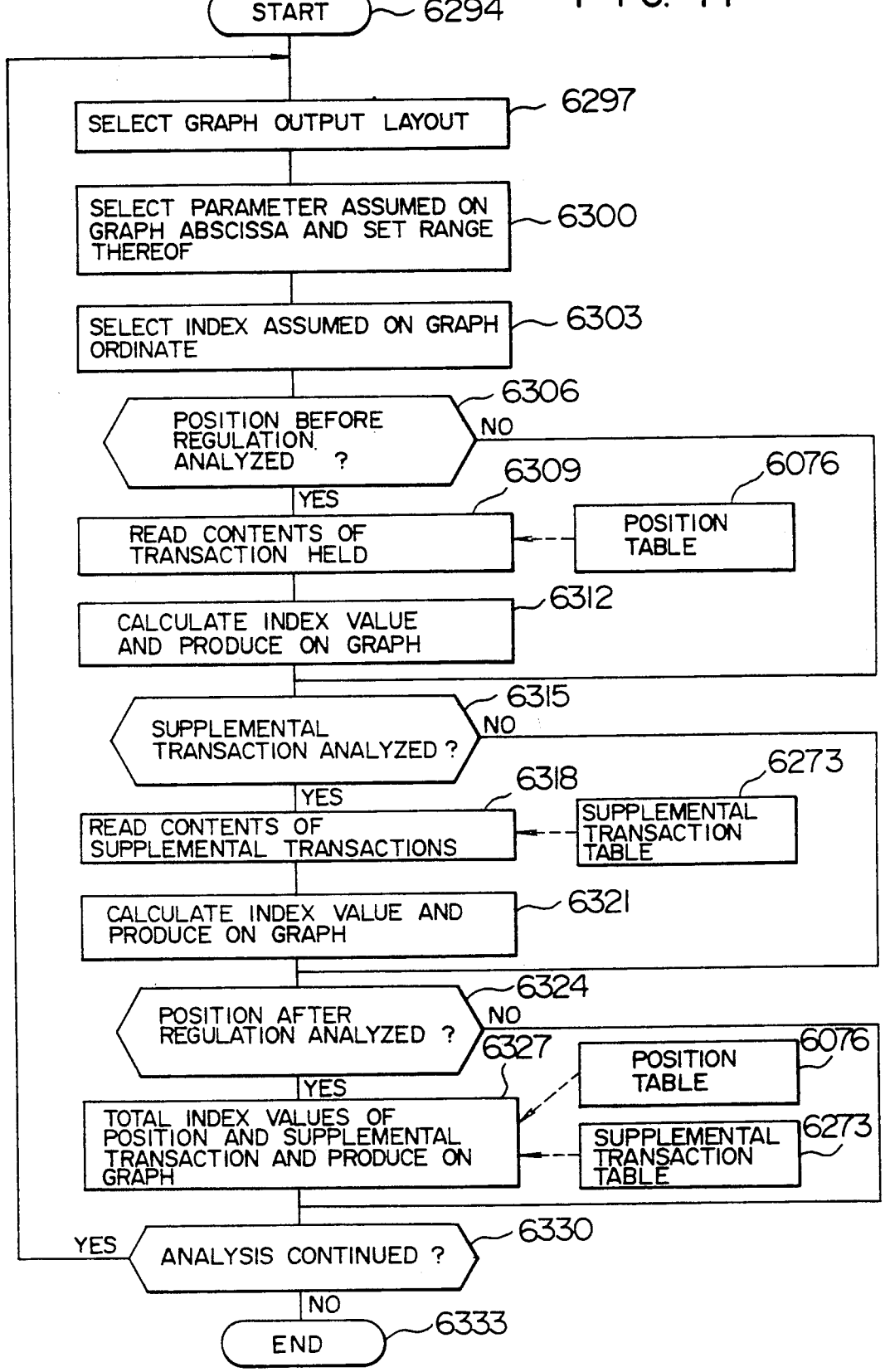
FIG. 77 is a flowchart used for the position characteristics analysis according to the present invention.
Figure 78:
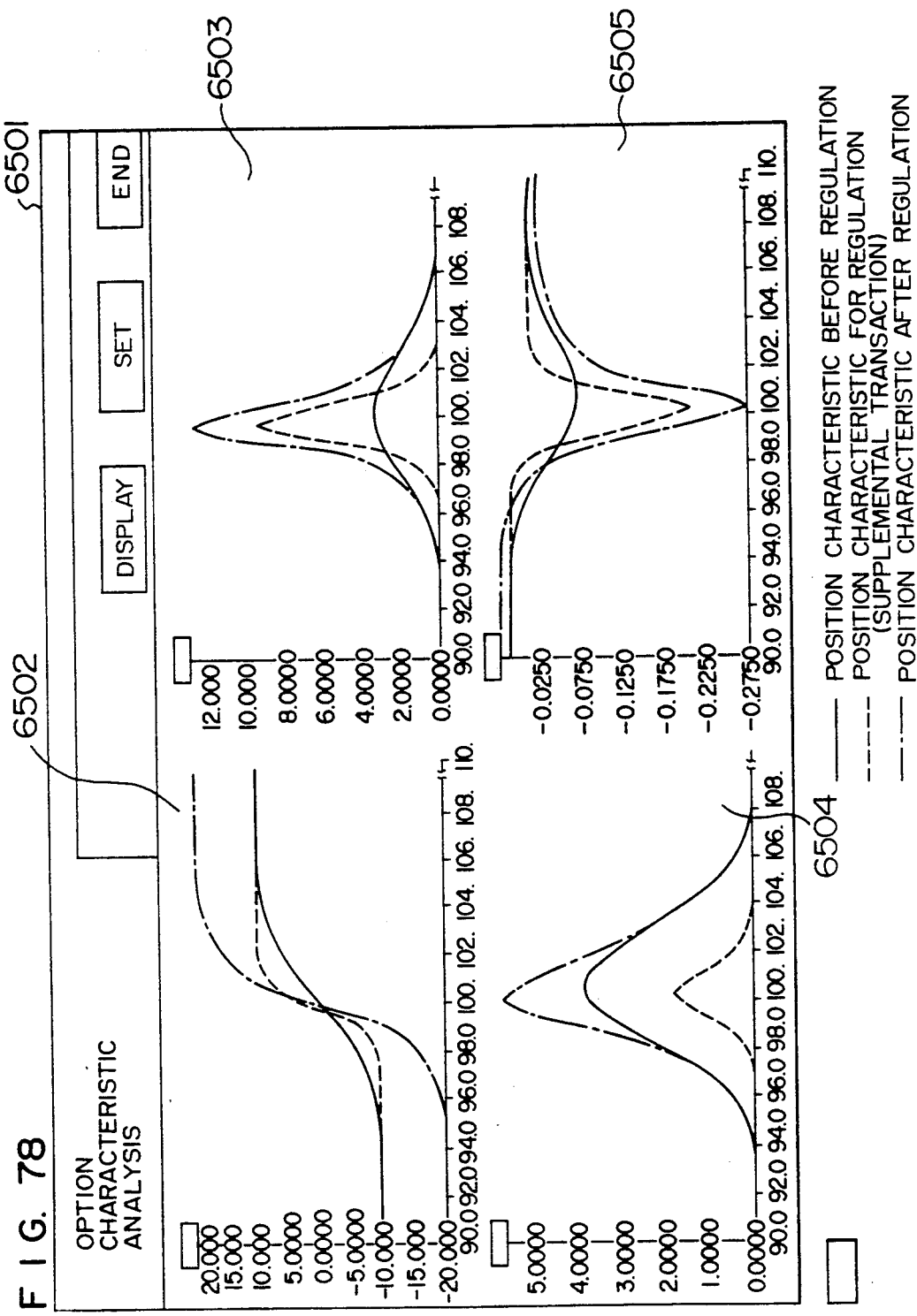
FIG. 78 is a diagram for explaining the position characteristics analysis screen used for the processing shown in FIG. 77.

FIG. 77 is a flowchart for the decided transaction characteristic analysis. The decided transaction characteristic analysis step 6007 (FIG. 53) is realized by using a part of the decided transaction characteristic analysis function. Also, FIG. 78 shows a screen displayed for the position characteristic analysis.

First, the position characteristic analysis screen 6501 of FIG. 78 will be explained.

The abscissa of the graph in the screen represents environmental parameters including the bond price, date, volatility and the risk free rate, while the ordinate has set thereon the position characteristic value and combinations thereof. The position characteristic with the position before regulation, the position characteristic of the supplemental transaction and the position characteristic after regulation as a supplemental transaction added to the position before regulation, may be displayed on the graph.

Now, the flowchart of the position characteristic analysis shown in FIG. 77 will be explained with reference to the screen of FIG. 78.

First, when the decided transaction characteristic analysis step 7 is started (step 6294), the user selects a graph layout on the position characteristic analysis screen 6501 (step 6297), sets a parameter on the abscissa of the graph and the range thereof (step 6400), and further selects a position characteristic index assumed on the ordinate on the graph (step 6303). The user then selects whether the position before regulation is to be analyzed or not (step 6306), and if not, the process jumps to the supplemental transaction analysis step, while if the position before regulation is to be analyzed, the contents of the position are read from the position table 6076 (step 6309), so that the position characteristic value is calculated and produced as an output on the graph (step 6312). Then, the user selects whether or not the supplemental transaction position is to be analyzed (step 6315), and if not, the process jumps to the step of position analysis after regulation, while if the supplemental transaction position is to be analyzed, the contents of the supplemental transaction are read from the supplemental transaction table 6273 (step 6318), so that the position characteristic value is calculated and produced as an output on the graph (step 6321). Further, the user selects whether or not the position after regulation is to be analyzed (step 6324), and if not, the process jumps to the step of selection as to whether the analysis is to be continued or not, while the analysis to be effected, the position characteristic after regulation representing the position before regulation with the supplemental transaction added thereto is calculated and produced as an output on the graph (step 6327). The user selects whether or not the analysis is to be further continued (step 6330), and if to be continued, the process is returned to step 6297, followed by repetition of subsequent steps. If the analysis is to be discontinued, on the other hand, the process is ended (step 6333). Also, the calculation of the position characteristic value in the steps 6309 to 6312, 6318 to 6321 and 6327 may also be effected in accordance with the procedure of FIG. 56B by the decided transaction characteristic calculation section 6722. The abscissa of the graphs displayed on the position characteristic analysis screen 6501 represents the bond price, and the ordinate thereof the delta for the graph 6502, gamma for the graph 6503, kappa for the graph 6504, and theta for the graph 6505.

Figure 79:
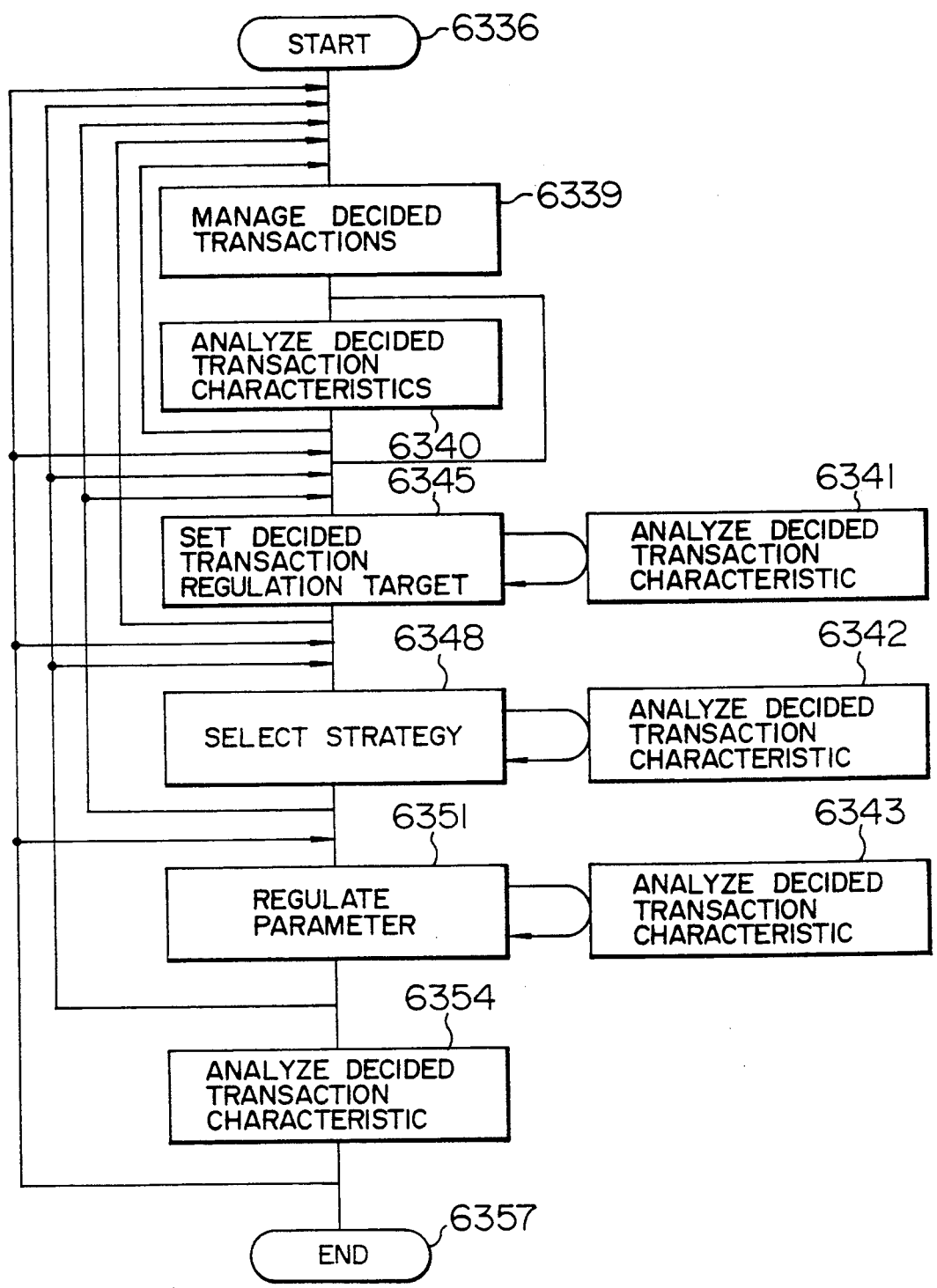
FIG. 79 is a flowchart showing a method of decision-making according to another embodiment of the present invention.

Now, another embodiment for processing the steps other than shown in FIG. 53 will be explained with reference to FIG. 79.

First the process is started (step 6336) and the position is grasped with the position characteristic thereof calculated (step 6339). Then, the position characteristic is analyzed (step 6340), and a position regulation target is set (step 6345). A transaction is then selected (step 6345), and the transaction parameter regulated (step 6351). Finally, the position characteristic after regulation is analyzed (step 6354), thus ending the process (step 6357). In this way, by analyzing the position characteristic after determining a supplemental transaction, the grasping of the position characteristic after the position restructuring is facilitated. The position characteristic analysis step 6340 may be done without, depending on the judgement of the user. Further, the position characteristic analysis steps 6341, 6342 and 6343 may be executed by transferring the control to the position characteristic analysis section 6704 in the process of the position regulation target setting step 6345, the transaction strategy selecting step 6348 and the transaction parameter regulation step 6351. From the position characteristic analysis step 6342 or any subsequent step, the process may be returned to the immediately preceding step.

Figure 84:
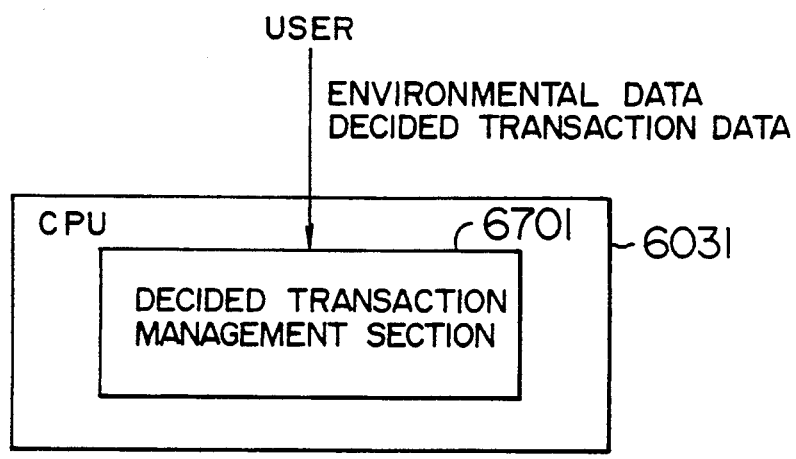
FIGS. 84 and 85 are diagrams for explaining an input form of environmental data and decided process data respectively.
Figure 85:
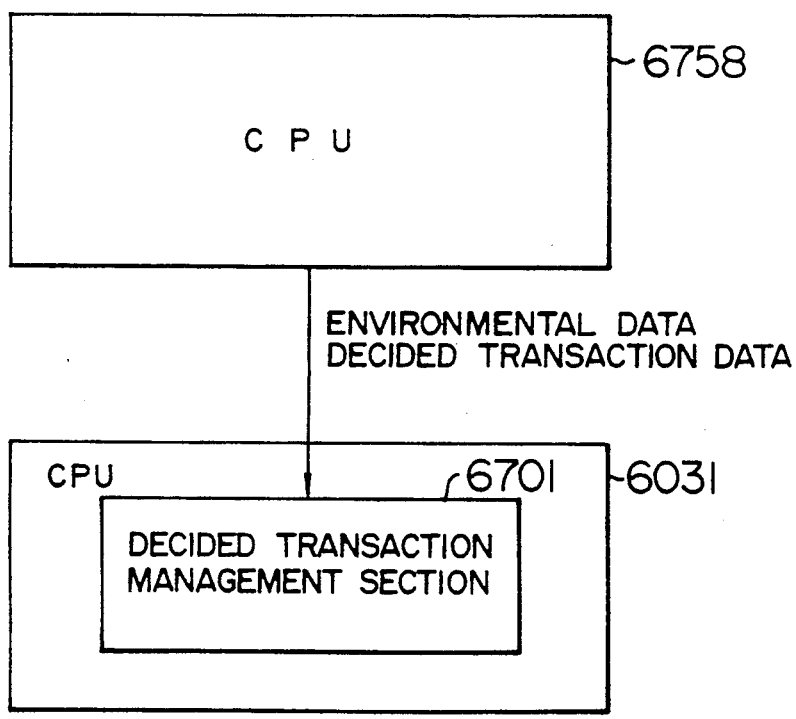

The method of applying the environmental data and the decided transaction data to the decided transaction management section 6701 in the embodiments mentioned above is either by the user operating the keyboard 6019 or the mouse 6022 as shown in FIG. 84 or by inputting through a communication line from another CPU 6758 as shown in FIG. 85. By doing so, the system according to the present invention may be operated by being connected with another transaction management system through LAN or the like.

According to the embodiments described above, an optimum supplemental transaction satisfying a regulation target set for the position is determined, thereby making it possible to support the profit management of the self-position of the dealer.

In view of the fact that a regulation target may also be set against the differential function of the payoff function of the position, the position may be restructured, thereby making it possible to control the characteristics of change of a payoff curve with the position against each environmental parameter.

Also, in the case where the investor determines a strategy having various forms of payoff function by changing the combination ratios of long or short call and long or short put, strike price and strike date in order to realize his investment target, the method and system according to the present invention may be used effectively. In such a case, the invention may be embodied by omitting the decided transaction storage section 6719 making up a component of the decided transaction management section 6701 and the steps of processing executed by the particular section or by reducing the position applied to the decided transaction management section 6701 to zero.

Further, since the position characteristics of the position and supplemental transaction and a combination of the two are capable of being analyzed, it becomes easier for the user to understand the position characteristics by the position restructuring.

As explained above, according to the embodiments of the present invention, there is realized a method and system for decision-making support of a series of procedures for evaluating a transaction already executed, forming a target on the basis thereof and determining a means (transaction) suitable for achieving the particular target in order to determine the optimum transaction to be executed on the next occasion after a transaction already executed.

According to another aspect of the present invention, there is realized a method and system for decision-making support suitable for the dealer in which a decision making on transactions is supported for restructuring the contents of the self-position in conformity with an operational policy in order to support the profit management support of the self-position of the dealer by application to the decision-making support in financial transactions.

According to still another aspect of the invention, there is realized a method and system for supporting the decision-making in which the decision-making for determining an optimum supplemental transaction is attained satisfying a regulation target set against the characteristic value of the position and an environmental parameter without registering the table data for all the available combinations of transaction parameters in advance.

According to a further aspect of the present invention, there is realized a method and system for decision-making support in which the difference between the form of a payoff function suitable for an operational policy and that of the position for which the transaction has already been executed is easily capable of being converted into an objective function.

According to a still further aspect of the invention, there is realized a method and system capable of shortening the calculation time required for optimization.

We claim:

1. A method of supporting decision-making for determining a supplemental transaction required for optimizing a decided transaction capable of being evaluated by a function applied from an information storage means, the method comprising steps of:

analyzing a characteristic of an evaluation function of the decided transaction providing a total sum of evaluation functions of individual transactions making up the decided transaction;

setting a regulation target for regulating said characteristic; and, determining the supplemental transaction changing the decided transaction to satisfy said regulation target.

2. The method of supporting the decision-making according to claim 1, wherein said setting the regulation target includes setting the regulation target of the evaluation function of the decided transaction and a value of a differential function relating to a parameter determined by an environment making up parameters of the evaluation function thereof.

3. The method of supporting the decision-making according to claim 1, wherein said setting the regulation target includes designating parameters of the evaluation function and setting a selected one of an optimum value and a target value of a differential function and the evaluation function associated with the designated parameter value.

4. The method of supporting the decision-making according to claim 1, wherein said setting the regulation target includes setting the regulation target of a value of the evaluation function and a differential function thereof by use of a symbol representing a qualitative characteristic.

5. The method of supporting the decision-making according to claim 4, wherein the symbol representing the qualitative characteristic of the evaluation function and the differential function thereof include one of a plurality of symbols of value indicating 'positive', 'negative', 'zero,', 'ambiguous', 'increase' and 'decrease'.

6. The method of supporting the decision-making according to claim 1, wherein said setting the regulation target includes attaching an order of priority to and weighting each regulation target for the evaluation function and a differential function thereof.

7. The method of supporting the decision-making according to claim 1, wherein said setting the regulation target includes providing a standard regulation target.

8. The method of supporting the decision-making according to claim 1, wherein said determining the supplemental transaction includes selecting an allowable range of a parameter of the evaluation function for the supplemental transaction and the individual transactions included in combinations thereof which is determinable with other than environmental parameters, and determining a parameter of the evaluation function within the allowable range.

9. The method of supporting the decision-making according to claim 8, wherein the allowable range is designated by maximum and minimum values of individual parameters and/or constraints to be satisfied by a plurality of parameters in the allowable range of parameters.

10. The method of supporting the decision-making according to claim 8, wherein a strategy selection rule of IF-THEN type having an IF part and THEN part is used in strategy selection, a strategy being proposed in the THEN part, the IF part confining characteristics of the evaluation function and a differential function thereof for the strategy described in the corresponding THEN part.

11. The method of supporting the decision-making according to claim 8, wherein the characteristic of the evaluation function and a differential function thereof is confined at an IF part of a strategy selection rule by use of symbols representing qualitative characteristics of the evaluation function and the differential function thereof.

12. The method of supporting the decision-making according to claim 11, wherein the symbols representing the qualitative characteristics of the evaluation function and the differential function thereof comprise at least one of a plurality of symbols of value indicating 'positive', 'negative', 'zero', 'ambiguous', 'increase' and 'decrease'.

13. The method of supporting the decision-making according to claim 8, wherein said step of determining the supplemental transaction comprises steps of:

calculating the evaluation function and the differential function while setting a part of the parameter of the evaluation function and changing only independent ones of parameters of a transaction making up a strategy; and, displaying a state of satisfaction of the regulation target in accordance with a change in the independent ones of the parameters.

14. The method of supporting the decision-making according to claim 8, wherein said determining the supplemental transaction includes changing a selected one of a strategy selected at a strategy selecting step and a parameter regulated at a parameter regulation step.

15. The method of supporting the decision-making according to claim 1, wherein an allowable range is designated by maximum and minimum values of individual parameters and/or constraints to be satisfied by a plurality of parameters in the allowable range of parameters.

16. The method of supporting the decision-making according to claim 1, wherein a strategy selection rule of IF-THEN type having an IF part and a THEN part is used in strategy selection, a strategy being proposed in the THEN part, the IF part confining characteristics of the evaluation function and a differential function thereof for the strategy described in the THEN part.

17. The method of supporting the decision-making according to claim 1, wherein the characteristic of the evaluation function and a differential function thereof is confined at an IF part of a strategy selection rule by use of symbols representing qualitative characteristics of the evaluation function and the differential function thereof.

18. The method of supporting the decision-making according to claim 17, wherein the symbols representing the qualitative characteristics of the evaluation function and the differential function thereof include those symbols of value indicating 'positive', 'negative', 'zero', 'ambiguous', 'increase' and 'decrease'.

19. The method of supporting the decision-making according to claim 1, wherein said determining the supplemental transaction comprises steps of:

calculating the evaluation function and a differential function while setting parameters of the evaluation function and changing only independent ones of the parameters of a transaction making up a strategy; and, displaying a state of satisfaction of the regulation target in accordance with a change in the independent ones of the parameters.

20. The method of supporting the decision-making to claim 1, wherein said determining the supplemental transaction includes changing a selected one of a strategy selected at a strategy selecting step and a parameter regulated at a parameter regulation step.

21. The method of supporting the decision-making according to claim 1, wherein the analyzing is capable of being executed by any one of setting a regulation target, selecting a strategy and regulating a parameter.

22. The method of supporting the decision-making according to claim 1, wherein the analyzing includes analysis of characteristics of the evaluation function of the decided transaction, analysis of characteristics of the evaluation function of the supplemental transaction and analysis of characteristics of the evaluation function after addition of the supplemental transaction to the decided transaction.

23. The method of supporting the decision-making according to claim 1, wherein the method may be returned from any of the steps of setting a regulation target, selecting the strategy and regulating the parameter to the step preceding thereto respectively.

24. The method of supporting the decision-making according to claim 1, wherein said transaction is an executable financial transaction, said evaluation function is a payoff function, and said environmental parameter is the one determined by the trend of the market.

* * * * *

UNITED STATES PATENT AND TRADEMARK OFFICE
CERTIFICATE OF CORRECTION

PATENT NO. : 5,313,560
DATED : May 17, 1994
INVENTOR(S) : Tetsuya Maruoka, et al.

It is certified that error appears in the above-indentified patent and that said Letters Patent is hereby corrected as shown below:

Claim 5, column 45, line 40, delete " 'zero,' " and substitute therefor --'zero'--.

Claim 10, column 45, line 66, before "THEN" insert --a--.

Claim 20, column 47, line 4, after "decision-making" insert --according--.

Signed and Sealed this

Sixth Day of September, 1994

BRUCE LEHMAN

Attest:

*Attesting Officer*

*Commissioner of Patents and Trademarks*